United States Patent
Kato et al.

(10) Patent No.: US 7,720,278 B2
(45) Date of Patent: May 18, 2010

(54) MISREGISTER AMOUNT DETECTION METHOD AND APPARATUS

(75) Inventors: Kazuhiko Kato, Ibaraki (JP); Yuko Kimura, Ibaraki (JP)

(73) Assignee: Komori Corporation, Tokyo (JP)

( * ) Notice: Subject to any disclaimer, the term of this patent is extended or adjusted under 35 U.S.C. 154(b) by 1136 days.

(21) Appl. No.: 11/351,138

(22) Filed: Feb. 8, 2006

(65) Prior Publication Data

US 2006/0177130 A1    Aug. 10, 2006

(30) Foreign Application Priority Data

Feb. 10, 2005    (JP)    ............................. 2005-034633

(51) Int. Cl.
*G06K 9/00*    (2006.01)
(52) U.S. Cl. .................................................... 382/162
(58) Field of Classification Search ....................... None
See application file for complete search history.

(56) References Cited

U.S. PATENT DOCUMENTS 6,912,295 B2 *    6/2005    Reed et al. .................. 382/100

FOREIGN PATENT DOCUMENTS

JP    62-099149 A    5/1987
JP    64-042135 U    3/1989

OTHER PUBLICATIONS

"Gaussian filter", Internet http://if.dynsite.net/t-pot/program/9_Gauss/, searched Sep. 19, 2004, Abstract.

* cited by examiner

*Primary Examiner*—Matthew C Bella
*Assistant Examiner*—Alex Liew
(74) *Attorney, Agent, or Firm*—Blakely, Sokoloff, Taylor & Zafman LLP

(57) ABSTRACT

In a misregister amount detection method, printed register marks of colors are sensed, and the inverted R, G, and B image data of R, G, and B image data respectively containing R, G, and B as red, green, and blue color components of the register marks are extracted. The minimum value of the pixel values of corresponding pixels of the generated inverted R, G, and B image data is extracted and converted into the pixel value of a corresponding pixel of K image data containing K as a black color component. Differential R, G, and B image data are obtained by subtracting the pixel value of each pixel of the K image data from the pixel values of corresponding pixels of the inverted R, G, and B image data. Enhanced R, G, and B image data are obtained by adding the pixel values of pixels of the differential R, G, and B image data or values corresponding to the pixel values to the pixel values of corresponding pixels of the inverted R, G, and B image data. The misregister amount between the colors is obtained on the basis of the pixel values of pixels of the enhanced R, G, and B image data. A misregister amount detection apparatus is also disclosed.

20 Claims, 60 Drawing Sheets

MISREGISTER AMOUNT DETECTION METHOD AND APPARATUS

BACKGROUND OF THE INVENTION

The present invention relates to a misregister amount detection method and apparatus which sense printed register marks of colors and obtain the positional shift of the sensed mark of each color as a misregister amount.

In a conventional offset printing press, a printing plate with a printed image is attached to the outer surface of a plate cylinder. Ink stored in an ink fountain is supplied to the printing plate through ink rollers. The ink supplied to the printing plate is transferred to a blanket cylinder which rotates in press contact with the plate cylinder so that printing is executed for a printing paper sheet passing between the blanket cylinder and an impression cylinder. In multicolor printing, a plurality of printing units each having an ink fountain, ink rollers, plate cylinder, blanket cylinder, and impression cylinder are prepared for the respective colors. The printing units sequentially print the colors on a conveyed printing paper sheet.

As shown in FIG. 28, each printing unit comprises an inking device (inker) corresponding to each color. Referring to FIG. 28, reference numeral 1 denotes an ink fountain which stores ink 2; 3, an ink fountain roller; 4-1 to 4-n, a plurality of ink fountain keys which are juxtaposed in the axial direction of the ink fountain roller 3; 5, an ink ductor roller; 6, ink rollers; and 7, a plate cylinder to which a printing plate 8 is attached. An image is printed on the printing plate 8 mounted on the outer surface of the plate cylinder 7.

In each printing unit, the amount of ink supplied from the ink fountain 1 to the ink fountain roller 3 is adjusted by adjusting the opening ratios of the ink fountain keys 4-1 to 4-n. Simultaneously, the amount of ink supplied from the ink fountain roller 3 to the printing plate 8 through the ink rollers 6 is adjusted by adjusting the feed rate of the ink fountain roller 3. The ink supplied to the printing plate 8 is transferred to the blanket cylinder (not shown) and printed on a printing paper sheet.

In a multicolor printing press having a plurality of printing units, the printing plate 8 wound around the plate cylinder 7 of each color printing unit may be shifted from an appropriate position. In this case, color images of a finished printing product may have a positional shift (misregister) in the circumferential direction [the printing direction in the printing press (the direction of travel of a printing product)] or lateral direction (a direction perpendicular to the circumferential direction).

To solve this, in Japanese Patent Laid-Open No. 62-99149 (reference 1), a portion where cross-shaped register marks are printed as register marks of the respective colors is zoomed and sensed. The position of each color register mark contained in the sensed image is calculated. The misregister amount between the colors and the position correction amount of the plate cylinder are calculated from the calculated register mark positions. The position of the plate cylinder is automatically corrected on the basis of the calculation result.

FIG. 29 shows the schematic arrangement of the automatic registration apparatus of a printing press described in reference 1. Referring to FIG. 29, reference numeral 11 denotes a camera (color camera); 12, a processing unit; 13, an operation panel; 14, a motor driving circuit; 15, a plurality of motors to drive the register adjustment elements of the printing press; and 16, a plurality of potentiometers attached to the motors 15. The camera 11 zooms and senses an image portion X where four register marks TC, TM, TY, and TK of cyan (C), magenta (M), yellow (Y), and black (K) are printed. R image data with a red component R, G image data with a green component G, and B image data with a blue component B of the register marks TC, TM, TY, and TK are sent to the processing unit 12.

The processing unit 12 stores the R image data from the camera 11 in an R frame memory (not shown), the G image data in a G frame memory (not shown), and the B image data in a B frame memory (not shown). The R, G, and B image data stored in the R, G, and B frame memories are converted into C, M, Y, and K image data and stored in C, M, Y, and K frame memories. The R, G, and B image data are converted into C, M, Y, and K image data in the following way.

(1) The complement of the luminance level (pixel value) of each pixel of the R, G, and B image data is set to the density level (pixel value) of each pixel of the C, M, and Y image data and stored in the C, M, and Y frame memories.

(2) The density level of each pixel of the C, M, and Y image data is checked. For a pixel having a density of a predetermined level or more in all the C, M, and Y colors, the average density level of the C, M, and Y colors is obtained. The average density level is stored as the pixel value of a corresponding pixel in the K frame memory. In this case, the density levels of corresponding pixels in the C, M, and Y frame memories are rewritten to 0.

(3) The luminance level of each pixel of the R image data is checked. A pixel lower than a predetermined level (a pixel having a high C density level) is determined as a portion where C and K overlap. The complement of the luminance level is converted into a density level. The density level is multiplied by a predetermined constant to remove the increase in density by K. The density level of a corresponding pixel in the C frame memory is rewritten.

(4) The luminance level of each pixel of the G image data is checked. A pixel lower than a predetermined level (a pixel having a high M density level) is determined as a portion where M and K overlap. The complement of the luminance level is converted into a density level. The density level is multiplied by a predetermined constant to remove the increase in density by K. The density level of a corresponding pixel in the M frame memory is rewritten.

(5) The luminance level of each pixel of the B image data is checked. A pixel lower than a predetermined level (a pixel having a high Y density level) is determined as a portion where Y and K overlap. The complement of the luminance level is converted into a density level. The density level is multiplied by a predetermined constant to remove the increase in density by K. The density level of a corresponding pixel in the Y frame memory is rewritten.

With the above-described process, the R, G, and B image data are converted into C, M, Y, and K image data and stored in the C, M, Y, and K frame memories.

(6) To check which pixel of the C, M, Y, and K image data has an image portion, the density level of each pixel stored in the C, M, Y, and K frame memories is binarized with a predetermined slice level.

(7) In two directions (X and Y directions) perpendicular to each other in the C image data, the number of pixels determined to have an image is added. The sum of images in the Y direction is plotted for each pixel position in the X direction to obtain a first cumulative curve. The sum of images in the X direction is plotted for each pixel position in the Y direction to obtain a second cumulative curve. The center of the peak of the first cumulative curve is obtained as the X-coordinate of the center of the register mark TC. The center of the peak of the second cumulative curve is obtained as the Y-coordinate of the center of the register mark TC.

(8) In two directions (X and Y directions) perpendicular to each other in the M image data, the number of pixels determined to have an image is added. The sum of images in the Y direction is plotted for each pixel position in the X direction to obtain a first cumulative curve. The sum of images in the X direction is plotted for each pixel position in the Y direction to obtain a second cumulative curve. The center of the peak of the first cumulative curve is obtained as the X-coordinate of the center of the register mark TM. The center of the peak of the second cumulative curve is obtained as the Y-coordinate of the center of the register mark TM.

(9) In two directions (X and Y directions) perpendicular to each other in the Y image data, the number of pixels determined to have an image is added. The sum of images in the Y direction is plotted for each pixel position in the X direction to obtain a first cumulative curve. The sum of images in the X direction is plotted for each pixel position in the Y direction to obtain a second cumulative curve. The center of the peak of the first cumulative curve is obtained as the X-coordinate of the center of the register mark TY. The center of the peak of the second cumulative curve is obtained as the Y-coordinate of the center of the register mark TY.

(10) In two directions (X and Y directions) perpendicular to each other in the K image data, the number of pixels determined to have an image is added. The sum of images in the Y direction is plotted for each pixel position in the X direction to obtain a first cumulative curve. The sum of images in the X direction is plotted for each pixel position in the Y direction to obtain a second cumulative curve. The center of the peak of the first cumulative curve is obtained as the X-coordinate of the center of the register mark TK. The center of the peak of the second cumulative curve is obtained as the Y-coordinate of the center of the register mark TK.

(11) The misregister amounts in the circumferential and lateral directions between the colors are obtained from the obtained central coordinates of the register marks TC, TM, TY, and TK. The motors 15 are so driven as to nullify the misregister amounts while receiving feedback of position data from the potentiometers 16, thereby correcting the position of the plate cylinder 7 in each color printing unit.

However, in the conventional misregister amount detection method described in reference 1, in generating the K image data from the C, M, and Y image data in the step (2), a pixel having a density of a predetermined level or more in all the C, M, and Y colors is determined as K. However, the C, M, Y, and K densities change between actual printing products. Hence, if K pixels are determined in accordance with a threshold value of predetermined level, it makes a difference between printing products.

In the step (3), a pixel in the R image data whose luminance level is lower than a predetermined level is determined as a pixel where C and K overlap. In the step (4), a pixel in the G image data whose luminance level is lower than a predetermined level is determined as a pixel where M and K overlap. In the step (5), a pixel in the B image data whose luminance level is lower than a predetermined level is determined as a pixel where Y and K overlap. However, the C, M, Y, and K densities, i.e., the R, G, and B luminance levels change between actual printing products. Hence, if pixels overlapping K are determined in accordance with a threshold value of predetermined level, it makes a difference between printing products.

In the step (3), the complement of the luminance level of a pixel where C and K overlap is multiplied by a predetermined constant, thereby obtaining the C density level excluding the increase in density by K. In the step (4), the complement of the luminance level of a pixel where M and K overlap is multiplied by a predetermined constant, thereby obtaining the M density level excluding the increase in density by K. In the step (5), the complement of the luminance level of a pixel where Y and K overlap is multiplied by a predetermined constant, thereby obtaining the Y density level excluding the increase in density by K. However, the C, M, Y, and K densities change between actual printing products. Hence, if the density level excluding the increase in density by K is obtained by multiplication of a predetermined constant, it makes a difference between printing products.

In the step (6), to check which pixel has an image, the density level of each pixel stored in the C, M, Y, and K frame memories is binarized with a predetermined slice level. However, the C, M, Y, and K densities change between actual printing products. Hence, if the density level is binarized with a predetermined slice level, it makes a difference between printing products.

As described above, in the conventional misregister amount detection method of reference 1, K pixels are determined in accordance with a threshold value of predetermined level, or pixels overlapping K are determined in accordance with a threshold value of predetermined level, although the C, M, Y, and K densities change between actual printing products. In addition, the density level excluding the increase in density by K is obtained by multiplication of a predetermined constant, or the density level is binarized with a predetermined slice level. For this reason, a difference is generated between printing products. A detection error occurs in the central coordinates of the register marks of the respective colors. Hence, the misregister amount between the colors cannot accurately be obtained.

SUMMARY OF THE INVENTION

It is an object of the present invention to provide a misregister amount detection method and apparatus capable of accurately obtaining the misregister amount between colors regardless of the difference in color density between actual printing products.

In order to achieve the above object, according to the present invention, there is provided a misregister amount detection method comprising the steps of sensing printed register marks of colors and extracting inverted R image data, inverted G image data, and inverted G image data of R image data, G image data, and B image data respectively containing R as a red color component, G as a green color component, and B as a blue color component of the register marks of the color, extracting a minimum value of pixel values of corresponding pixels of the generated inverted R image data, inverted G image data, and inverted B image data and converting the extracted minimum value of the pixel values of the pixels into a pixel value of a corresponding pixel of K image data containing K as a black color component, obtaining differential R image data by subtracting the pixel value of each pixel of the K image data from the pixel value of a corresponding pixel of the inverted R image data, obtaining differential G image data by subtracting the pixel value of each pixel of the K image data from the pixel value of a corresponding pixel of the inverted G image data, and obtaining differential B image data by subtracting the pixel value of each pixel of the K image data from the pixel value of a corresponding pixel of the inverted B image data, obtaining enhanced R image data by adding one of the pixel value of each pixel of the differential R image data and a value corresponding to the pixel value to the pixel value of a corresponding pixel of the inverted R image data, obtaining enhanced G image data by adding one of the pixel value of each pixel of the differential G image data and a value corresponding to the pixel value to the pixel value of a corresponding pixel of the inverted G image data, and obtaining enhanced B image data by adding one of the pixel value of each pixel of the differential B image data and a value corresponding to the pixel value to the pixel value of a corresponding pixel of the inverted B image data, and obtaining a misregister amount between the colors on the basis of the pixel values of pixels of the enhanced R image data, enhanced G image data, and enhanced B image data.

DESCRIPTION OF THE PREFERRED EMBODIMENTS

Figure 1:
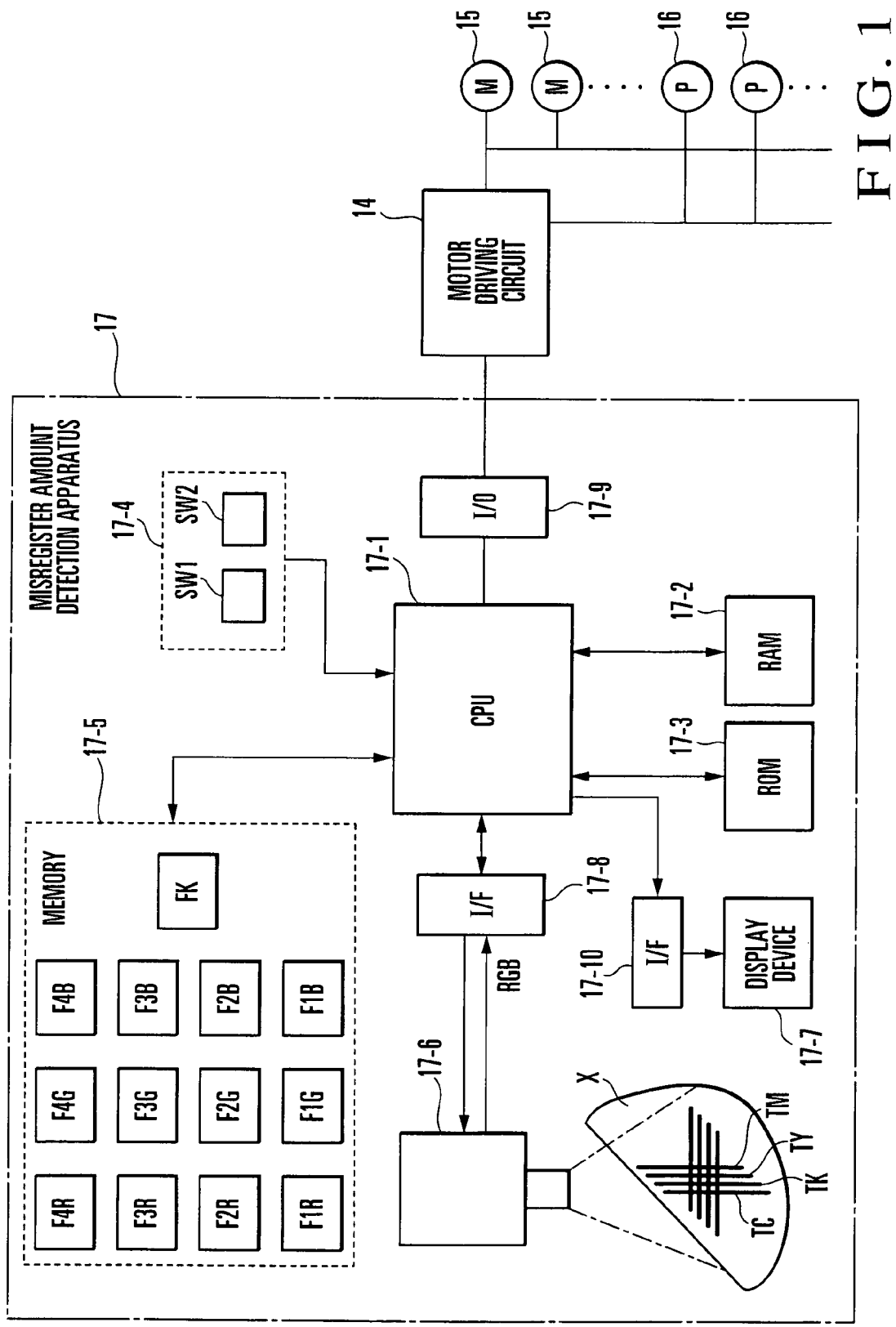
FIG. 1 is a block diagram of the automatic registration apparatus of a printing press to which the present invention is applied.

The principle of the present invention in causing the color printing units of a printing press to print register marks of four color C (cyan), M (magenta), Y (yellow), and K (black) will be described first. When the color printing units of a printing press print C, M, Y, and K register marks, the printed C, M, Y, and K register marks are sensed. When the C, M, Y, and K register marks are sensed by a color camera, the color camera generally outputs signals decomposed to R, G, and B. Hence, R, G, and B image data are obtained by decomposing the C, M, Y, and K register marks by the three primary colors of light. Note that C, M, and Y are called the three primary colors of color printing corresponding to R, G, and B, i.e., the three primary colors of light. A color camera takes C, M, and Y as R, G, and B color components.

The R, G, and B image data are inverted to inverted R, G, and B image data. The C register mark has the R color component and therefore appears in the R image data. The M register mark has the G color component and therefore appears in the G image data. The Y register mark has the B color component and therefore appears in the B image data. The K register mark has the R, G, and B color components. Hence, the R, G, and B color components appear in the R, G, and B image data, respectively.

In the R, G, and B image data, the pixel value of each pixel is obtained as a luminance level. The luminance level of the pixel value of a pixel having R, G, and B color components is low. The luminance level of the pixel value of a pixel having no R, G, and B color components is high. When the R, G, and B image data are inverted, i.e., converted into inverted R, G, and B image data, the luminance level of the pixel value of a pixel having R, G, and B color components becomes high, and the luminance level of the pixel value of a pixel having no R, G, and B color components becomes low. In this case, the pixel value of each pixel of the inverted R image data represents a C density level. The pixel value of each pixel of the inverted G image data represents an M density level. The pixel value of each pixel of the inverted B image data represents a Y density level.

Hence, as inverted R image data, simple C image data in which the C color component of the C and K register marks is converted into a density level is obtained. As inverted G image data, simple M image data in which the M color component of the M and K register marks is converted into a density level is obtained. As inverted B image data, simple Y image data in which the Y color component of the Y and K register marks is converted into a density level is obtained. In the inverted R, G, and B image data, the C, M, and Y color components of the K register mark appear at the same pixel position.

The minimum value of the pixel values of corresponding pixels of the obtained inverted R, G, and B image data is extracted. The extracted minimum value of the pixel values of pixels is set to the pixel value of the corresponding pixel of the K image data. If at least one of the pixel values of the corresponding pixels of the inverted R, G, and B image data is "0", i.e., none of the C, M, and Y color components are present, the pixel value of a pixel of the K image data corresponding to that pixel is set to "0". To the contrary, if the pixel values of the corresponding pixels of the inverted R, G, and B image data are larger than "0", i.e., the C, M, and Y color components are present, the pixel value of a pixel of the K image data corresponding to that pixel is set to the minimum value of the density levels of the C, M, and Y color components.

The K register mark has the C, M, and Y color components. Since the pixel values of the pixels of that portion in the inverted R, G, and B image data are large, the minimum value becomes large. On the other hand, the minimum value of the pixels of the C, M, and Y register mark portions becomes small because the pixel values of the inverted G and B image data, the inverted R and B image data, and the inverted R and G image data are small. Hence, the K register mark is extracted from the inverted R, G, and B image data and transferred to the K image data.

In this way, the K register mark is extracted from the inverted R, G, and B image data. The C, M, and Y color components of the K register mark remain in the inverted R, G, and B image data. When differential R image data is obtained by subtracting the pixel value of each pixel of the K image data from the pixel value of a corresponding pixel of the inverted R image data, the C color component of the K register mark contained in the inverted R image data becomes zero or unnoticeable. Similarly, when differential G image data is obtained by subtracting the pixel value of each pixel of the K image data from the pixel value of a corresponding pixel of the inverted G image data, the M color component of the K register mark contained in the inverted G image data becomes zero or unnoticeable. When differential B image data is obtained by subtracting the pixel value of each pixel of the K image data from the pixel value of a corresponding pixel of the inverted B image data, the Y color component of the K register mark contained in the inverted B image data becomes zero or unnoticeable.

In the differential R image data (C image data), the C color component of the K register mark becomes zero or unnoticeable. For example, if the K and C register marks partially overlap, the density level of the C register mark in the differential R image data becomes low in the overlapping portion. Hence, it may be impossible to obtain the central coordinates of the C register mark from the differential R image data. Even if the coordinates are obtained, they may be inaccurate. This also applies to differential G image data (M image data) and differential B image data (Y image data). In the present invention, enhanced R image data (enhanced C image data) is obtained by adding the pixel value of each pixel of the differential R image data (C image data) or a value corresponding to the pixel value to the pixel value of a corresponding pixel of inverted R image data (simple C image data). Similarly, enhanced G image data (enhanced M image data) is obtained by adding the pixel value of each pixel of the differential G image data (M image data) or a value corresponding to the pixel value to the pixel value of a corresponding pixel of inverted G image data (simple N image data). Enhanced B image data (enhanced Y image data) is obtained by adding the pixel value of each pixel of the differential B image data (Y image data) or a value corresponding to the pixel value to the pixel value of a corresponding pixel of inverted B image data (simple Y image data).

In the enhanced R image data, when the pixel value of each pixel of the differential B image data is added to the pixel value of a corresponding pixel of the inverted R image data, the density level of the C register mark in the differential R image data is added to the density level of the C register mark in the inverted R image data. Hence, the density level of the C register mark is almost doubled, i.e., becomes much higher than the density level of the C color component of the K register mark. If the K and C register marks partially overlap, the density level of the C color component in the inverted R image data is high in the overlapping portion. The density level of the C color component of the C and K register marks remaining in the differential R image data is added to the overlapping portion with the high density level. Hence, the density level is high in the entire region of the C register mark. This also applies to the enhanced G and B image data. The density level is high in the entire regions of the M and Y register marks.

The enhanced R, G, and B image data are obtained in this way. Then, the misregister amount between the colors is obtained from the pixel values of pixels of the enhanced R, G, and B image data and K image data. For example, for each of the enhanced R, G, and B image data and K image data, a line in which the average value of the pixel values of pixels on a line in the lateral direction is maximum is obtained. The central coordinates of the C, M, Y, and K register marks in the circumferential direction are obtained from the positions of the obtained lines, thereby obtaining the misregister amount between the colors in the circumferential direction. In addition, for each of the enhanced R, G, and B image data-and K image data, a line in which the average value of the pixel values of pixels on a line in the circumferential direction is maximum is obtained. The central coordinates of the C, M, Y, and K register marks in the lateral direction are obtained from the positions of the obtained lines, thereby obtaining the misregister amount between the colors in the lateral direction. In obtaining the misregister amount, Gaussian processing (high-frequency removal processing using a Gaussian function) is executed for the enhanced R, G, and B image data and K image data to obtain a defocused image by intention. When a fine change in the pixel value is smoothly leveled, the central coordinates of the register mark of each color can be detected more accurately.

In the above-described example, the register mark of each color is a cross-shaped register mark. However, the present invention is not limited to the cross-shaped register mark. A mask having a straight line portion in only the circumferential direction or in the lateral direction may be used. In the above-described example, printing is executed in four C, M, Y, and K colors. The present invention can also be applied even when printing is executed in three C, M, and Y colors. In this case, in the misregister amount detection step, the misregister amount between the colors is obtained from the pixel values of pixels of the enhanced R, G, and B image data. That is, printing is sometimes executed in three C, M, and Y colors by using gray obtained by superimposing C, M, and Y in place of K. In such a case, the portion where the C, M, and Y marks overlap is transferred to K image data as the K color component. In this case, the K image data is used to generate differential R, G, and B image data but need not be used to detect the misregister amount between the three C, M, and Y colors. The Gaussian processing is executed for only enhanced R, G, and B image data and need not be executed for K image data.

In the above-described example, R, G, and B image data are inverted to obtain inverted R, G, and B image data. Processing is executed by using the inverted R, G, and B image data as simple C, M, and Y image data. Instead, processing may be executed by using R, G, and B image data as simple C, M, and Y image data without inverting the R, G, and B image data.

In this case, i.e., when not the inverting scheme but the noninverting scheme is used, the maximum value of the pixel values of corresponding pixels of the R, G, and B image data is extracted. The extracted maximum value of the pixel values of the pixels is set to the pixel value of a corresponding pixel of K image data containing K as the black component. Differential R image data (C image data) is obtained by subtracting the pixel value of each pixel of the K image data from the pixel value of a corresponding pixel of the R image data. Differential G image data (M image data) is obtained by subtracting the pixel value of each pixel of the K image data from the pixel value of a corresponding pixel of the G image data. Differential B image data (Y image data) is obtained by subtracting the pixel value of each pixel of the K image data from the pixel value of a corresponding pixel of the B image data. Enhanced R image data (enhanced C image data) is obtained by adding the pixel value of each pixel of the differential R image data or a value corresponding to the pixel value to the pixel value of a corresponding pixel of the R image data. Enhanced G image data (enhanced M image data) is obtained by adding the pixel value of each pixel of the differential G image data or a value corresponding to the pixel value to the pixel value of a corresponding pixel of the G image data. Enhanced B image data (enhanced Y image data) is obtained by adding the pixel value of each pixel of the differential B image data or a value corresponding to the pixel value to the pixel value of a corresponding pixel of the B image data. The misregister amount between the colors is obtained from the pixel value of each pixel of the enhanced R, G, and B image data and K image data.

In this case, for example, for each of the enhanced R, G, and B image data and K image data, a line in which the average value of the pixel values of pixels on a line in the lateral direction is minimum is obtained. The central coordinates of the C, M, Y, and K register marks in the circumferential direction are obtained from the positions of the obtained lines, thereby obtaining the misregister amount between the colors in the circumferential direction. In addition, for each of the enhanced R, G, and B image data and K image data, a line in which the average value of the pixel values of pixels on a line in the circumferential direction is minimum is obtained. The central coordinates of the C, M, Y, and K register marks in the lateral direction are obtained from the positions of the obtained lines, thereby obtaining the misregister amount between the colors in the lateral direction.

Even in the scheme not to invert R, G, and B image data, the register mark of each color can be applied not to printing using four C, M, Y, and K colors but to printing using three C, M, and Y colors. In this case, the K image data is used to generate differential R, G, and B image data but need not be used to detect the misregister amount between the three C, M, and Y colors. The Gaussian processing is executed for only enhanced R, G, and B image data and need not be executed for K image data. The present invention can also be implemented as an apparatus.

The present invention will be described below in detail with reference to the accompanying drawings.

First Embodiment

Inverting Scheme

Figure 29:
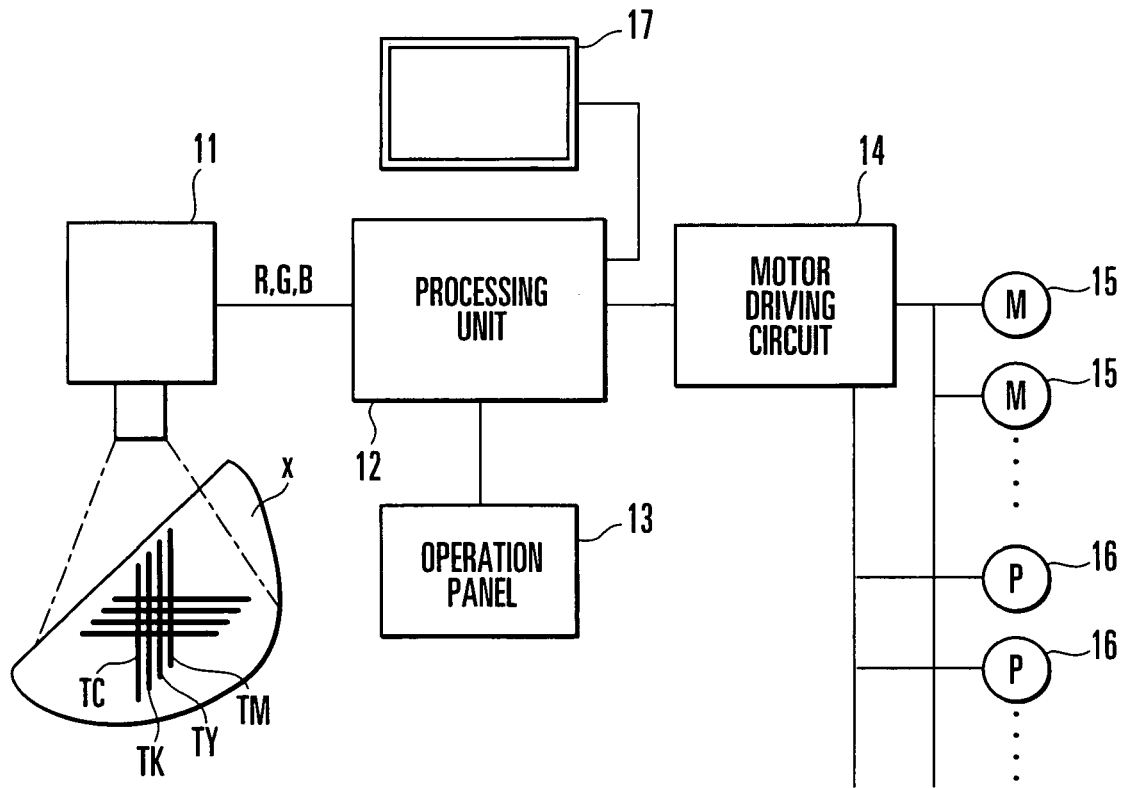
FIG. 29 is a schematic block diagram of an automatic registration apparatus in a conventional printing press.

In an automatic registration apparatus shown in FIG. 1, a misregister amount detection apparatus 17 comprises a CPU 17-1, RAM 17-2, ROM 17-3, input device 17-4, memory 17-5, camera (color camera) 17-6, display device 17-7, and input/output interfaces (I/O I/Fs) 17-8 to 17-10. The misregister amount detection apparatus 17 is connected to a motor driving circuit 14 through the interface 17-9. The same reference numerals as in FIG. 29 denote the same or similar components in FIG. 1, and a description thereof will be omitted.

The CPU 17-1 receives an image signal (R, G, and B signals) supplied from the camera 17-6 through the interfaces 17-8 and operates in accordance with programs stored in the ROM 17-3 while accessing the RAM 17-2 or memory 17-5. The ROM 17-3 stores a program unique to this embodiment, i.e., a misregister amount detection program to detect the misregister amount between the C, M, Y, and K colors.

A measurement start switch SW1 and control end switch SW2 are provided on the input device 17-4. The memory 17-5 includes an R frame memory F1R, G frame memory F1G, B frame memory F1B, inverted R frame memory F2R, inverted G frame memory F2G, inverted B frame memory F2B, differential R frame memory F3R, differential G frame memory F3G, differential B frame memory F3B, enhanced R frame memory F4R, enhanced G frame memory F4G, enhanced B frame memory F4B, and K frame memory FK.

A processing operation according to the misregister amount detection program executed by the CPU 17-1 will be described next with reference to FIG. 2.

[Sensing of Register Marks]

When the measurement start switch SW1 is turned on, the CPU 17-1 sends a command to the camera 17-6 to zoom and sense an image portion X where register marks (register marks) TC, TM, TY, and TK are printed (step S101).

The image of the image portion X sensed by the camera 17-6 is displayed on the display device 17-7. The operator sets the cross shapes of the register marks TC, TM, TY, and TK in the image in a right-angled parallel state by, e.g., changing the sensing angle of the camera 17-6 while observing the image and turns on the measurement start switch SW1. In this case, the position of the register marks can easily be read from the sensed image.

Figure 3A:
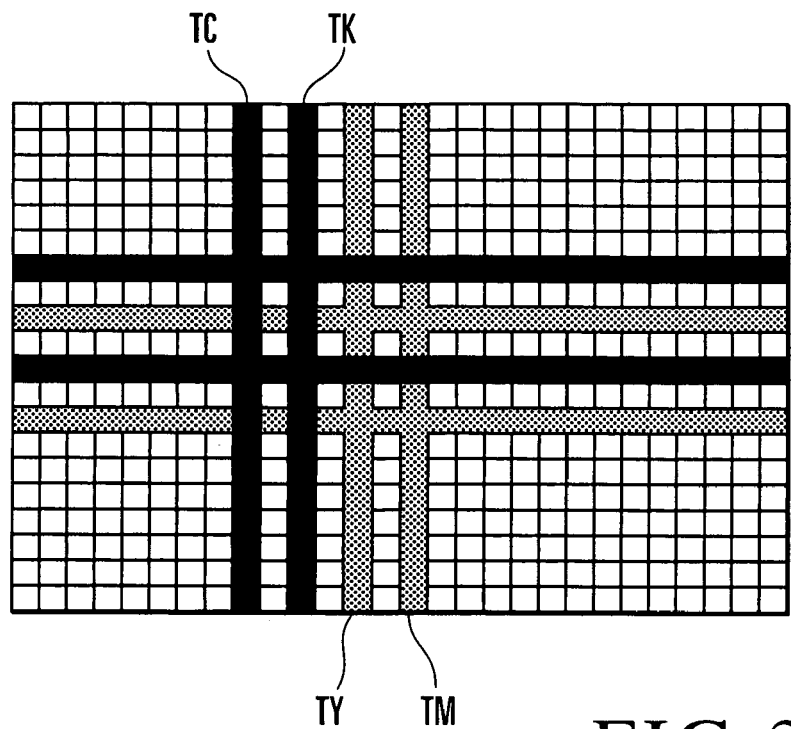
FIGS. 3A and 3B are views showing examples of an image sensed by a camera shown in FIG. 1.

FIG. 3A shows an example of the sensed image. In this example, all the printed register marks TC, TM, TY, and TK are shifted in the circumferential direction for the descriptive convenience. The register marks TC, TM, TY, and TK actually have a width corresponding to a plurality of pixels. However, the width corresponds to one pixel here for the descriptive convenience.

[Reception of Sensed Image]

The CPU 17-1 receives the sensed image from the camera 17-6 and stores R image data of the sensed image in the R frame memory F1R, G image data in the G frame memory F1G, and B image data in the B frame memory F1B (step S102).

In this example, the camera 17-6 outputs signals decomposed to R, G, and B. In this case, R, G, and B image data obtained by decomposing the register marks TC, TM, TY, and TK by the three primary colors of light are obtained from the camera 17-6. Hence, the CPU 17-1 need not separate the sensed image into R, G, and B images.

If the camera 17-6 does not output the signals decomposed to R, G, and B, the CPU 17-1 separates the sensed image into R, G, and B image data and stores them in the R, G, and B frame memories F1R, F1G, and F1B.

Figure 4A:
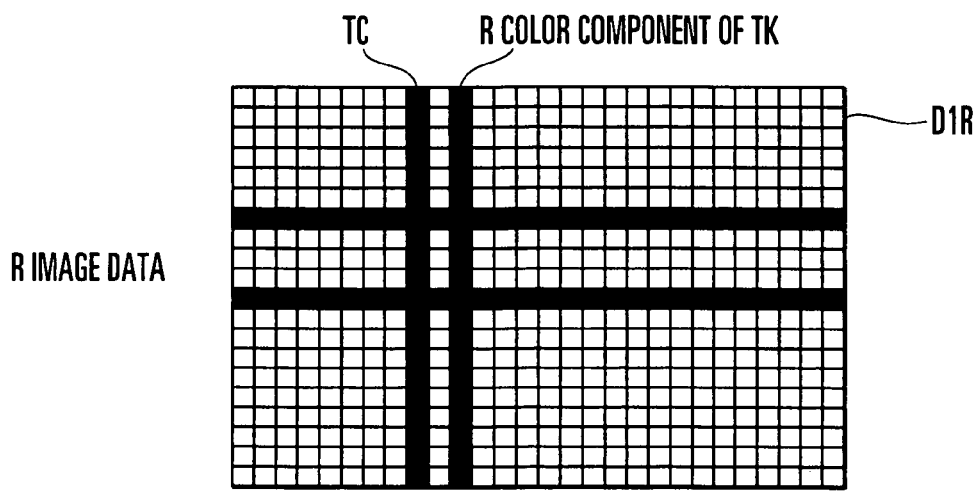
FIGS. 4A to 4C are views showing R, G, and B image data obtained from the sensed image.
Figure 4B:
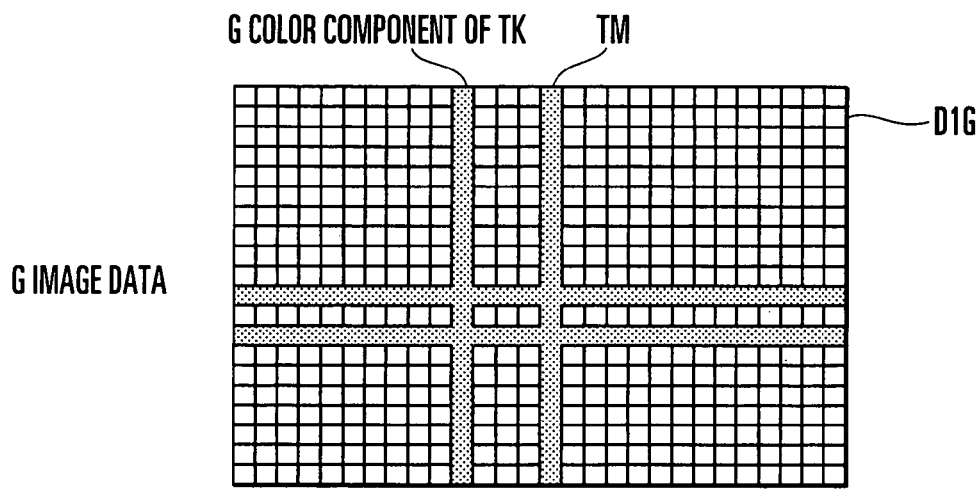
Figure 4C:
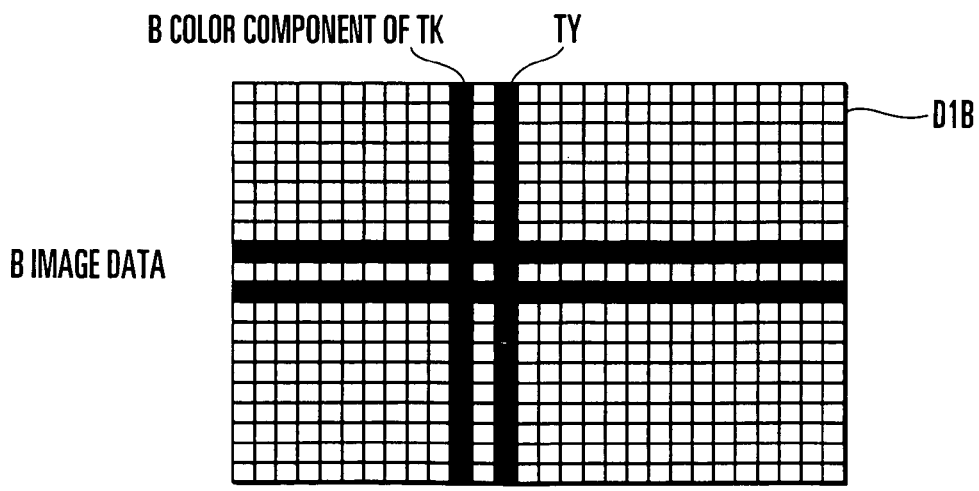

FIGS. 4A to 4C show R image data D1R, G image data D1G, and B image data D1B, respectively. The register mark TC has an R color component and therefore appears in the R image data D1R. The register mark TM has a G color component and therefore appears in the G image data D1G. The register mark TY has a B color component and therefore appears in the B image data D1B. The register mark TK has the R, G, and B color components. Hence, the R, G, and B color components appear in the R, G, and B image data D1R, D1G, and D1B, respectively. As the fundamentals of image engineering, in image sensing using a camera, C, M, and Y as the three primary colors of color printing are taken as the R, G, and B color components as the three primary colors of light.

In the R, G, and B image data D1R, D1G, and D1B, the pixel value of each pixel is obtained as a luminance level. The pixel value of a pixel having the R, G, and B color components corresponds to a low luminance level. The pixel value of a pixel having no R, G, and B color components corresponds to a high luminance level. For example, when 256 luminance levels are represented by "0" to "255", the pixel value of a pixel having no R, G, and B color components is "255".

[Generation of Enhanced C, M, and Y Image Data and K Image Data]

Figure 5:
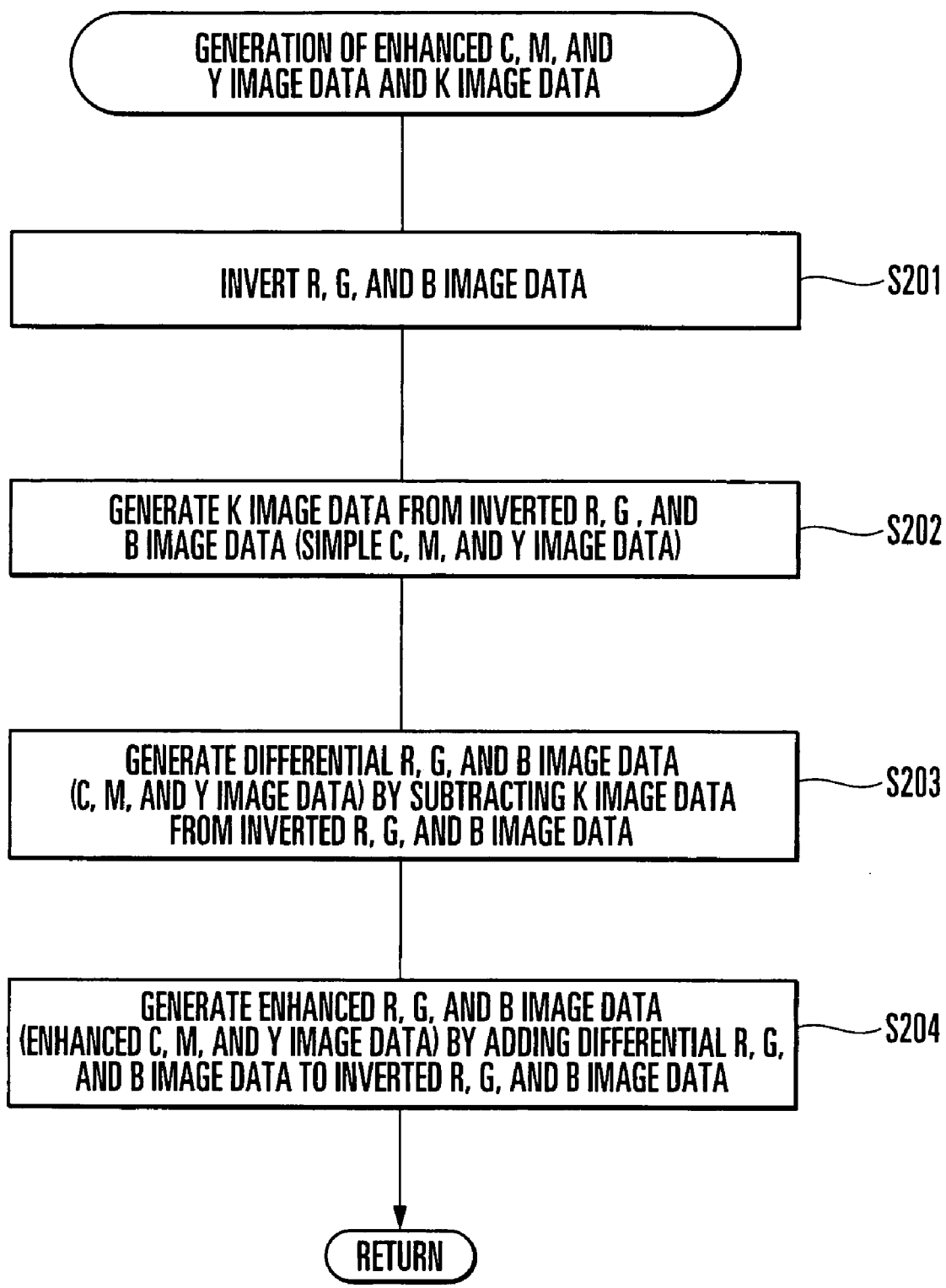
FIG. 5 is a detailed flowchart of generation processing of enhanced C, M, and Y image data and K image data in FIG. 2.

Next, the CPU 17-1 generates enhanced C, M, and Y image data and K image data from the R, G, and B image data D1R, D1G, and D1B (step S103). FIG. 5 shows the generation processing of enhanced C, M, and Y image data and K image data.

Figure 6A:
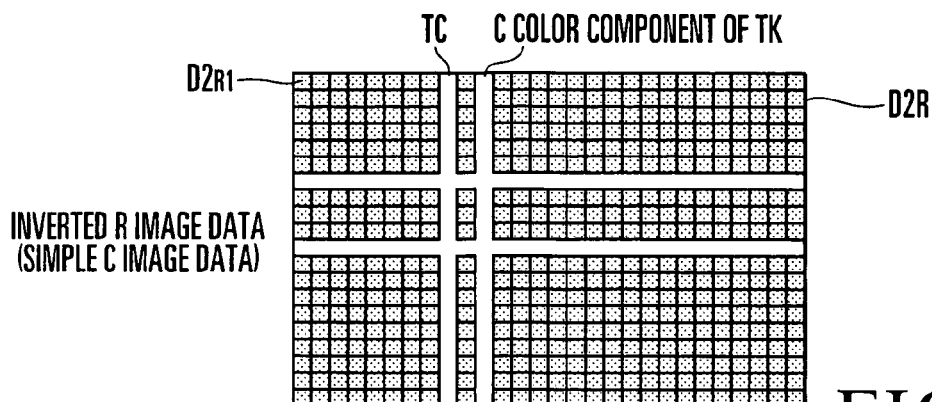
FIGS. 6A to 6D are views showing inverted R, G, and B image data and K image data generated from R, G, and B image data.
Figure 6B:
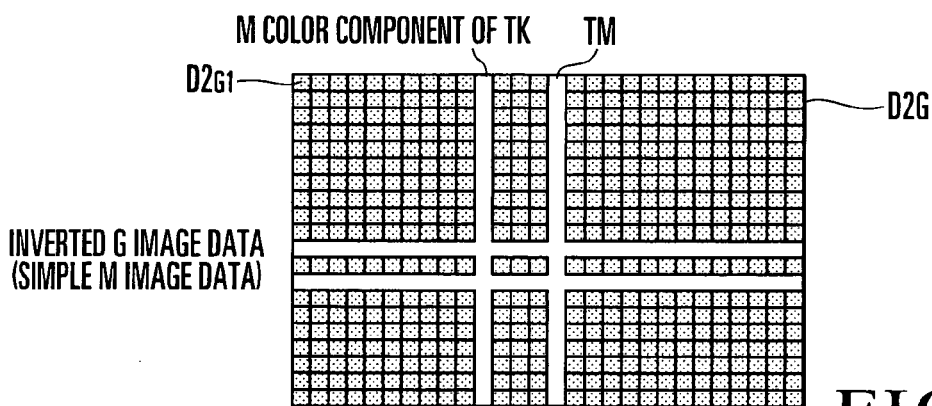
Figure 6C:
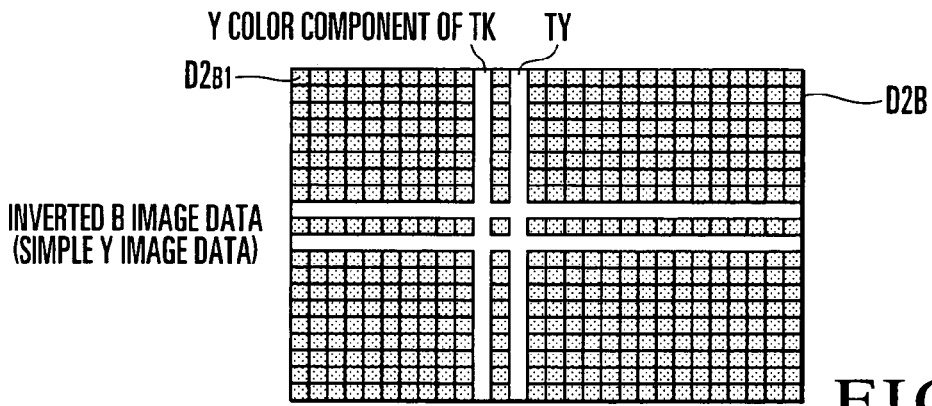

In accordance with this flowchart, the CPU 17-1 inverts the R, G, and B image data D1R, D1G, and D1B (step S201) to obtain inverted R, G, and B image data D2R, D2G, and D2B (FIGS. 6A to 6C) and stores them in the inverted R, G, and B frame memories F2R, F2G, and F2B, respectively.

In the inverted R, G, and B image data D2R, D2G, and D2B, the pixel value of a pixel having the R, G, and B color components corresponds to a high luminance level. The pixel value of a pixel having no R, G, and B color components corresponds to a low luminance level. In this case, the pixel value of each pixel of the inverted R image data D2R represents a C density level. The pixel value of each pixel of the inverted G image data D2G represents an M density level. The pixel value of each pixel of the inverted B image data D2B represents a Y density level.

Hence, as the inverted R image data D2R, simple C image data in which the C color component of the register marks TC and TK is converted into a density level is obtained. As the inverted G image data D2G, simple M image data in which the M color component of the register marks TM and TK is converted into a density level is obtained. As the inverted B image data D2B, simple Y image data in which the Y color component of the register marks TY and TK is converted into a density level is obtained. In the inverted R, G, and B image data D2R, D2G, and D2B, the C, M, and Y color components of the register mark TK appear at the same pixel position.

Figure 6D:
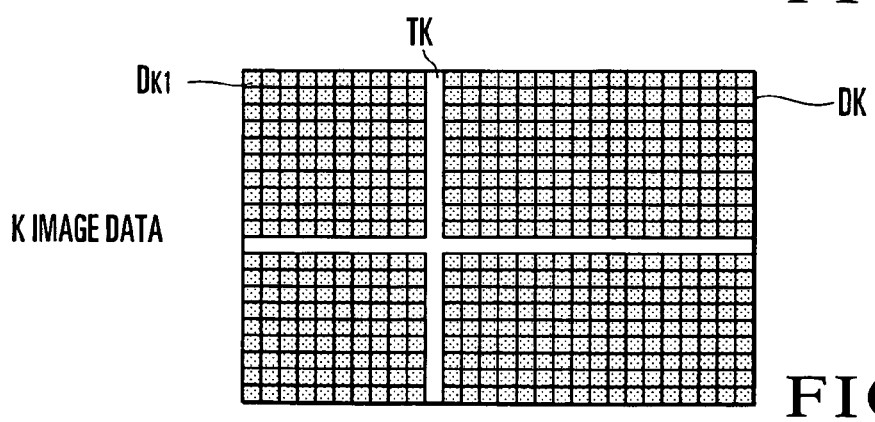

The CPU 17-1 generates K image data DK (FIG. 6D) from the inverted R, G, and B image data D2R, D2G, and D2B (step S202) and stores the K image data DK in the K frame memory FK. In generating the K image data DK, the CPU 17-1 extracts the minimum value of the pixel values of corresponding pixels of the inverted R, G, and B image data D2R, D2G, and D2B and sets the extracted minimum value of the pixel values of pixels to the pixel value of the corresponding pixel of the K image data DK. For, e.g., first pixels $D2_{R1}$, $D2_{G1}$, and $D2_{B1}$ of the inverted R, G, and B image data D2R, D2G, and D2B, the minimum value of the pixel values of the pixels $D2_{R1}$, $D2_{G1}$, and $D2_{B1}$ is set to the pixel value of a first pixel $D_{K1}$ of the K image data DK.

If at least one of the pixel values of the corresponding pixels of the inverted R, G, and B image data D2R, D2G, and D2B is "0", i.e., none of the C, M, and Y color components are present, the pixel value of a pixel of the K image data DK corresponding to that pixel is set to "0". To the contrary, if all the pixel values of the corresponding pixels of the inverted R, G, and B image data D2R, D2G, and D2B are larger than "0", i.e., all the C, M, and Y color components are present, the pixel value of a pixel of the K image data corresponding to that pixel is set to the minimum value of the density levels of the C, M, and Y color components.

The register mark TK has the C, M, and Y color components. Since the pixel values of the pixels of that portion in the inverted R, G, and B image data are large, the minimum value becomes large. However, the minimum value of the pixel values of the portions of the register marks TC, TM, and TY becomes small because the pixel values of the inverted G and B image data, the inverted R and B image data, and the inverted R and G image data are small. Hence, the register mark TK is extracted from the inverted R, G, and B image data D2R, D2G, and D2B and transferred to the K image data DK.

Figure 7A:
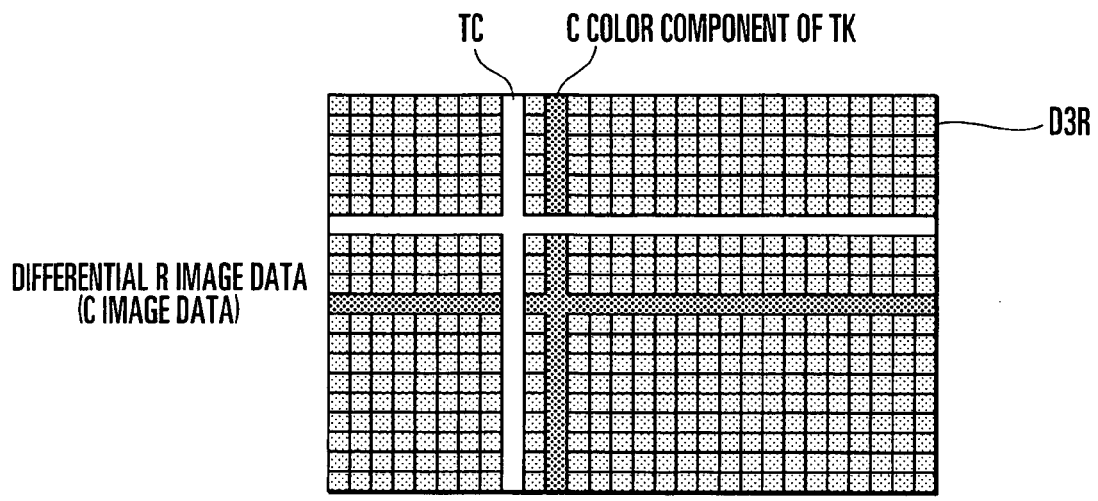
FIGS. 7A to 7C are views showing differential R, G, and B image data generated from inverted R, G, and B image data and K image data.
Figure 7B:
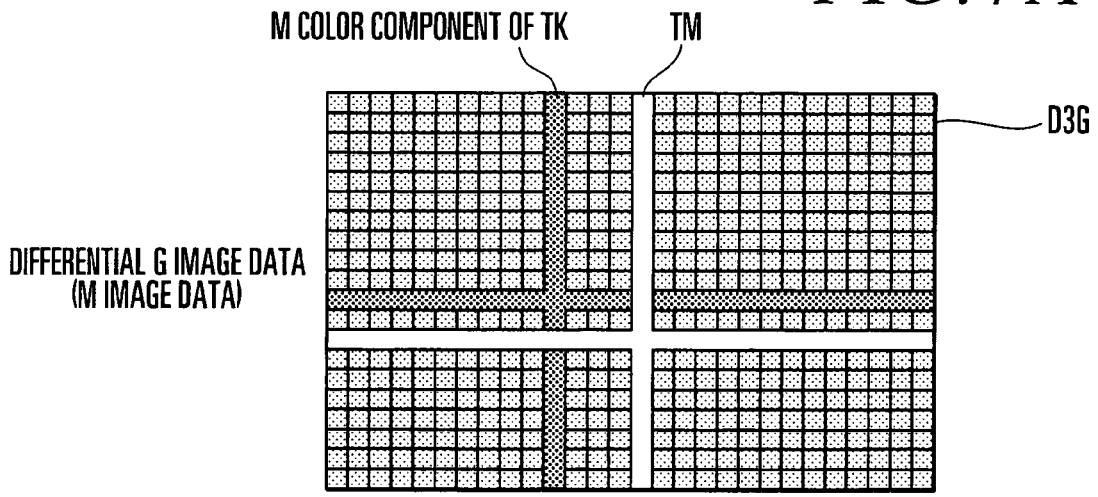
Figure 7C:
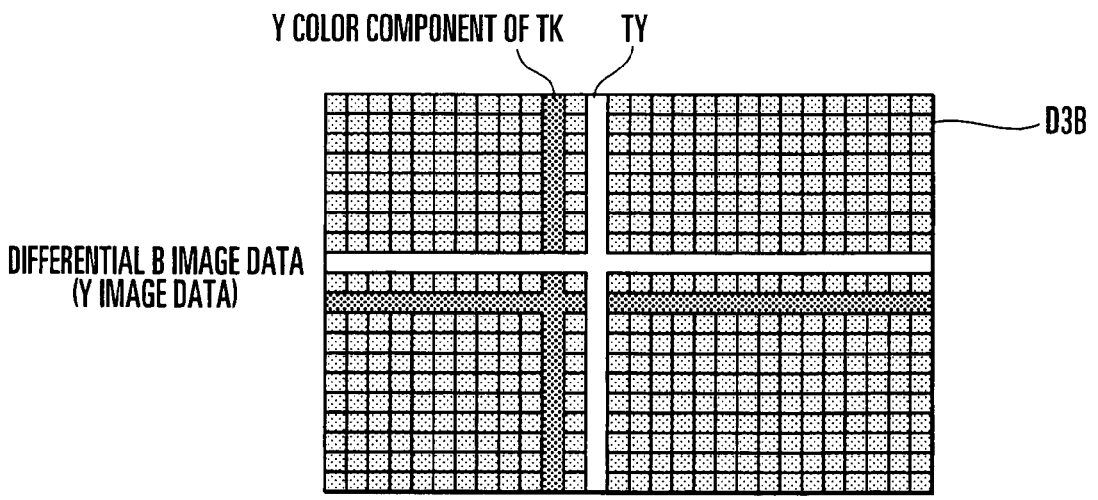

The CPU 17-1 subtracts the K image data DK from the inverted R, G, and B image data D2R, D2G, and D2B (step S203) to generate differential R, G, and B image data D3R, D3G, and D3B (FIGS. 7A to 7C) and stores them in the differential R, G, and B frame memories F3R, F3G, and F3B.

In generating the differential R, G, and B image data D3R, D3G, and D3B, the CPU 17-1 subtracts the pixel value of each pixel of the K image data DK from the pixel value of a corresponding pixel of the inverted R image data D2R to obtain the differential R image data (C image data) D3R. The CPU 17-1 subtracts the pixel value of each pixel of the K image data DK from the pixel value of a corresponding pixel of the inverted G image data D2G to obtain the differential G image data (M image data) D3G. The CPU 17-1 subtracts the pixel value of each pixel of the K image data DK from the pixel value of a corresponding pixel of the inverted B image data D2B to obtain the differential B image data (Y image data) D3B.

With this processing, in the differential R image data D3R, the C color component of the register mark TK contained in the inverted R image data D2R becomes zero or unnoticeable. Similarly, in the differential G image data D3G, the M color component of the register mark TK contained in the inverted G image data D2G becomes zero or unnoticeable. In the differential B image data D3B, the Y color component of the register mark TK contained in the inverted B image data D2B becomes zero or unnoticeable.

Figure 8A:
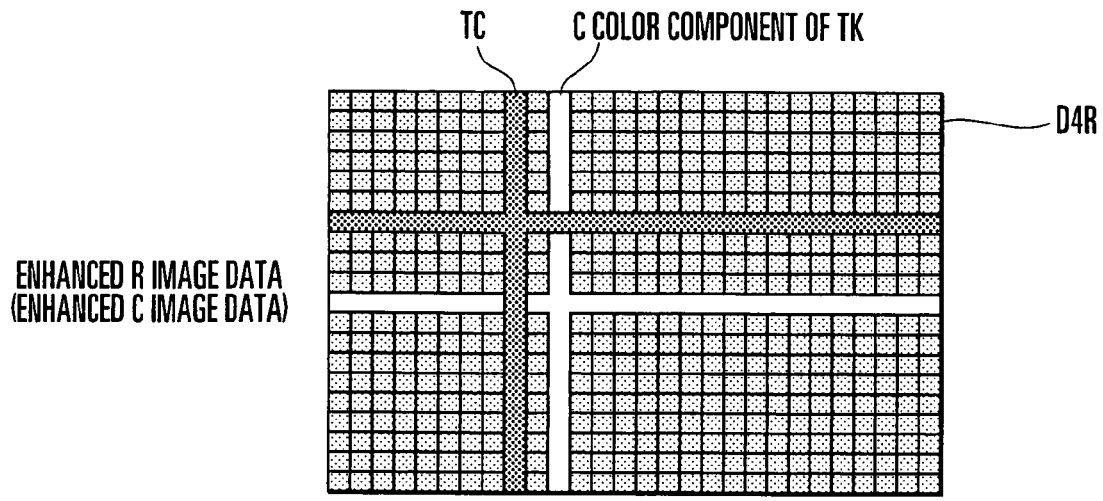
FIGS. 8A to 8C are views showing enhanced R, G, and B image data generated from inverted R, G, and B image data and differential R, G, and B image data.
Figure 8B:
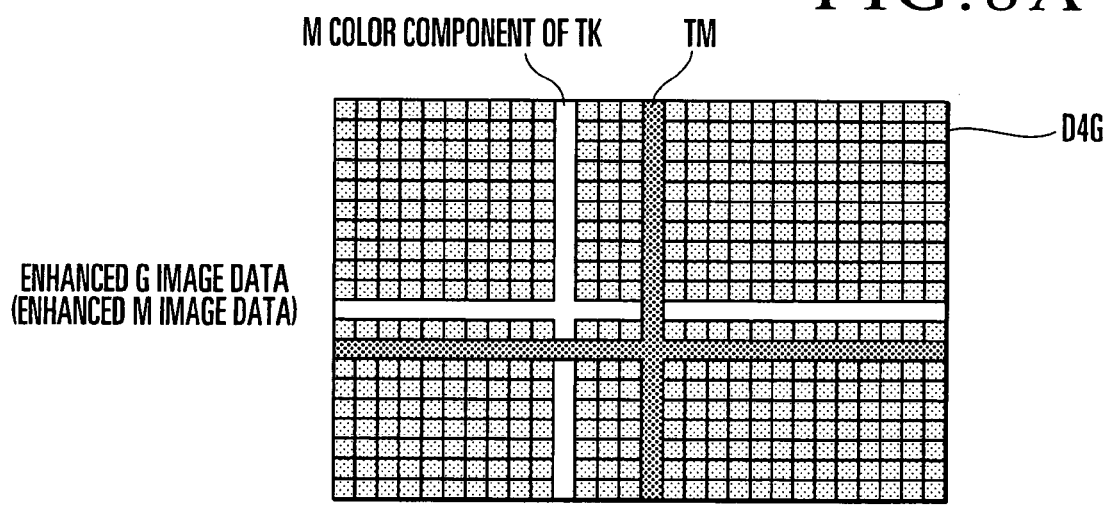
Figure 8C:
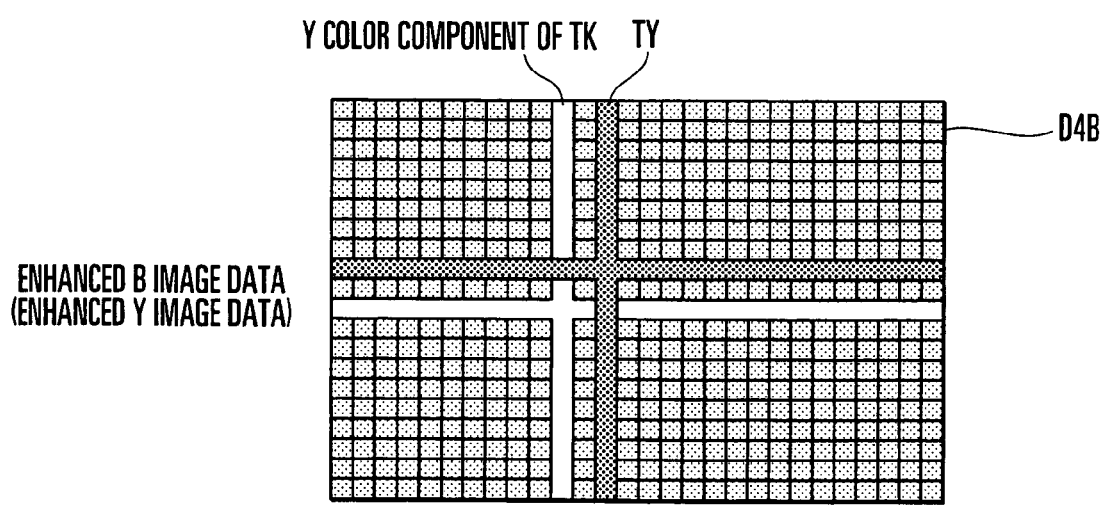

The CPU 17-1 adds the differential R, G, and B image data D3R, D3G, and D3B to the inverted R, G, and B image data D2R, D2G, and D2B (step S204) to generate enhanced R, G, and B image data D4R, D4G, and D4B (FIGS. 8A to 8C) and stores them in the enhanced R, G, and B frame memories F4R, F4G, and F4B.

In generating the enhanced R, G, and B image data D4R, D4G, and D4B, the CPU 17-1 adds the pixel value of each pixel of the differential R image data D3R to the pixel value of a corresponding pixel of the inverted R image data D2R to obtain the enhanced R image data D4R. The CPU 17-1 adds the pixel value of each pixel of the differential G image data D3G to the pixel value of a corresponding pixel of the inverted G image data D2G to obtain the enhanced G image data D4G. The CPU 17-1 adds the pixel value of each pixel of the differential B image data D3B to the pixel value of a corresponding pixel of the inverted B image data D2B to obtain the enhanced B image data D4B.

In the enhanced R image data D4R, since the density level of the register mark TC in the differential R image data D3R is added to the density level of the register mark TC in the inverted R image data D2R, the density level of the register mark TC is almost doubled, i.e., becomes much higher than the density level of the C color component of the register mark TK. Similarly, in the enhanced G image data D4G, the density level of the register mark TM becomes much higher than the density level of the M color component of the register mark TK. In the enhanced B image data D4B, the density level of the register mark TY becomes much higher than the density level of the Y color component of the register mark TK.

In this example, the pixel value of each pixel of the differential R image data D3R is added to the pixel value of each pixel of the inverted R image data D2R to generate the enhanced R image data D4R so that the density level of the register mark TC is almost doubled. Instead, the density level of the register mark TC in the enhanced R image data D4R may be increased to almost 1.5 times or almost 3 times by multiplying the pixel value of each pixel of the differential R image data D3R by a predetermined coefficient. This also applies to the enhanced G and B image data D4G and D4B. As a test result, an excellent effect is obtained by increasing the density level to twice. When the density level is increased to 1.5 times or 3 times, the effect decreases but is not zero.

[Gaussian Processing]

When the enhanced R, G, and B image data D4R, D4G, and D4B and K image data DK are obtained by the processing in step S103, the CPU 17-1 executes Gaussian processing (high-frequency removal processing using a Gaussian function) for the enhanced R, G, and B image data D4R, D4G, and D4B and K image data DK (step S104).

The Gaussian processing is described in detail in "Gaussian filter", Internet <http://if.dynsite.net/t-pot/program/79$_{13}$ Gauss/>, searched Sep. 19, 2004 (reference 2), and a description thereof will be omitted here. In actual printing, inks are not uniformly applied but have variations. For this reason, the sensed image itself also has a luminance variation. When Gaussian processing is executed for the enhanced R, G, and B image data D4R, D4G, and D4B and K image data DK to obtain a defocused image by intention, and a fine change in the pixel value is smoothly leveled, the central positions (central coordinates) of the register marks TC, TM, TY, and TK can be detected more accurately. The processing of defocusing the image itself is not limited to Gaussian processing. For example, a low-pass filter may be used.

[Averaging Line Profile (Detection of Central Positions of Register Marks)]

The CPU 17-1 calculates an averaging line profile for the enhanced R, G, and B image data D4R, D4G, and D4B and K image data DK, which have undergone the Gaussian processing, to obtain the central coordinates of the register marks TC, TM, TY, and TK (step S105).

The line profile indicates measuring the pixel values of pixels on an image on a straight line. An averaging line profile indicates obtaining, on a partial or entire surface of an image, the averaged value of the pixel values of pixels in the Y direction with respect to pixel positions in the X direction and measuring the change in the pixel value. Alternatively, the averaged value of the pixel values of pixels in the X direction is obtained with respect to pixel positions in the Y direction, and the change in the pixel value is measured.

Figure 9:
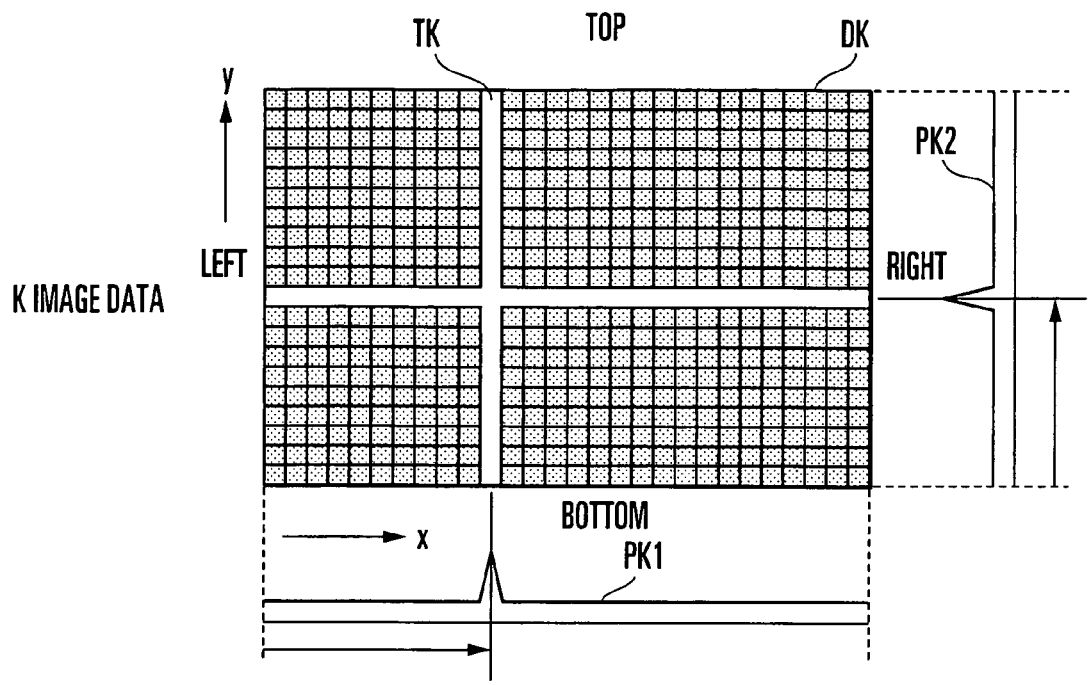
FIG. 9 is a view showing Gaussian-processed K image data and an averaging line profile curve obtained by an averaging line profile for the K image data.

FIG. 9 shows the Gaussian-processed K image data DK and an averaging line profile curve obtained by an averaging line profile for the K image data DK. The CPU 17-1 defines the circumferential direction of the Gaussian-processed K image data DK as the Y direction and the lateral direction as the X direction. The CPU 17-1 calculates the average value of the pixel values of pixels on a line in the Y direction in correspondence with each pixel position in the X direction to obtain an averaging line profile curve PK1 in the X direction. Similarly, the CPU 17-1 calculates the average value of the pixel values of pixels on a line in the X direction in correspondence with each pixel position in the Y direction to obtain an averaging line profile curve PK2 in the Y direction.

In the averaging line profile curve PK1 in the X direction, a line in which the average value of the pixel values is maximum is obtained. The position of the line is defined as the X-coordinate of the center of the register mark TK. In the averaging line profile curve PK2 in the Y direction, a line in which the average value of the pixel values is maximum is obtained. The position of the line is defined as the Y-coordinate of the center of the register mark TK.

Figure 10:
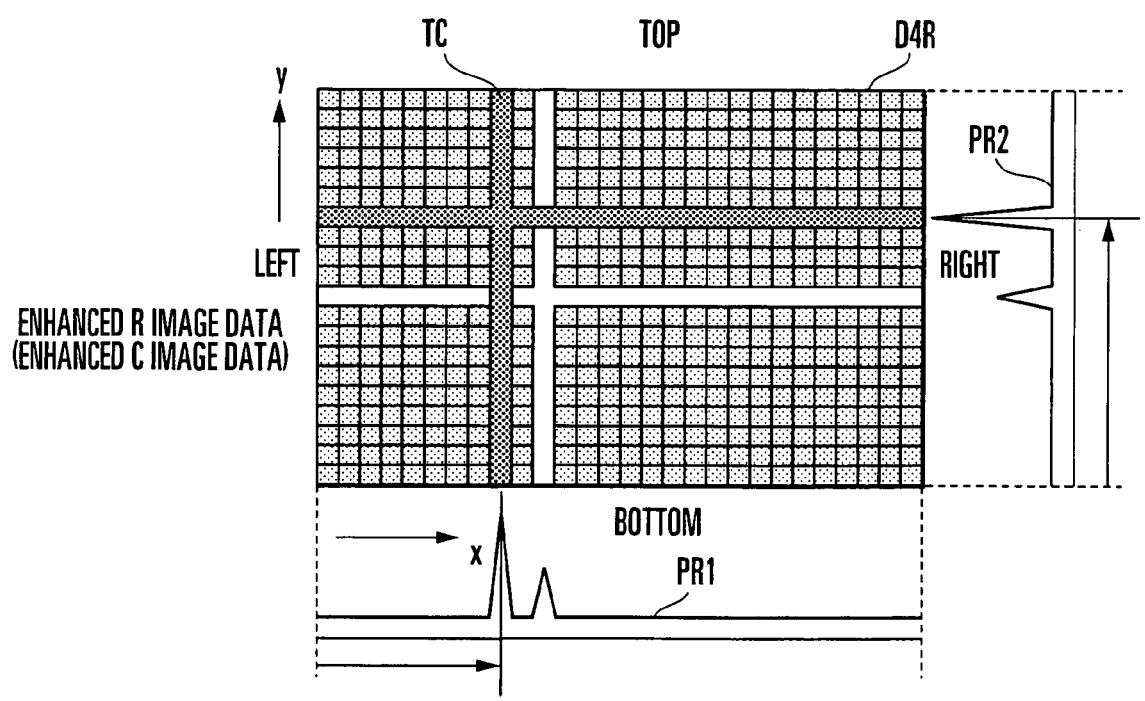
FIG. 10 is a view showing Gaussian-processed enhanced R image data and an averaging line profile curve obtained by an averaging line profile for the enhanced R image data.

FIG. 10 shows the Gaussian-processed enhanced R image data D4R and an averaging line profile curve obtained by an averaging line profile for the enhanced R image data D4R. The CPU 17-1 defines the circumferential direction of the Gaussian-processed enhanced R image data D4R as the Y direction and the lateral direction as the X direction. The CPU 17-1 calculates the average value of the pixel values of pixels on a line in the Y direction in correspondence with each pixel position in the X direction to obtain an averaging line profile curve PR1 in the X direction. Similarly, the CPU 17-1 calculates the average value of the pixel values of pixels on a line in the X direction in correspondence with each pixel position in the Y direction to obtain an averaging line profile curve PR2 in the Y direction.

In the averaging line profile curve PR1 in the X direction, a line in which the average value of the pixel values is maximum is obtained. The position of the line is defined as the X-coordinate of the center of the register mark TC. In the averaging line profile curve PR2 in the Y direction, a line in which the average value of the pixel values is maximum is obtained. The position of the line is defined as the Y-coordinate of the center of the register mark TC.

Figure 11:
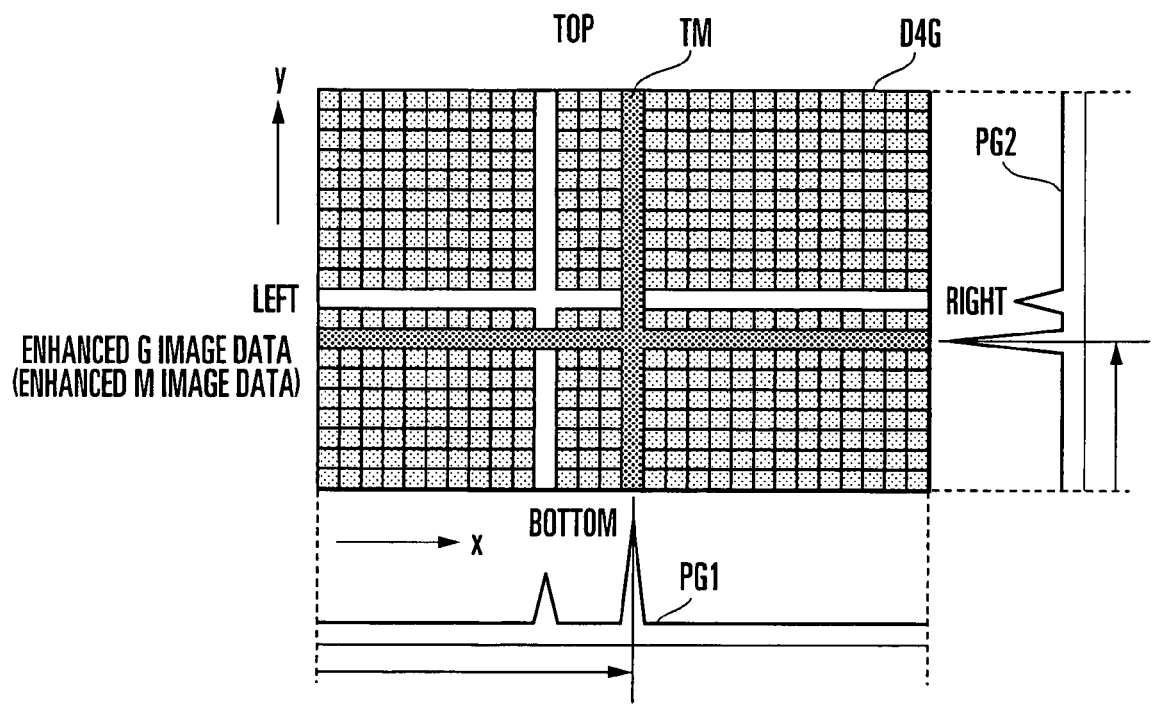
FIG. 11 is a view showing Gaussian-processed enhanced G image data and an averaging line profile curve obtained by an averaging line profile for the enhanced G image data.

FIG. 11 shows the Gaussian-processed enhanced G image data D4G and an averaging line profile curve obtained by an averaging line profile for the enhanced G image data D4G. The CPU 17-1 defines the circumferential direction of the Gaussian-processed enhanced G image data D4G as the Y direction and the lateral direction as the X direction. The CPU 17-1 calculates the average value of the pixel values of pixels on a line in the Y direction in correspondence with each pixel position in the X direction to obtain an averaging line profile curve PG1 in the X direction. Similarly, the CPU 17-1 calculates the average value of the pixel values of pixels on a line in the X direction in correspondence with each pixel position in the Y direction to obtain an averaging line profile curve PG2 in the Y direction.

In the averaging line profile curve PG1 in the X direction, a line in which the average value of the pixel values is maximum is obtained. The position of the line is defined as the X-coordinate of the center of the register mark TM. In the averaging line profile curve PG2 in the Y direction, a line in which the average value of the pixel values is maximum is obtained. The position of the line is defined as the Y-coordinate of the center of the register mark TM.

Figure 12:
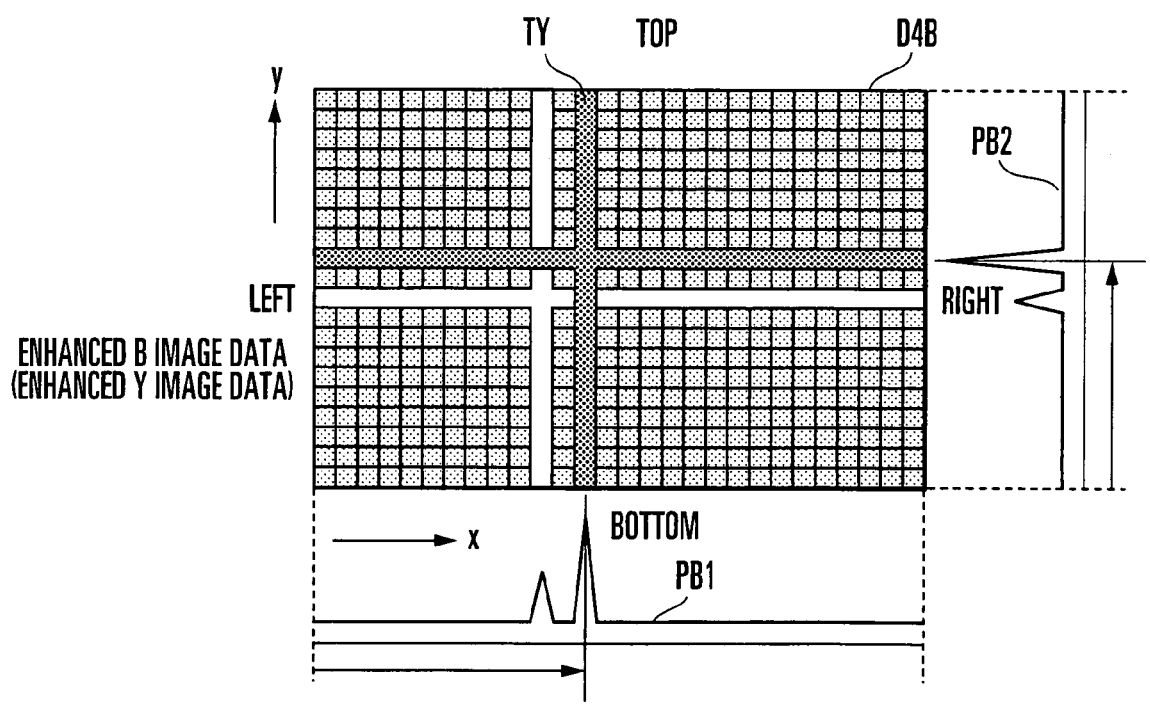
FIG. 12 is a view showing Gaussian-processed enhanced B image data and an averaging line profile curve obtained by an averaging line profile for the enhanced B image data.

FIG. 12 shows the Gaussian-processed enhanced B image data D4B and an averaging line profile curve obtained by an averaging line profile for the enhanced B image data D4B. The CPU 17-1 defines the circumferential direction of the Gaussian-processed enhanced B image data D4B as the Y direction and the lateral direction as the X direction. The CPU 17-1 calculates the average value of the pixel values of pixels on a line in the Y direction in correspondence with each pixel position in the X direction to obtain an averaging line profile curve PB1 in the X direction. Similarly, the CPU 17-1 calculates the average value of the pixel values of pixels on a line in the X direction in correspondence with each pixel position in the Y direction to obtain an averaging line profile curve PB2 in the Y direction.

In the averaging line profile curve PB1 in the X direction, a line in which the average value of the pixel values is maximum is obtained. The position of the line is defined as the X-coordinate of the center of the register mark TY. In the averaging line profile curve PB2 in the Y direction, a line in which the average value of the pixel values is maximum is obtained. The position of the line is defined as the Y-coordinate of the center of the register mark TY.

[Calculation of Misregister Amount]

On the basis of the central coordinates of the register marks TC, TM, TY, and TK obtained in step S105, the CPU 17-1 obtains the misregister amounts in the circumferential and lateral directions between C, M, Y, and K (step S106). For example, the circumferential and lateral shifts of the central coordinates of the register mark TC with respect to the central coordinates of the register mark TK are obtained as the misregister amounts of C with respect to K in the circumferential and lateral directions. Similarly, the circumferential and lateral shifts of the central coordinates of the register mark TM with respect to the central coordinates of the register mark TK are obtained as the misregister amounts of M with respect to K in the circumferential and lateral directions. The circumferential and lateral shifts of the central coordinates of the register mark TY with respect to the central coordinates of the register mark TK are obtained as the misregister amounts of Y with respect to K in the circumferential and lateral directions.

[Correction of Plate Cylinder Position]

The CPU 17-1 drives motors 15 while receiving feedback of position data from potentiometers 16 to correct the position of the plate cylinder in each color printing unit such that the misregister amounts obtained in step S106 become zero (step S107).

[Reason to Obtain Enhanced R, G, and B Image Data]

In the example shown in FIG. 3A, all the printed register marks TC, TM, TY, and TK are shifted in the circumferential direction for the descriptive convenience. In this case, in the differential R, G, and B image data, the whole regions of the cross-shaped register marks TC, TM, and TY are extracted as regions with a density level higher than other pixels, as in the differential R, G, and B image data D3R, D3G, and D3B shown in FIGS. 7A to 7C. However, if, e.g., the register marks TK and TC partially overlap, the density level of the register mark TC in the differential R image data D3R becomes low in the overlapping portion. This also applies to the differential G and B image data D3G and D3B.

Figure 3B:
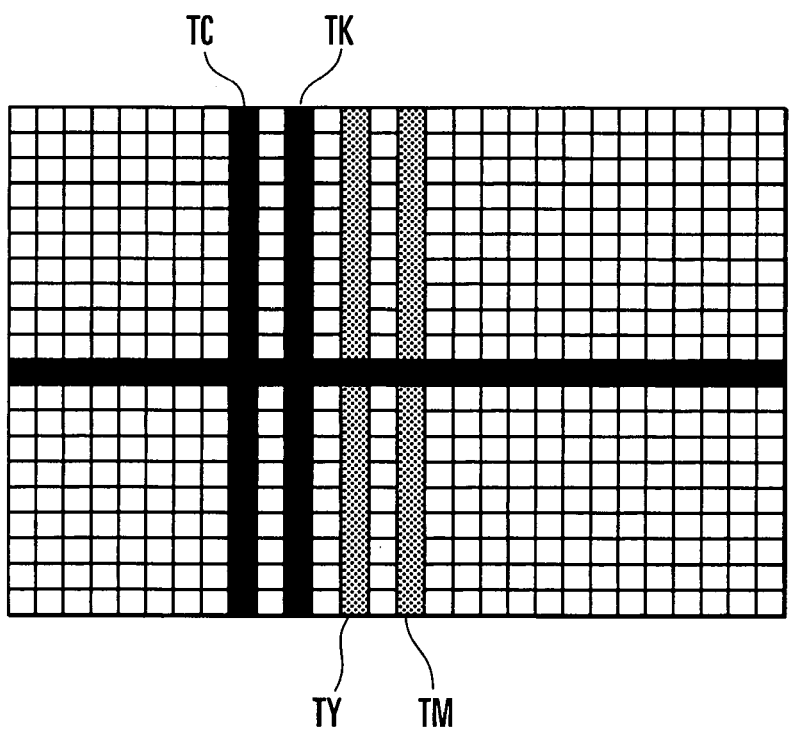
Figure 13A:
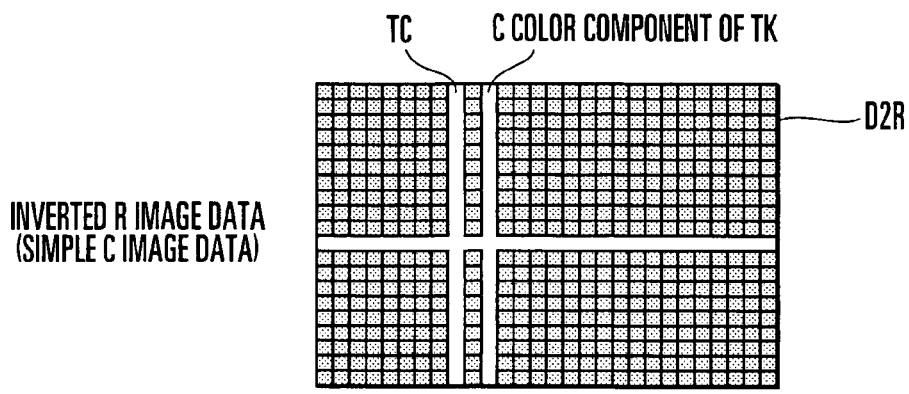
FIGS. 13A to 13D are views showing inverted R, G, and B image data and K image data which are obtained when all cross-shaped register marks TC, TM, TY, and TK are printed in a superimposed manner in the lateral direction.
Figure 13B:
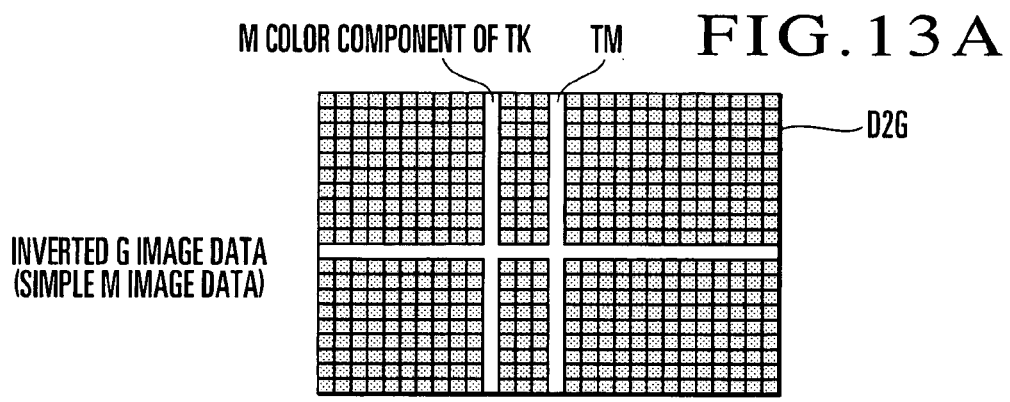
Figure 13C:
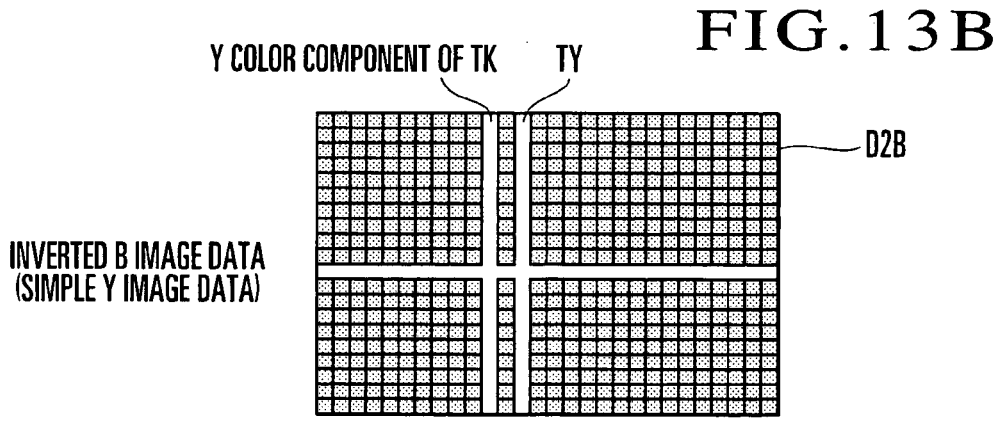
Figure 13D:
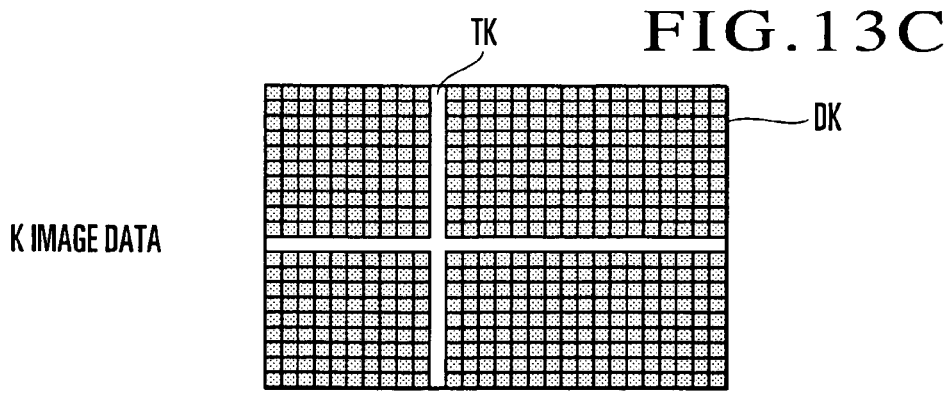

For example, assume that the lateral parts of all the printed cross-shaped register marks TC, TM, TY, and TK overlap, as shown in FIG. 3B. In this case, the inverted R, G, and B image data become the inverted R, G, and B image data D2R, D2G, and D2B shown in FIGS. 13A to 13C, respectively. K image data generated from the inverted R, G, and B image data D2R, D2G, and D2B is the K image data DK shown in FIG. 13D.

Figure 14A:
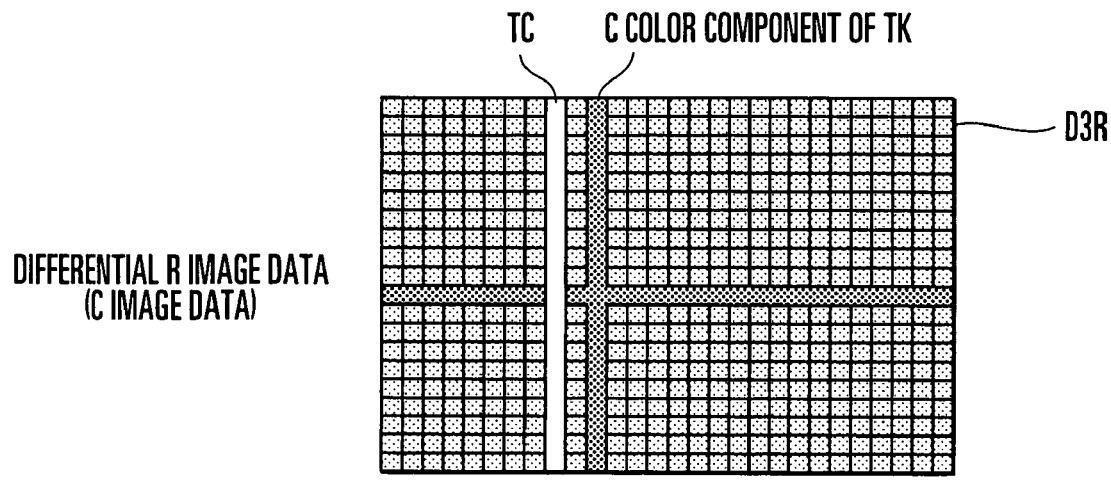
FIGS. 14A to 14C are views showing differential R, G, and B image data generated from the inverted R, G, and B image data and K image data.
Figure 14B:
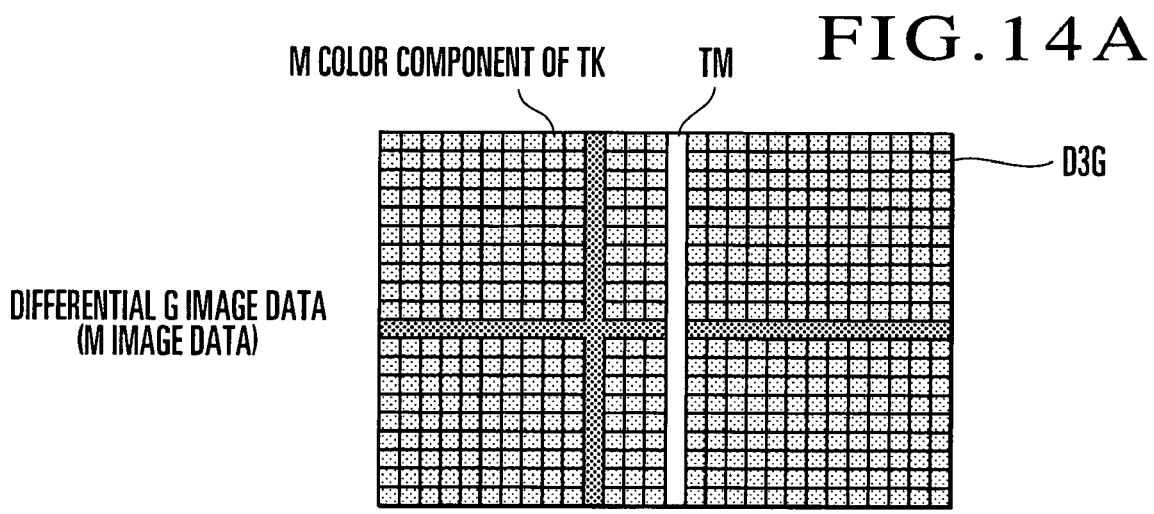
Figure 14C:
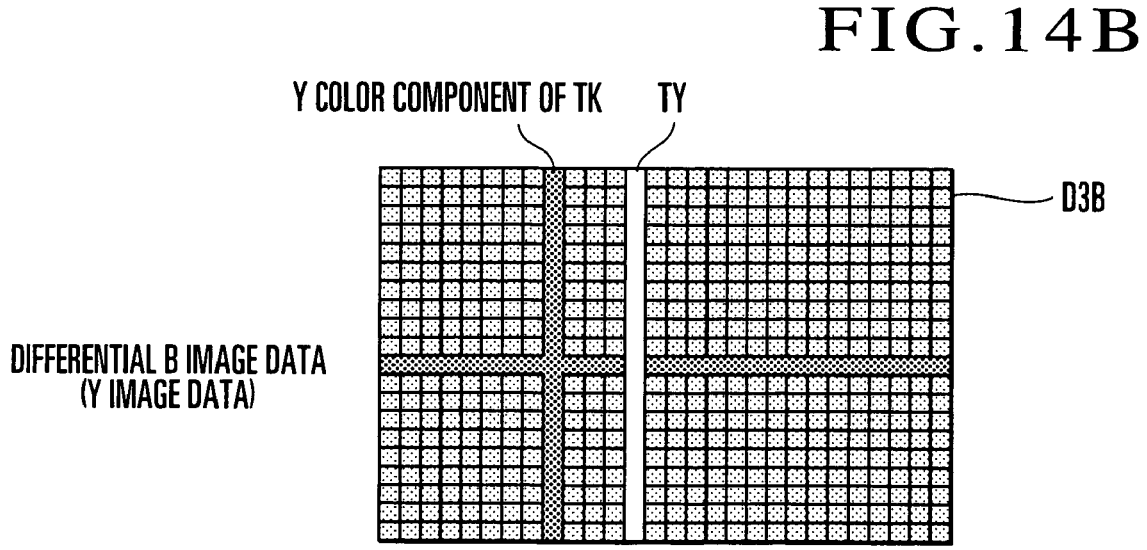

Hence, the differential R, G, and B image data obtained by subtracting the K image data DK from the inverted R, G, and B image data D2R, D2G, and D2B are the differential R, G, and B image data D3R, D3G, and D3B shown in FIGS. 14A to 14C. Only the circumferential parts of the cross-shaped register marks TC, TM, and TY are extracted as parts with a density level higher than other pixels. The density level of the lateral parts becomes zero or unnoticeable, like the C, M, and Y color components of the register mark TK. The central coordinates of the register marks TC, TM, and TY in the lateral direction can be obtained from the differential R, G, and B image data D3R, D3G, and D3B, although the central coordinates in the circumferential direction cannot be obtained.

Figure 15A:
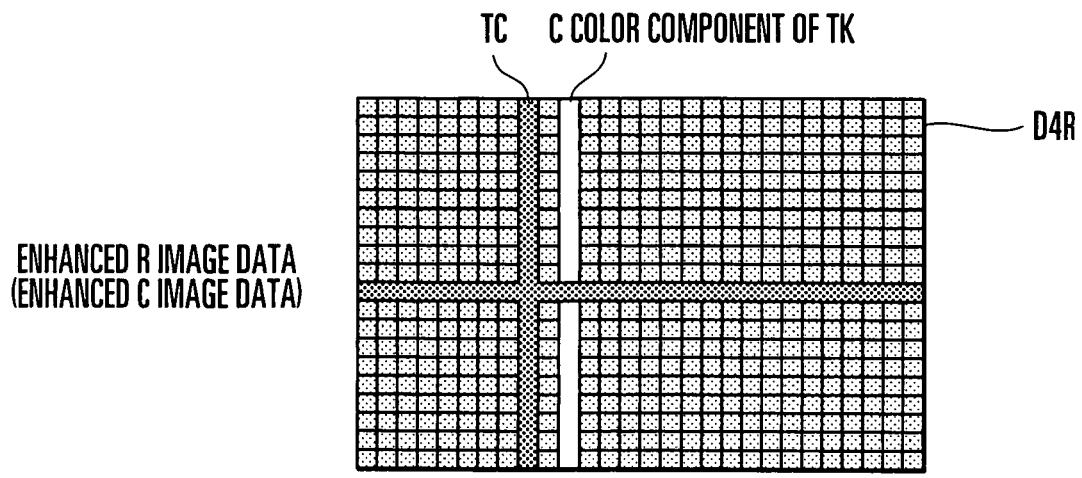
FIGS. 15A to 15C are views showing enhanced R, G, and B image data generated from the inverted R, G, and B image data and differential R, G, and B image data.
Figure 15B:
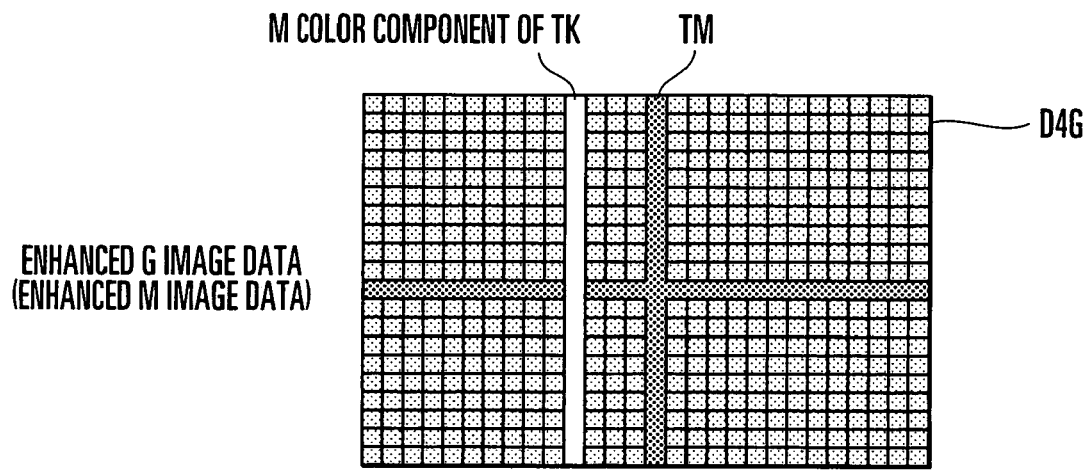
Figure 15C:
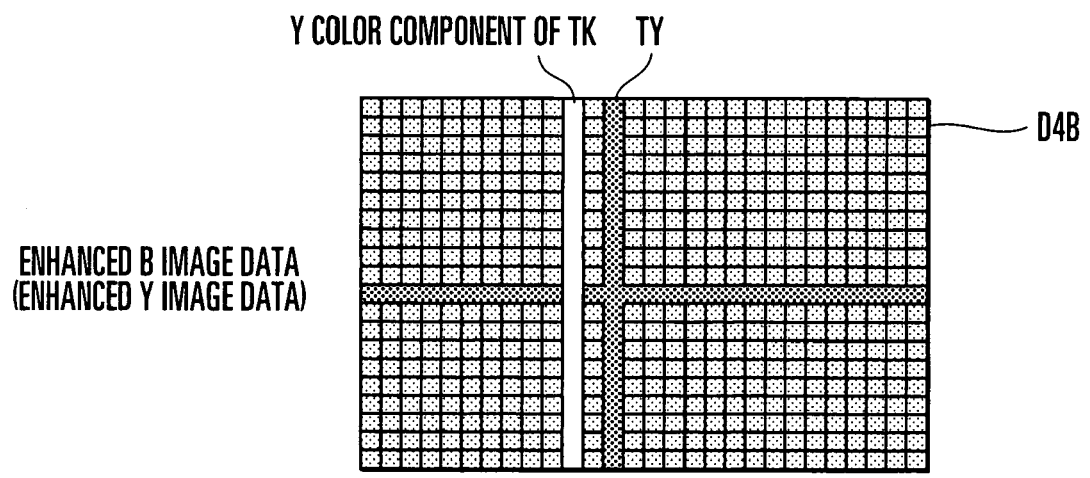

In this embodiment, the pixel value of each pixel of the differential R image data D3R is added to the pixel value of a corresponding pixel of the inverted R image data D2R to obtain the enhanced R image data D4R (FIG. 15A). Similarly, the pixel value of each pixel of the differential G image data D3G is added to the pixel value of a corresponding pixel of the inverted G image data D2G to obtain the enhanced G image data D4G (FIG. 15B). The pixel value of each pixel of the differential B image data D3B is added to the pixel value of a corresponding pixel of the inverted B image data D2B to obtain the enhanced B image data D4B (FIG. 15C).

In the enhanced R image data D4R, the density level of the circumferential part of the register mark TC in the differential R image data D3R is added to the density level of the circumferential part of the register mark TC in the inverted R image data D2R. Hence, the density level of the circumferential part of the register mark TC is almost doubled. Additionally, in the overlapping portion (the lateral part in this case) between the register marks TC and TK, the density level of the C color component in the inverted R image data D2R is high. The density level of C of the overlapping portion between the register marks TC and TK remaining in the differential R image data D3R is added to the overlapping portion with the high density level. Hence, the density level is high in the entire region of the register mark TC.

Even in the enhanced G and B image data D4G and D4B, the density level is high in the entire region of the register marks TM and TY, like the enhanced R image data D4R. For this reason, not only the central coordinates of the register marks TC, TM, and TY in the lateral direction but also the central coordinates of the register marks TC, TM, and TY in the circumferential direction can be obtained. Hence, the central coordinates of the register marks TC, TM, and TY can be obtained accurately.

In the above-described example, the lateral parts of the printed cross-shaped register marks TC, TM, TY, and TK overlap. The same processing as described above is executed even when the circumferential parts overlap. The register mark TK and the register marks TC, TM, and TY can overlap in various ways. However, when the enhanced R, G, and B image data are obtained in the above-described manner, the central coordinates of the register marks TC, TM, and TY can always accurately be obtained.

Figure 2:
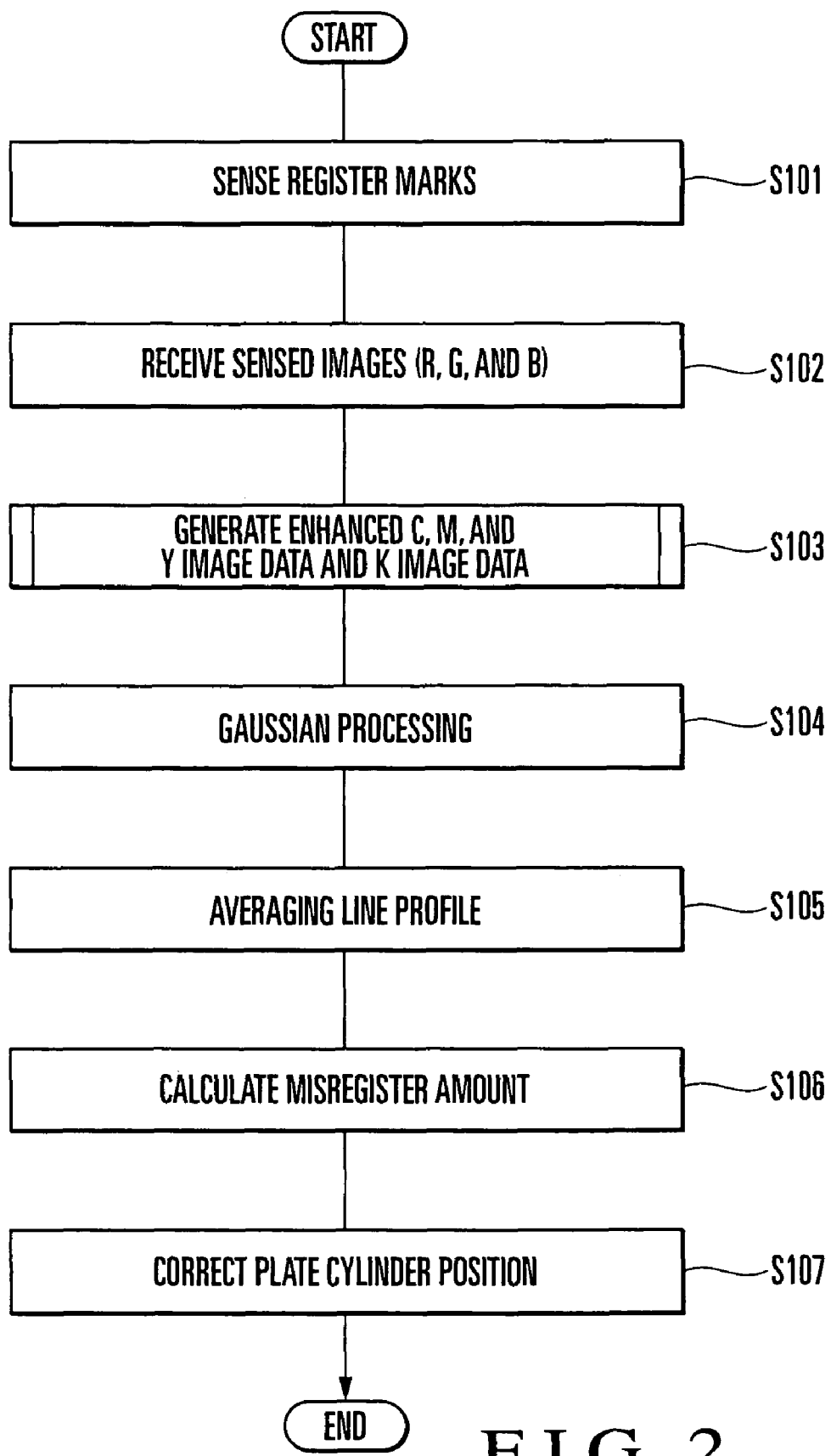
FIG. 2 is a schematic flowchart of a misregister amount detection operation executed by the CPU of the misregister amount detection apparatus shown in FIG. 1.
Figure 16:
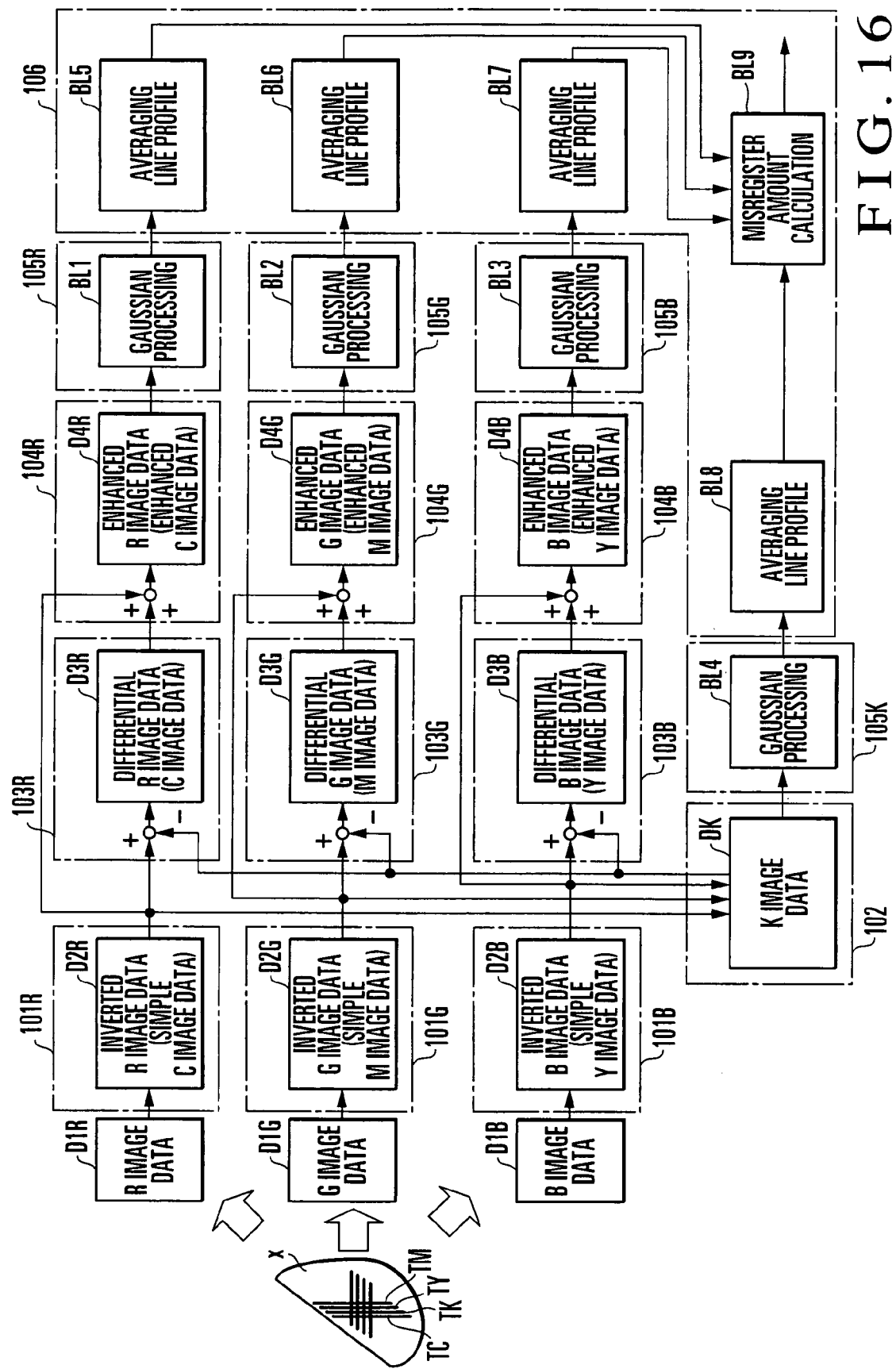
FIG. 16 is a block diagram of the first embodiment which executes processing (inverting scheme) according to the flowchart shown in FIG. 2.

FIG. 16 shows a configuration to execute the processing flow according to the flowcharts shown in FIGS. 2 and 5. When the image portion X where the register marks TC, TM, TY, and TK are printed is sensed by the camera 17-6 serving as an image sensing means shown in FIG. 1, the R, G, and B image data D1R, D1G, and D1B are obtained. The data inverting units 101R, 101G, and 101B invert the R, G, and B image data D1R, D1G, and D1B to obtain the inverted R, G, and B image data D2R, D2G, and D2B. That is, the data inverting units 101R, 101G, and 101B execute the processing in step S201 shown in FIG. 5. The camera 17-6 and data inverting units 101R, 101G, and 101B constitute a data output means.

A data conversion unit 102 generates the K image data DK from the inverted R, G, and B image data D2R, D2G, and D2B. That is, the data conversion unit 102 executes the processing in step S202 shown in FIG. 5.

A first calculation unit 103R generates the differential R image data D3R by subtracting the K image data DK from the inverted R image data D2R. A first calculation unit 103G generates the differential G image data D3G by subtracting the K image data DK from the inverted G image data D2G. A first calculation unit 103B generates the differential B image data D3B by subtracting the K image data DK from the inverted B image data D2B. That is, the first calculation units 103R, 103G, and 103B execute the processing in step S203 shown in FIG. 5.

A second calculation unit 104R generates the enhanced R image data D4R by adding the differential R image data D3R to the inverted R image data D2R. A second calculation unit 104G generates the enhanced G image data D4G by adding the differential G image data D3G to the inverted G image data D2G. A second calculation unit 104B generates the enhanced B image data D4B by adding the differential B image data D3B to the inverted B image data D2B. That is, the second calculation units 104R, 104G, and 104B execute the processing in step S204 shown in FIG. 5.

Gaussian processing units 105R, 105G, 105B, and 105K execute Gaussian processing BL1 to BL4 for the enhanced R, G, and B image data D4R, D4G, and D4B and K image data DK, respectively. That is, the Gaussian processing units 105R, 105G, 105B, and 105K execute the processing in step S104 shown in FIG. 2.

A third calculation unit 106 calculates averaging line profiles BL5 to BL8 for the enhanced R, G, and B image data D4R, D4G, and D4B and K image data DK which have undergone the Gaussian processing. The third calculation unit 106 also executes misregister amount calculation BL9 in the circumferential and lateral directions between the colors on the basis of the central coordinates of the register marks TC, TM, TY, and TK obtained by the averaging line profiles BL5 to BL8. That is, the third calculation unit 106 executes the processing in steps S105 and S106 shown in FIG. 2.

Second Embodiment

Noninverting Scheme

In the first embodiment, the R, G, and B image data D1R, D1G, and D1B are inverted to obtain the inverted R, G, and B image data D2R, D2G, and D2B. Processing is executed by using the inverted R, G, and B image data D2R, D2G, and D2B as simple C, M, and Y image data. Instead, the data inverting units 101R, 101G, and 101B may be omitted not to invert the R, G, and B image data D1R, D1G, and D1B. In this case, processing is executed by using the R, G, and B image data D1R, D1G, and D1B as simple C, M, and Y image data.

Figure 17:
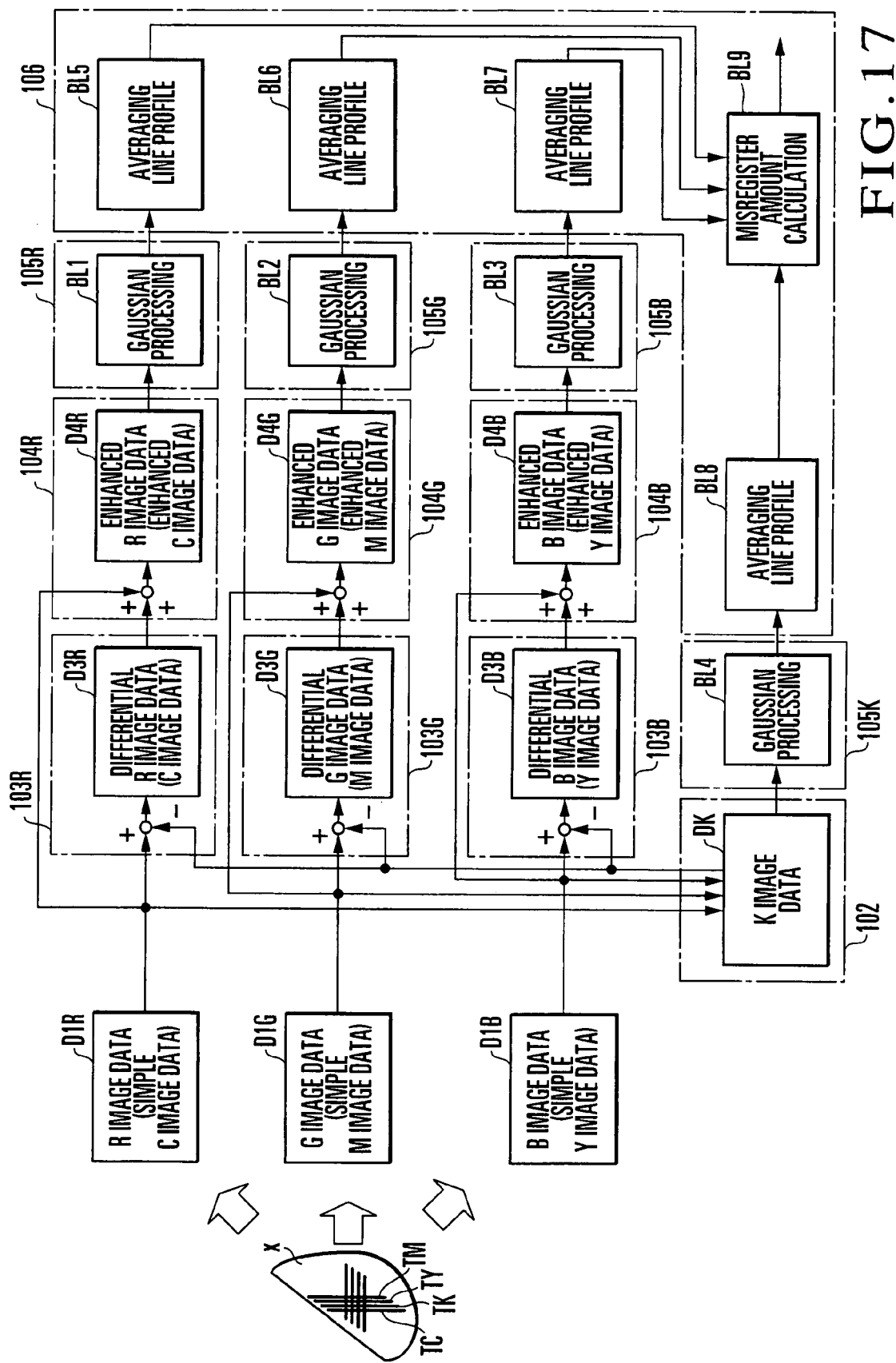
FIG. 17 is a block diagram of the second embodiment using the noninverting scheme.

In the noninverting scheme, as shown in FIG. 17, a data conversion unit 102 generates K image data DK from R, G, and B image data D1R, D1G, and D1B output from a camera 17-6 (FIG. 1) serving as a data output means. In generating the K image data DK, the maximum value of the pixel values of corresponding pixels of the R, G, and B image data D1R, D1G, and D1B is extracted. The extracted maximum value of the pixel values of the pixels is set to the pixel value of a corresponding pixel of the K image data DK.

A first calculation unit 103R obtains differential R image data D3R by subtracting the pixel value of each pixel of the K image data DK from the pixel value of a corresponding pixel of the R image data D1R. A first calculation unit 103G obtains differential G image data D3G by subtracting the pixel value of each pixel of the K image data DK from the pixel value of a corresponding pixel of the G image data D1G. A first calculation unit 103B obtains differential B image data D3B by subtracting the pixel value of each pixel of the K image data DK from the pixel value of a corresponding pixel of the B image data D1B. At this time, most pixels of the differential R, G, and B image data D3R, D3G, and D3B have negative pixel values. The pixel values are stored in differential R, G, and B frame memories F3R, F3G, and F3B.

A second calculation unit 104R generates enhanced R image data D4R by adding the pixel value of each pixel of the differential R image data D3R to the pixel value of a corresponding pixel of the R image data D1R. A second calculation unit 104G generates enhanced G image data D4G by adding the pixel value of each pixel of the differential G image data D3G to the pixel value of a corresponding pixel of the G image data D1G. A second calculation unit 104B generates enhanced B image data D4B by adding the pixel value of each pixel of the differential B image data D3B to the pixel value of a corresponding pixel of the B image data D1B.

Gaussian processing units 105R, 105G, 105B, and 105K execute Gaussian processing operations BL1 to BL4 for the enhanced R, G, and B image data D4R, D4G, and D4B and K image data DK, respectively. A third calculation unit 106 calculates averaging line profiles BL5 to BL8 for the enhanced R, G, and B image data D4R, D4G, and D4B and K image data DK which have undergone the Gaussian processing. The third calculation unit 106 also executes misregister amount calculation BL9 in the circumferential and lateral directions between the colors on the basis of the central coordinates of register marks TC, TM, TY, and TK obtained by the averaging line profile.

Even in the second embodiment, the correspondence between FIG. 17 and FIGS. 2 and 5 is the same as that between FIG. 16 and FIGS. 2 and 5 except step S201 in FIG. 5.

In the averaging line profile of this case, for each of the enhanced R, G, and B image data D4R, D4G, and D4B and K image data DK, a line in which the average value of the pixel values of pixels on a line in the lateral direction is minimum is obtained. The central coordinates of the register marks TC, TM, TY, and TK in the circumferential direction are obtained from the position of the obtained lines. In addition, for each of the enhanced R, G, and B image data D4R, D4G, and D4B and K image data DK, a line in which the average value of the pixel values of pixels on a line in the circumferential direction is minimum is obtained. The central coordinates of the register marks TC, TM, TY, and TK in the lateral direction are obtained from the positions of the obtained lines.

In the above-described first and second embodiments, the register mark of each color is a cross-shaped register mark.

However, the present invention is not limited to the cross-shaped register mark. A mask having a straight line portion in only the circumferential direction or in the lateral direction may be used. In the above-described first and second embodiments, printing is executed in four C, M, Y, and K colors. The present invention can also be applied even when printing is executed in three C, M, and Y colors. In this case, the processing block BL9 obtains the misregister amount between the colors from the pixel values of pixels of the enhanced R, G, and B image data D4R, D4G, and D4B.

That is, printing is sometimes executed in three C, M, and Y colors by using gray obtained by superimposing C, M, and Y in place of K. In such a case, the portion where the C, M, and Y marks overlap is transferred to the K image data DK as the K color component. In this case, the K image data DK is used to generate the differential R, G, and B image data D3R, D3G, and D3B but need not be used to detect the misregister amount between the three C, M, and Y colors. The Gaussian processing is executed for only the enhanced R, G, and B image data D4R, D4G, and D4B and need not be executed for the K image data DK.

Figure 18:
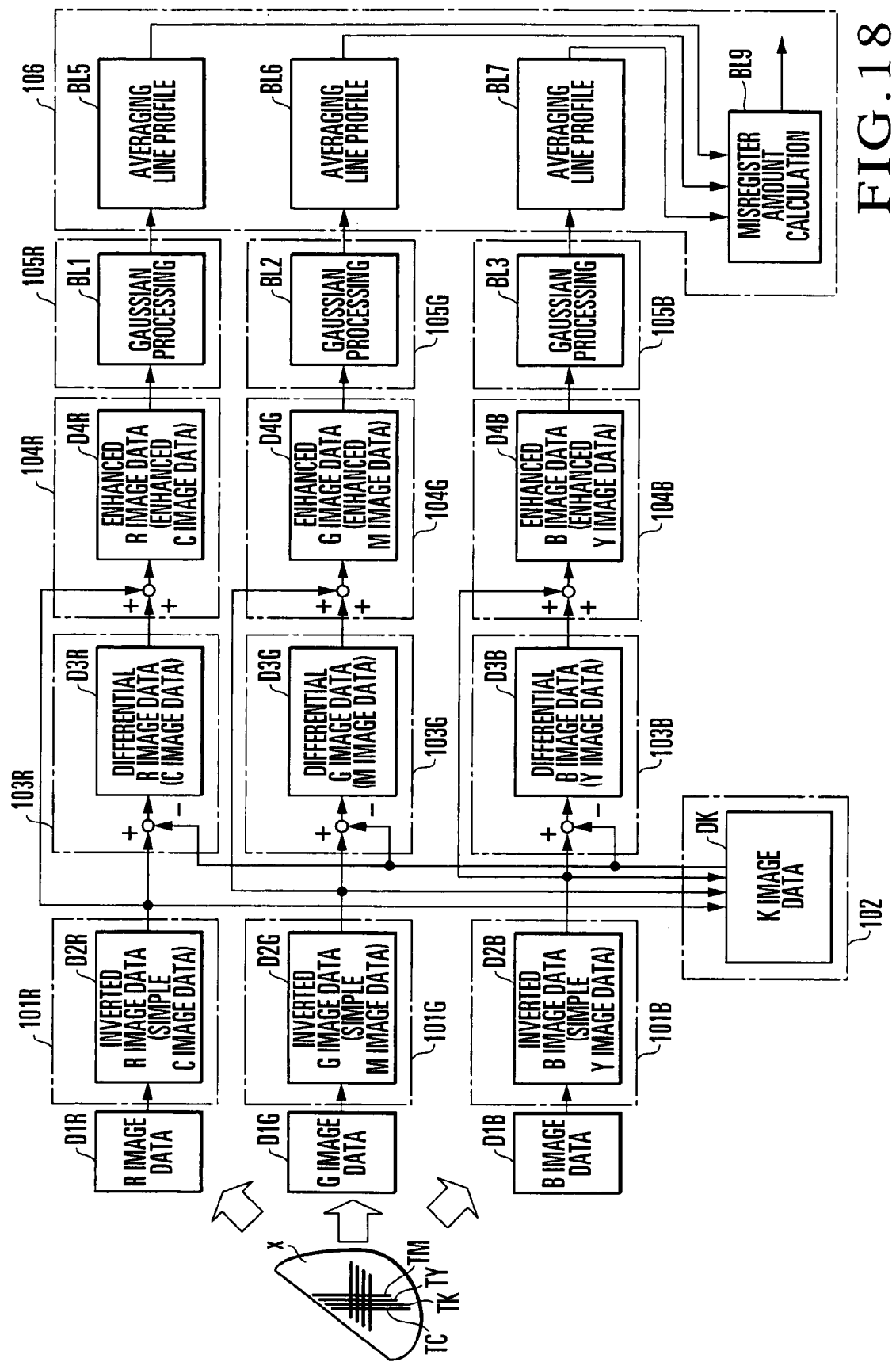
FIG. 18 is a block diagram of the third embodiment which prints three C, M, and Y colors.
Figure 19:
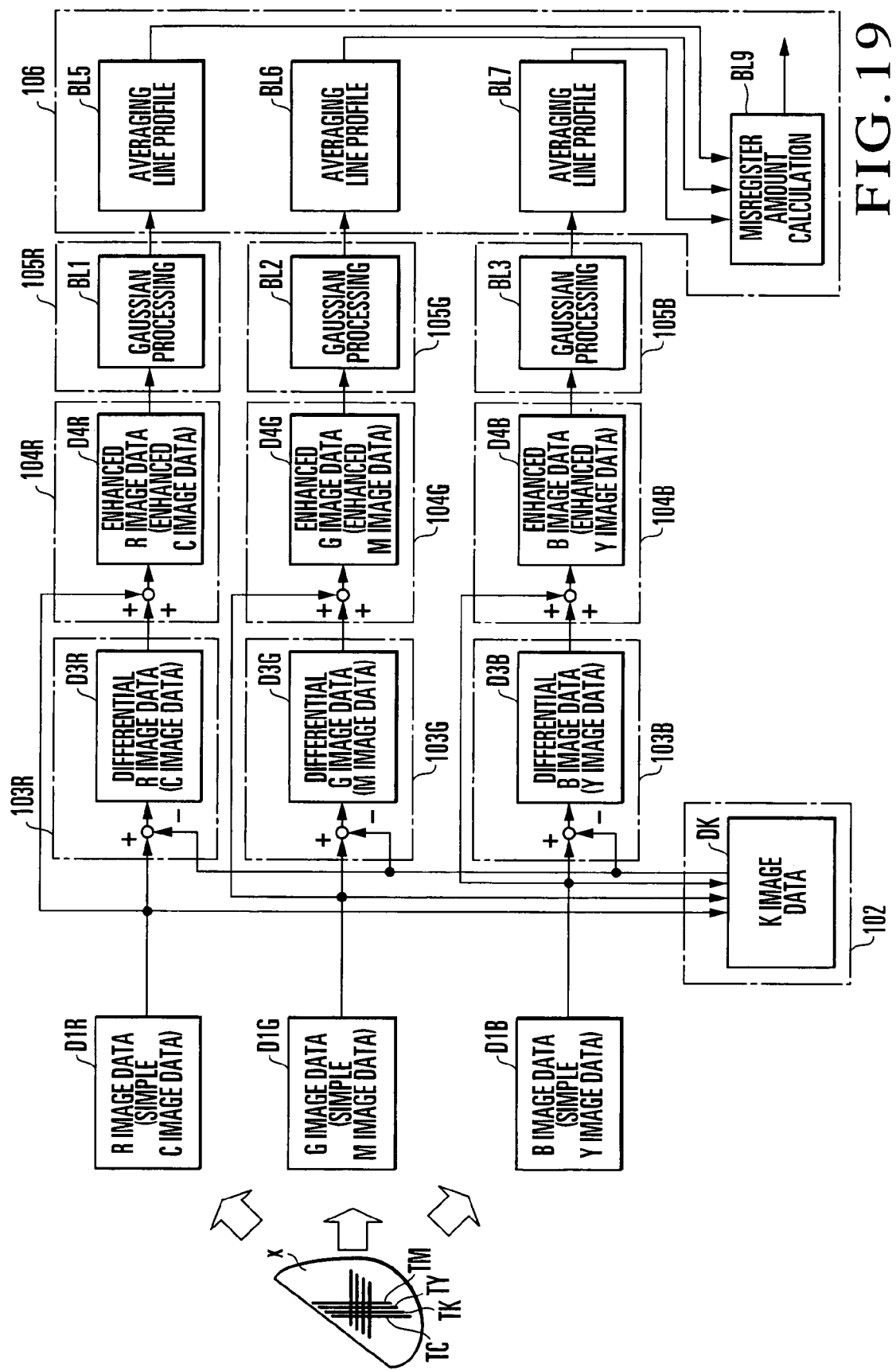
FIG. 19 is a block diagram of the fourth embodiment which prints three C, M, and Y colors.

More specifically, in printing using the three C, M, and Y colors, as shown in FIGS. 18 and 19, the K image data DK is not used for calculation of the misregister amount between the colors in the processing block BL9. Hence, the processing block BL4 to execute Gaussian processing for the K image data DK and the processing block BL8 to calculate an averaging line profile for the K image data DK are omitted.

As is apparent from the above description, in the first embodiment, the K image data DK is generated from the inverted R, G, and B image data D2R, D2G, and D2B without setting any threshold value. The differential R, G, and B image data D3R, D3G, and D3B are obtained from the K image data DK and inverted R, G, and B image data D2R, D2G, and D2B. The enhanced R, G, and B image data D4R, D4G, and D4B are obtained from the differential R, G, and B image data D3R, D3G, and D3B and inverted R, G, and B image data D2R, D2G, and D2B.

In the second embodiment, the K image data DK is generated from the R, G, and B image data D1R, D1G, and D1B without setting any threshold value. The differential R, G, and B image data D3R, D3G, and D3B are obtained from the K image data DK and R, G, and B image data D1R, D1G, and D1B. The enhanced R, G, and B image data D4R, D4G, and D4B are obtained from the differential R, G, and B image data D3R, D3G, and D3B and R, G, and B image data D1R, D1G, and D1B.

With these arrangements, the misregister amount between the colors can accurately be obtained regardless of the difference in color density between actual printing products.

In the first and second embodiments, the central coordinates of the register marks TC, TM, TY, and TK are obtained by an averaging line profile. More specifically, the central coordinates of the register marks TC, TM, TY, and TK are obtained by unique image processing and pixel value (luminance value) accumulation based on only image data without determining the presence/absence of a pixel by binarization based on a predetermined slice level. For this reason, the central coordinates of the register marks TC, TM, TY, and TK can accurately be obtained regardless of the difference in color density between actual printing products. This also contributes to accurate misregister amount detection between the colors.

Detailed Example of First Embodiment

Figure 20:
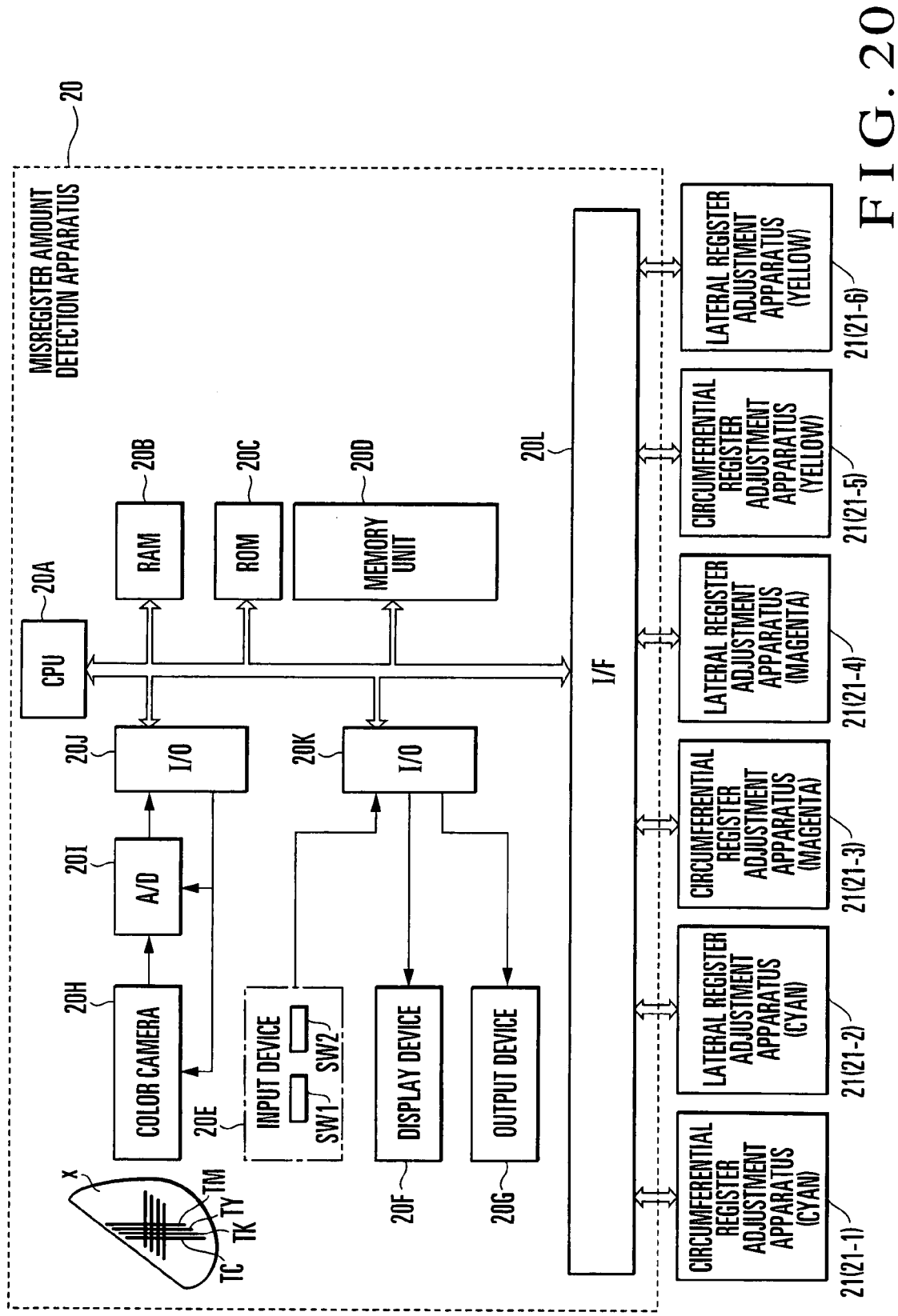
FIG. 20 is a block diagram of the automatic registration apparatus of a printing press to which a misregister amount detection apparatus as a more detailed example of the first embodiment shown in FIG. 16 is applied.

FIG. 20 shows the automatic registration apparatus of a printing press to which a misregister amount detection apparatus as a more detailed example of the above-described first embodiment is applied. In this automatic registration apparatus, a misregister amount detection apparatus 20 comprises a CPU 20A, RAM 20B, ROM 20C, memory unit 20D, input device 20E, display device 20F, output device 20G, camera (color camera) 20H, A/D converter 20I, and input/output interfaces (I/O I/Fs) 20J to 20L.

The CPU 20A operates in accordance with programs stored in the ROM 20C while receiving various kinds of input information given through the interfaces 20J to 20L and accessing the RAM 20B or memory unit 20D. The ROM 20C stores a misregister amount detection program to detect the misregister amount between the C, M, Y, and K colors. A measurement start switch SW1 and control end switch SW2 are provided on the input device 20E.

Referring to FIG. 20, reference numerals 21-1 and 21-2 denote a circumferential register adjustment apparatus and a lateral register adjustment apparatus of a cyan (C) printing unit; 21-3 and 21-4, a circumferential register adjustment apparatus and a lateral register adjustment apparatus of a magenta (M) printing unit; and 21-5 and 21-6, a circumferential register adjustment apparatus and a lateral register adjustment apparatus of a yellow (Y) printing unit.

Figure 21:
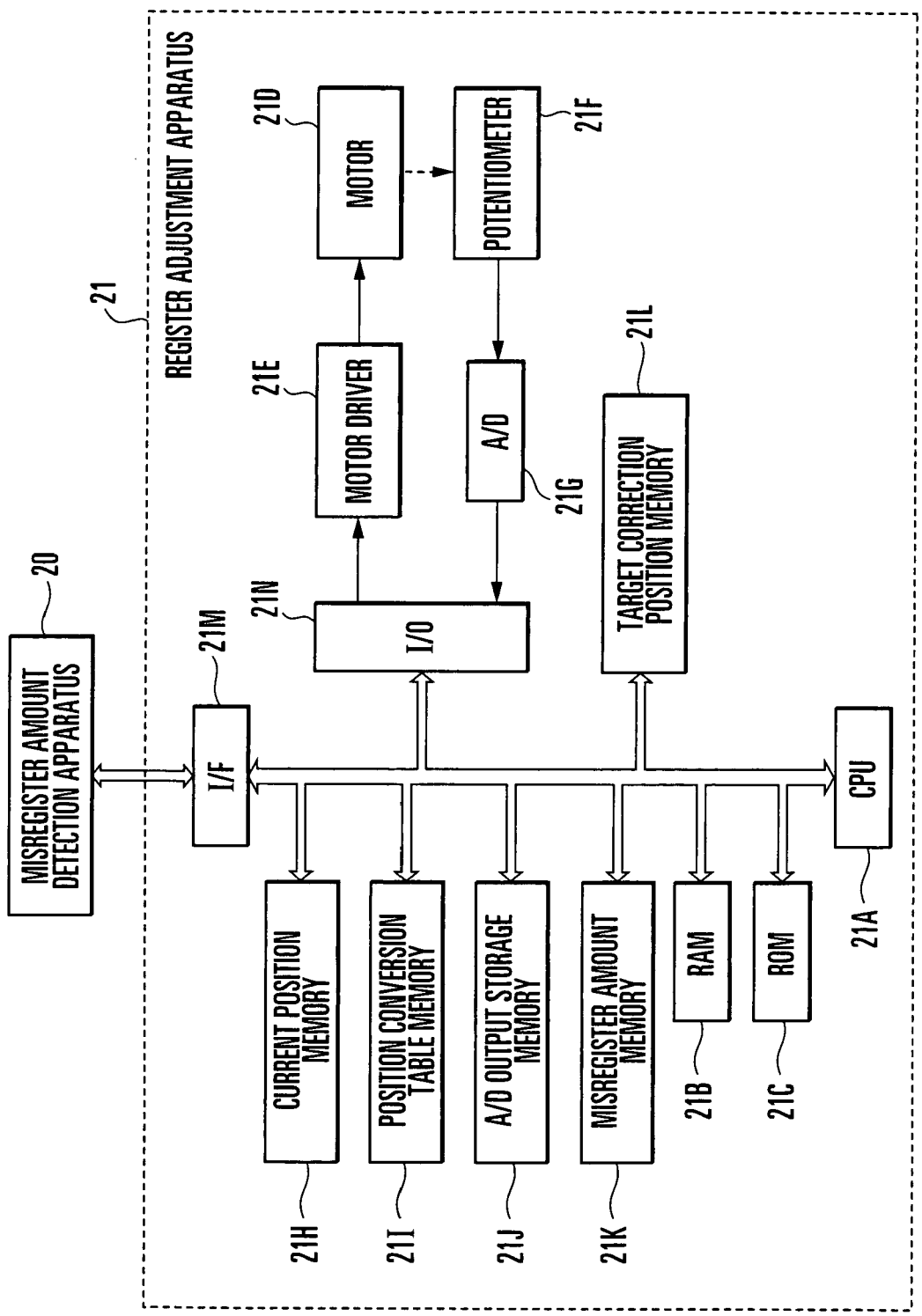
FIG. 21 is a block diagram of a register adjustment apparatus shown in FIG. 20.

As shown in FIG. 21, a register adjustment apparatus 21 (21-1 to 21-6) comprises a CPU 21A, a RAM 21B, a ROM 21C, a register adjustment motor 21D, a register adjustment motor driver 21E, a potentiometer 21F attached to the register adjustment motor 21D, an A/D converter 21G, a memory 21H which stores the current position of the register adjustment apparatus, a memory 21I which stores an A/D converter output-register adjustment apparatus position conversion table, a memory 21J which stores the A/D converter output, a memory 21K which stores the misregister amount, a memory 21L which stores the target correction position of the register adjustment apparatus, and input/output interfaces (I/O I/Fs) 21M and 21N. The register adjustment apparatus 21 is connected to the misregister amount detection apparatus 20 through the interface 21M. The mechanical arrangement of the register adjustment apparatus is described in detail in Japanese Utility Model Laid-Open No. 64-42135 (reference 3), and a description thereof will be omitted.

Figure 22:
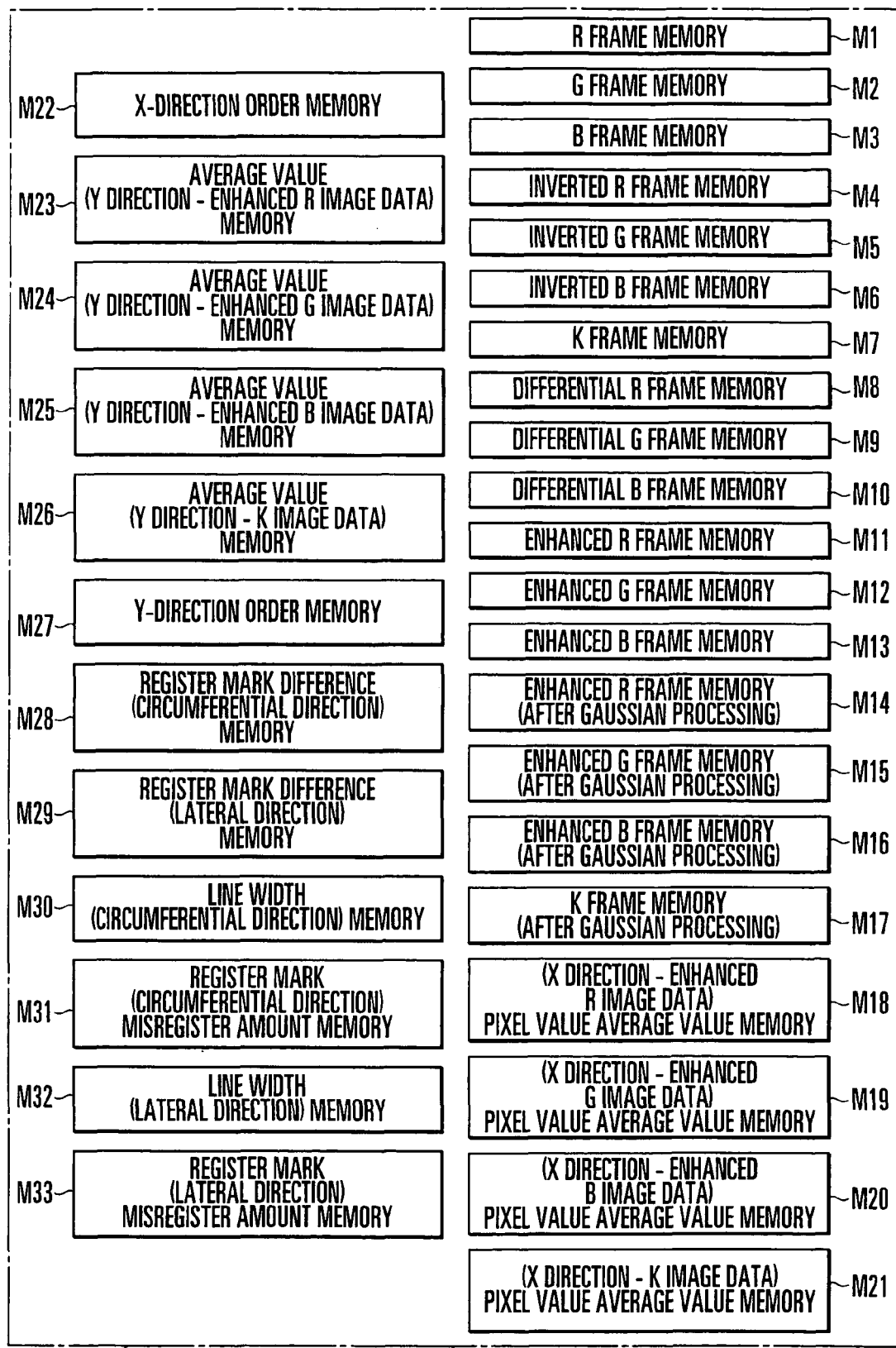
FIG. 22 is a block diagram showing the arrangement of a memory unit shown in FIG. 20.

FIG. 22 shows the internal arrangement of the memory unit 20D of the misregister amount detection apparatus 20. The memory unit 20D includes memories M1 to M33. M1 is an R frame memory. M2 is a G frame memory. M3 is a B frame memory. R image data from the camera 20H is stored in the R frame memory M1. G image data is stored in the G frame memory M2. B image data is stored in the B frame memory M3.

M4 is an inverted R frame memory. M5 is an inverted G frame memory. M6 is an inverted B frame memory. Inverted R image data is stored in the inverted R frame memory M4. Inverted G image data is stored in the inverted G frame memory M5. Inverted B image data is stored in the inverted B frame memory M6. M7 is a K frame memory which stores K image data generated from the inverted R, G, and B image data.

M8 is a differential R frame memory. M9 is a differential G frame memory. M10 is a differential B frame memory. Differential R image data is stored in the differential R frame memory M8. Differential G image data is stored in the differential G frame memory M9. Differential B image data is stored in the differential B frame memory M10.

M11 is an enhanced R frame memory. M12 is an enhanced G frame memory. M13 is an enhanced B frame memory. Enhanced R image data is stored in the enhanced R frame memory M11. Enhanced G image data is stored in the enhanced G frame memory M12. Enhanced B image data is stored in the enhanced B frame memory M13.

M14 is an enhanced R frame memory after Gaussian processing. M15 is an enhanced G frame memory after Gaussian processing. M16 is an enhanced B frame memory after Gaussian processing. M17 is a K frame memory after Gaussian processing. Gaussian-processed enhanced R image data is stored in the enhanced R frame memory M14 after Gaussian processing.

Gaussian-processed enhanced G image data is stored in the enhanced G frame memory M15 after Gaussian processing. Gaussian-processed enhanced B image data is stored in the enhanced B frame memory M16 after Gaussian processing. Gaussian-processed K image data is stored in the K frame memory M17 after Gaussian processing.

M18 is a memory to store the average value of all the pixel values of the Gaussian-processed enhanced R image data on a line in the X direction (lateral direction). M19 is a memory to store the average value of all the pixel values of the Gaussian-processed enhanced G image data on a line in the X direction. M20 is a memory to store the average value of all the pixel values of the Gaussian-processed enhanced B image data on a line in the X direction. M21 is a memory to store the average value of all the pixel values of the Gaussian-processed K image data on a line in the X direction. M22 is a memory to store the order of X-direction lines in which the average values of the pixel values of the Gaussian-processed enhanced R, G, and B image data and K image data are maximum.

M23 is a memory to store the average value of all the pixel values of the Gaussian-processed enhanced R image data on a line in the Y direction (circumferential direction). M24 is a memory to store the average value of all the pixel values of the Gaussian-processed enhanced G image data on a line in the Y direction. M25 is a memory to store the average value of all the pixel values of the Gaussian-processed enhanced B image data on a line in the Y direction. M26 is a memory to store the average value of all the pixel values of the Gaussian-processed K image data on a line in the Y direction. M27 is a memory to store the order of Y-direction lines in which the average values of the pixel values of the Gaussian-processed enhanced R, G, and B image data and K image data are maximum.

M28 is a memory to store the circumferential line differences between the K and C register marks, between the K and M register marks, and between K and Y register marks. M29 is a memory to store the lateral line differences between the K and C register marks, between the K and M register marks, and between K and Y register marks. M30 is a memory to store the line width in the circumferential direction. M31 is a memory to store the circumferential misregister amounts between the K and C register marks, between the K and M register marks, and between K and Y register marks. M32 is a memory to store the line width in the lateral direction. M33 is a memory to store the lateral misregister amounts between the K and C register marks, between the K and M register marks, and between K and Y register marks.

Figure 23A:
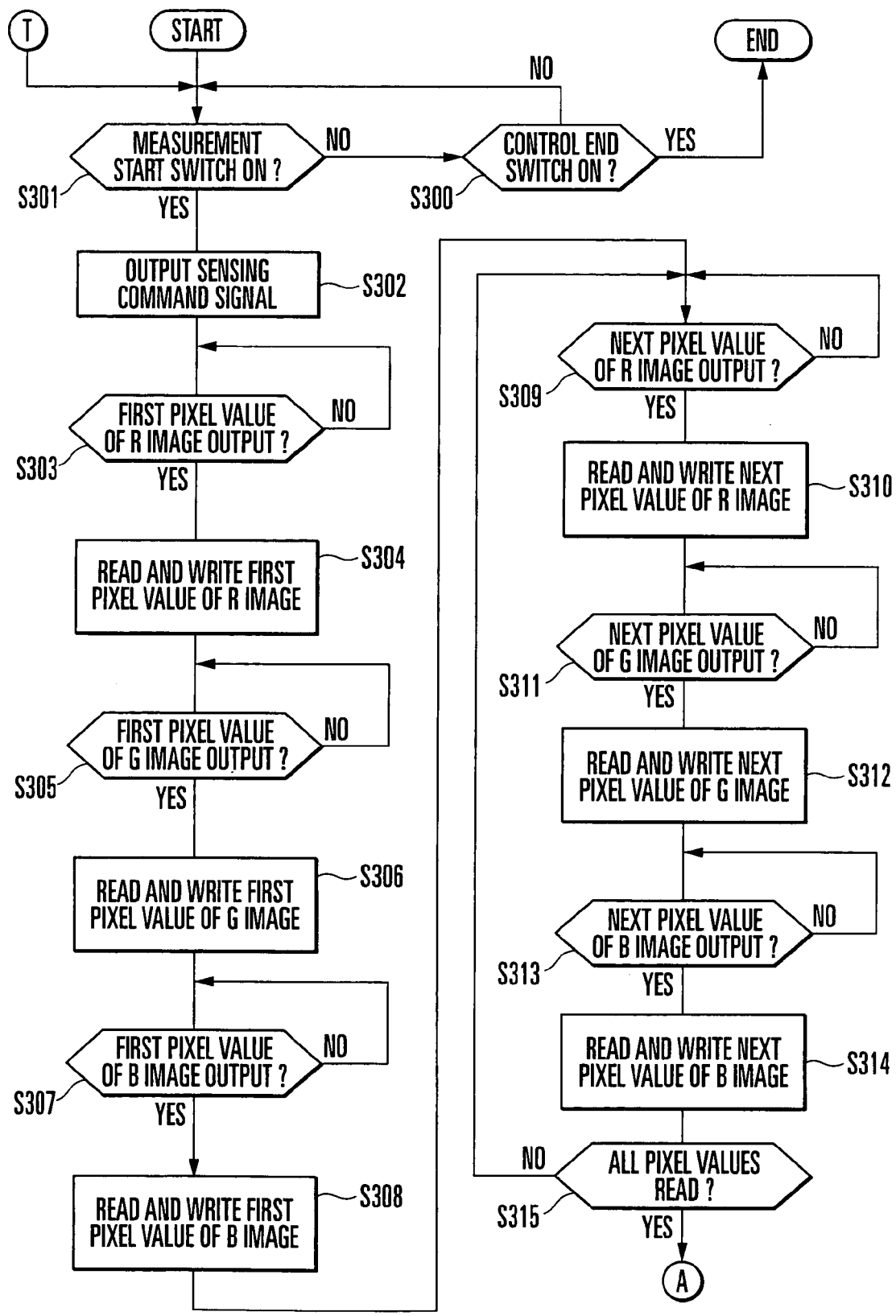
FIGS. 23A to 23T are flowcharts of a misregister amount detection operation executed by the CPU of the misregister amount detection apparatus shown in FIG. 20.
Figure 23B:
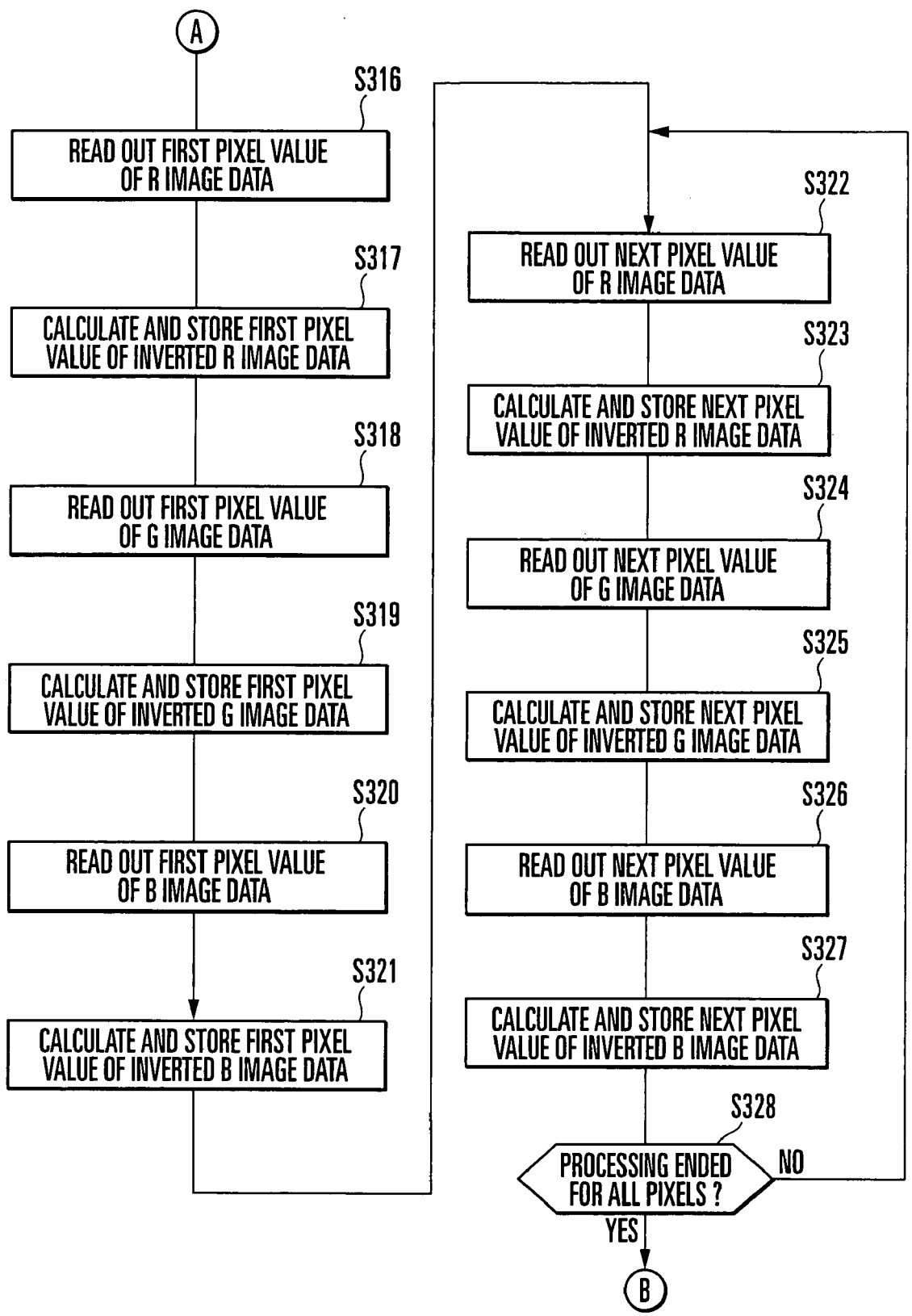
Figure 23C:
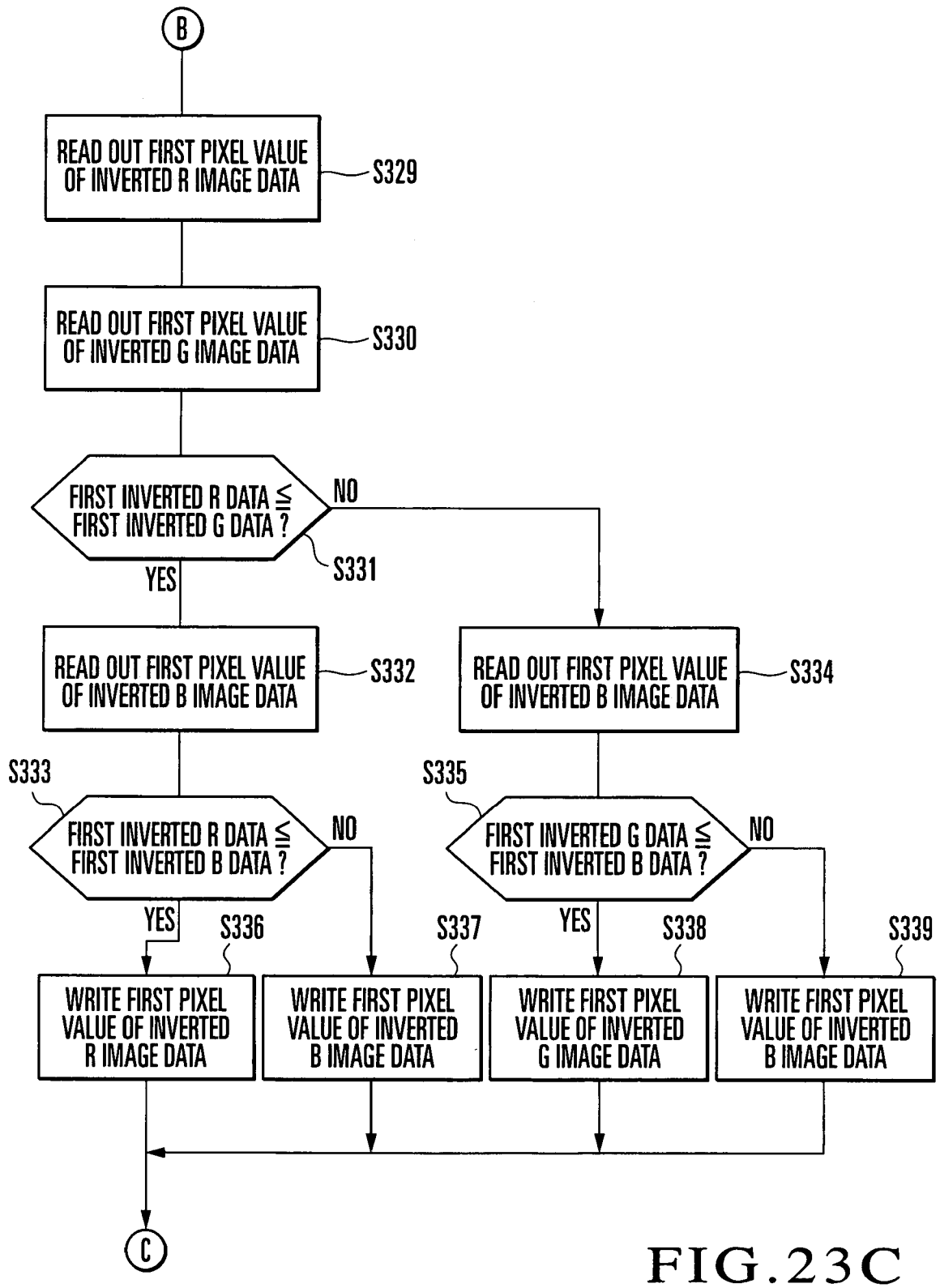
Figure 23D:
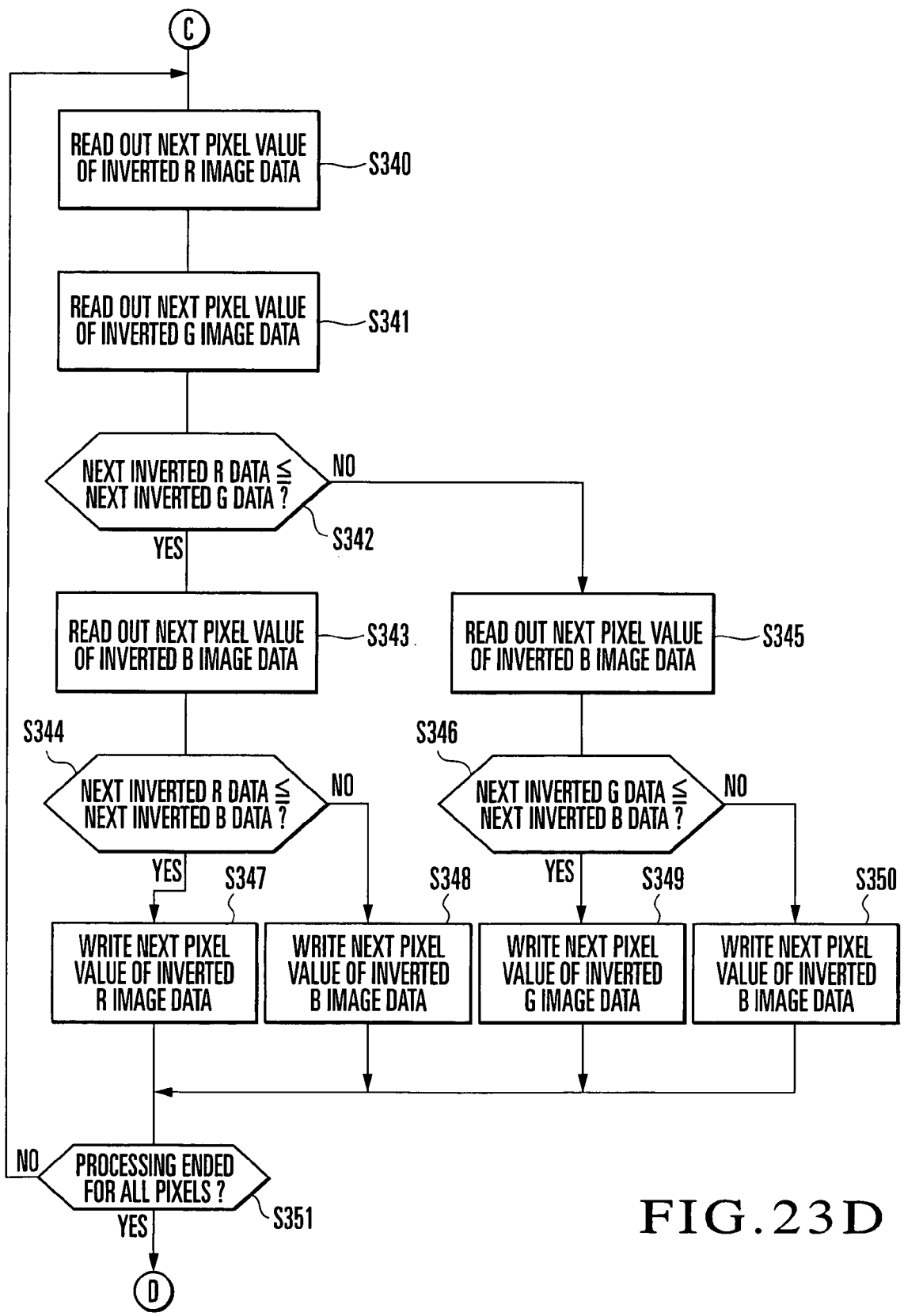
Figure 23E:
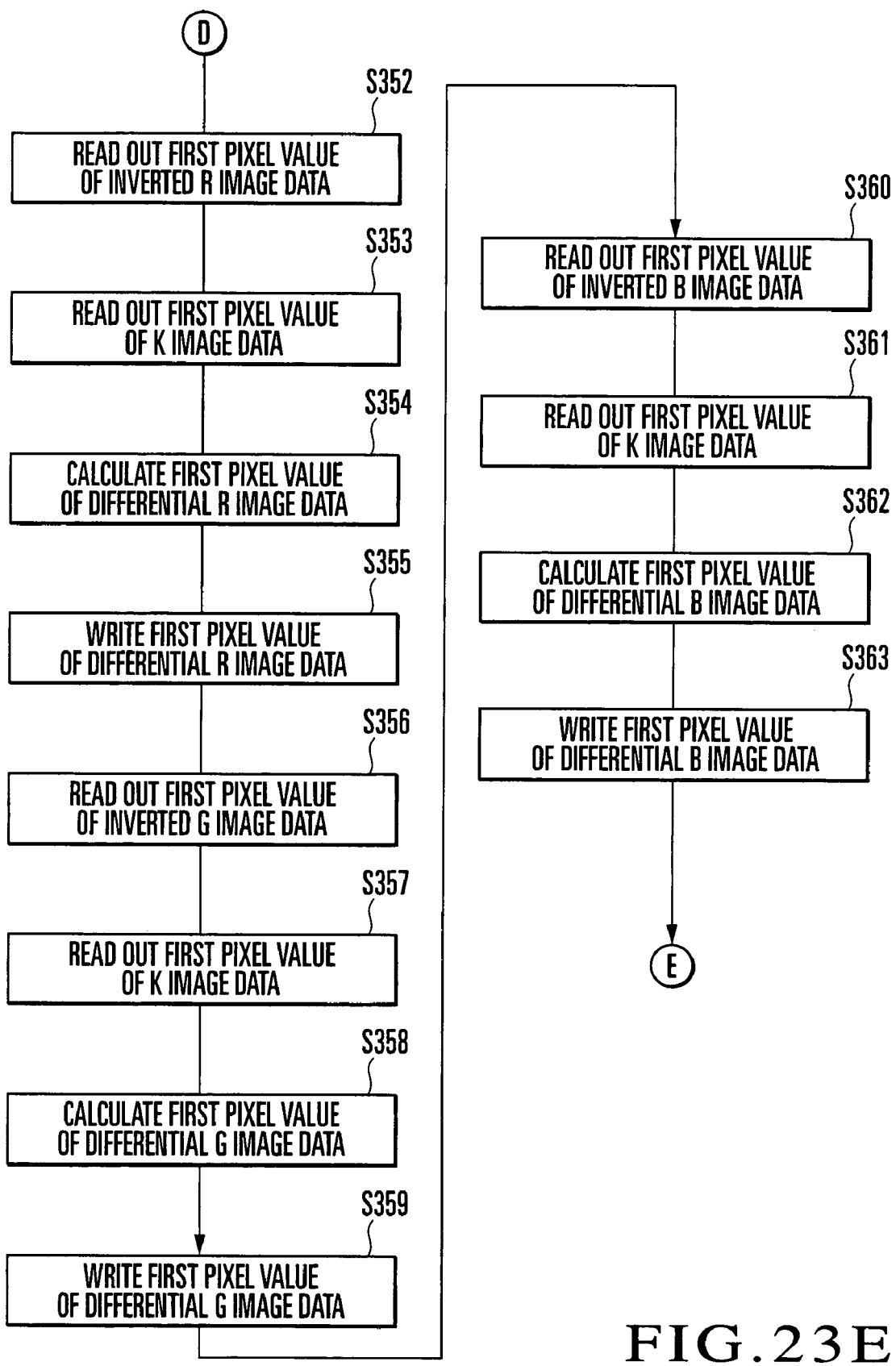
Figure 23F:
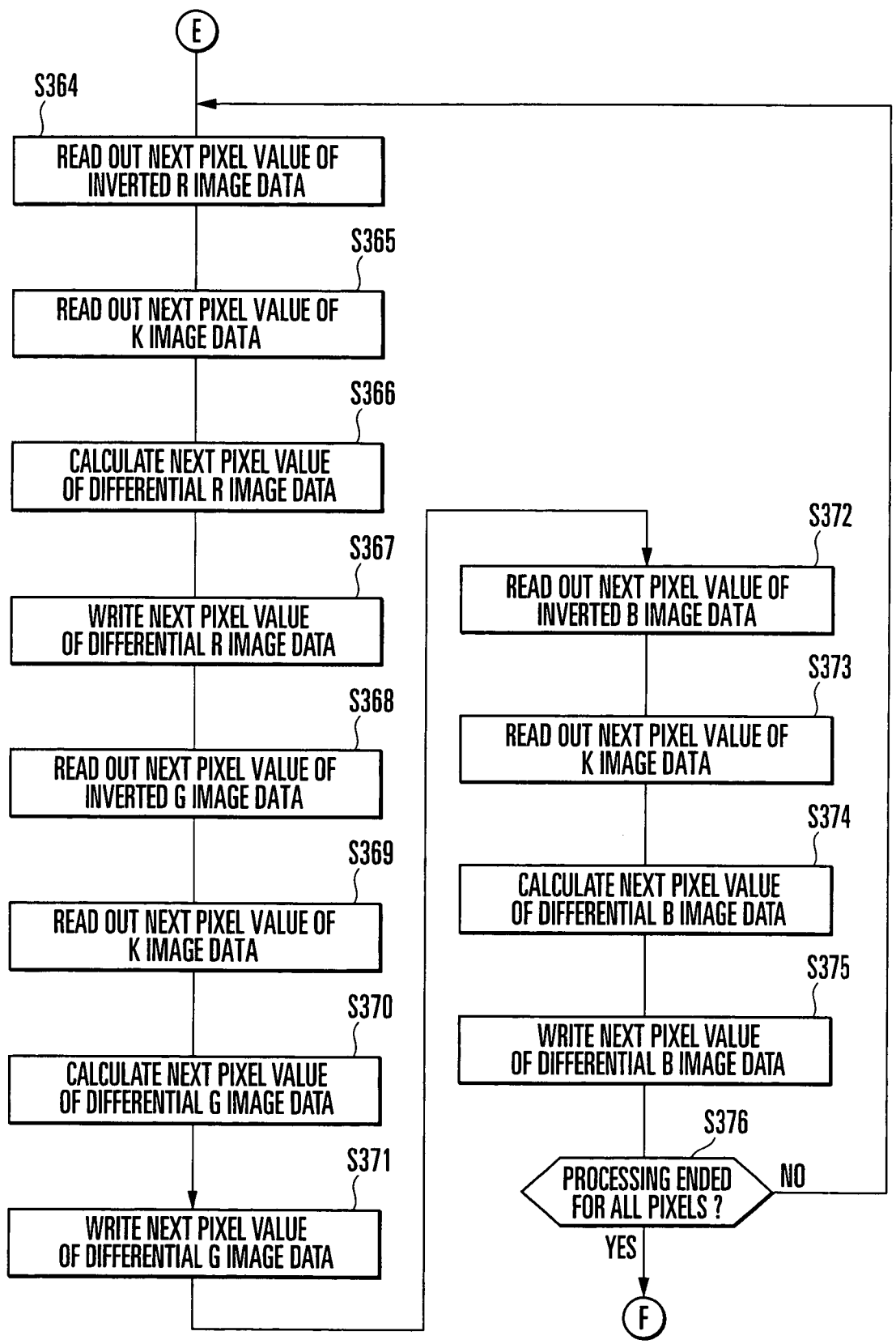
Figure 23G:
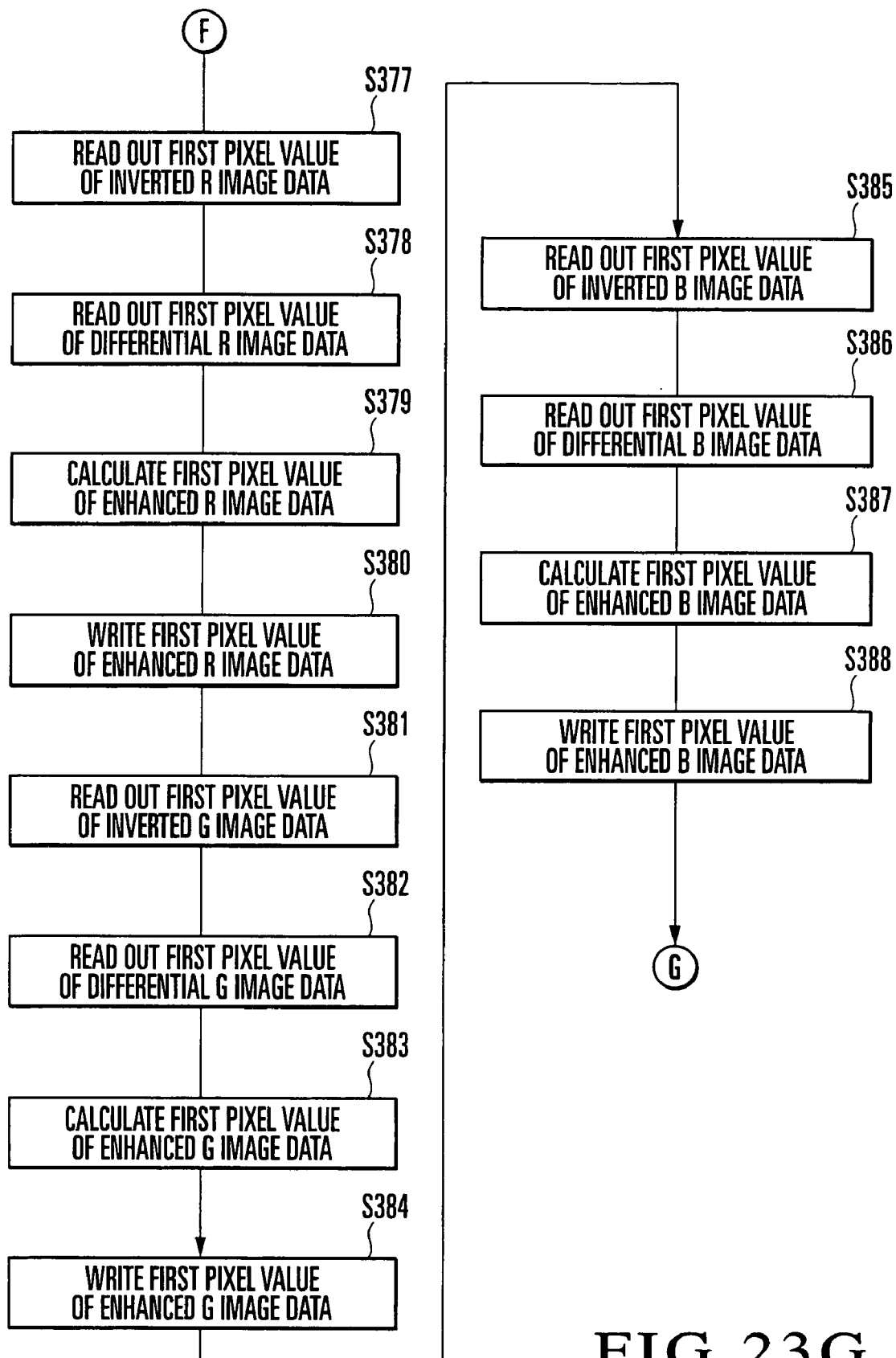
Figure 23H:
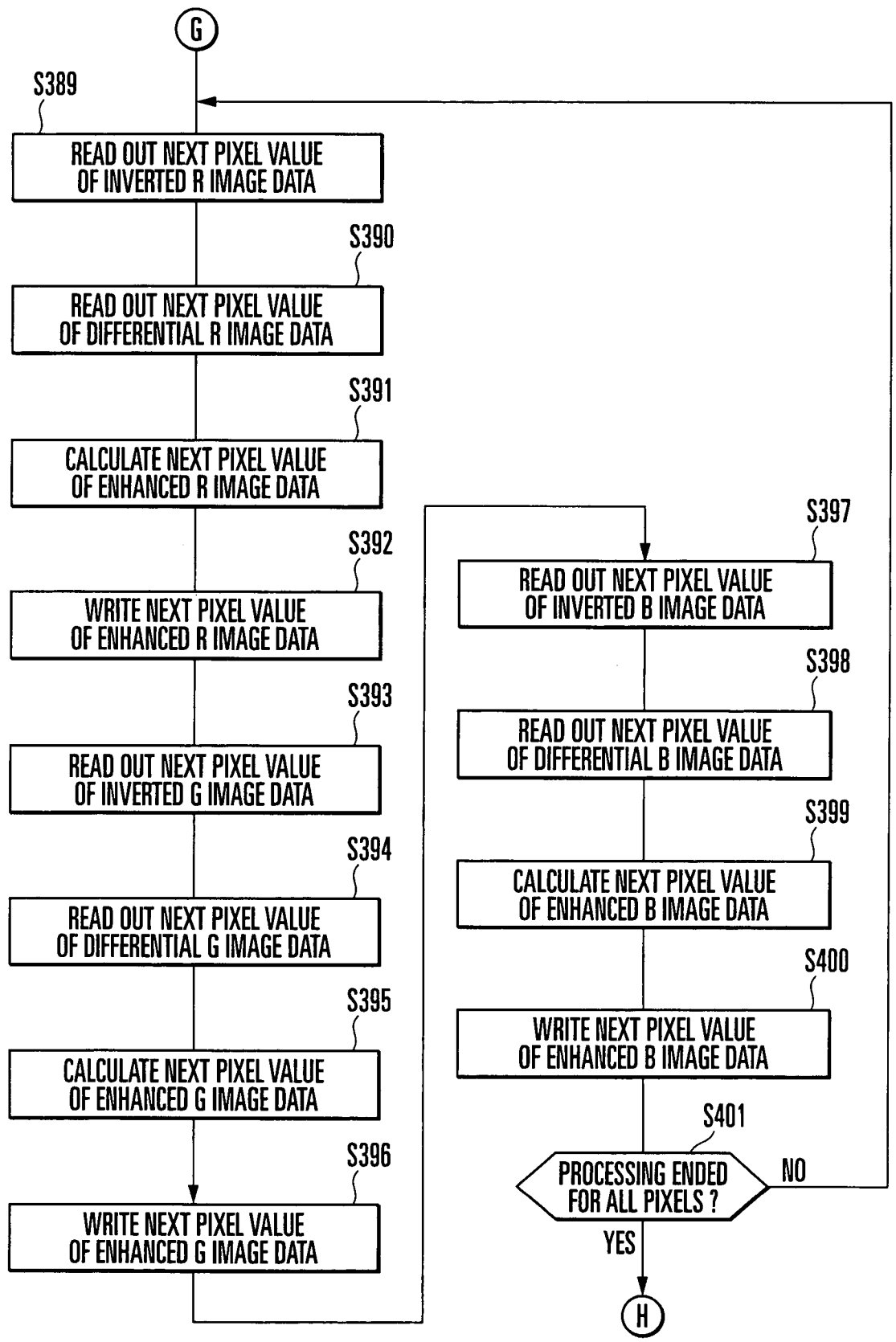
Figure 23I:
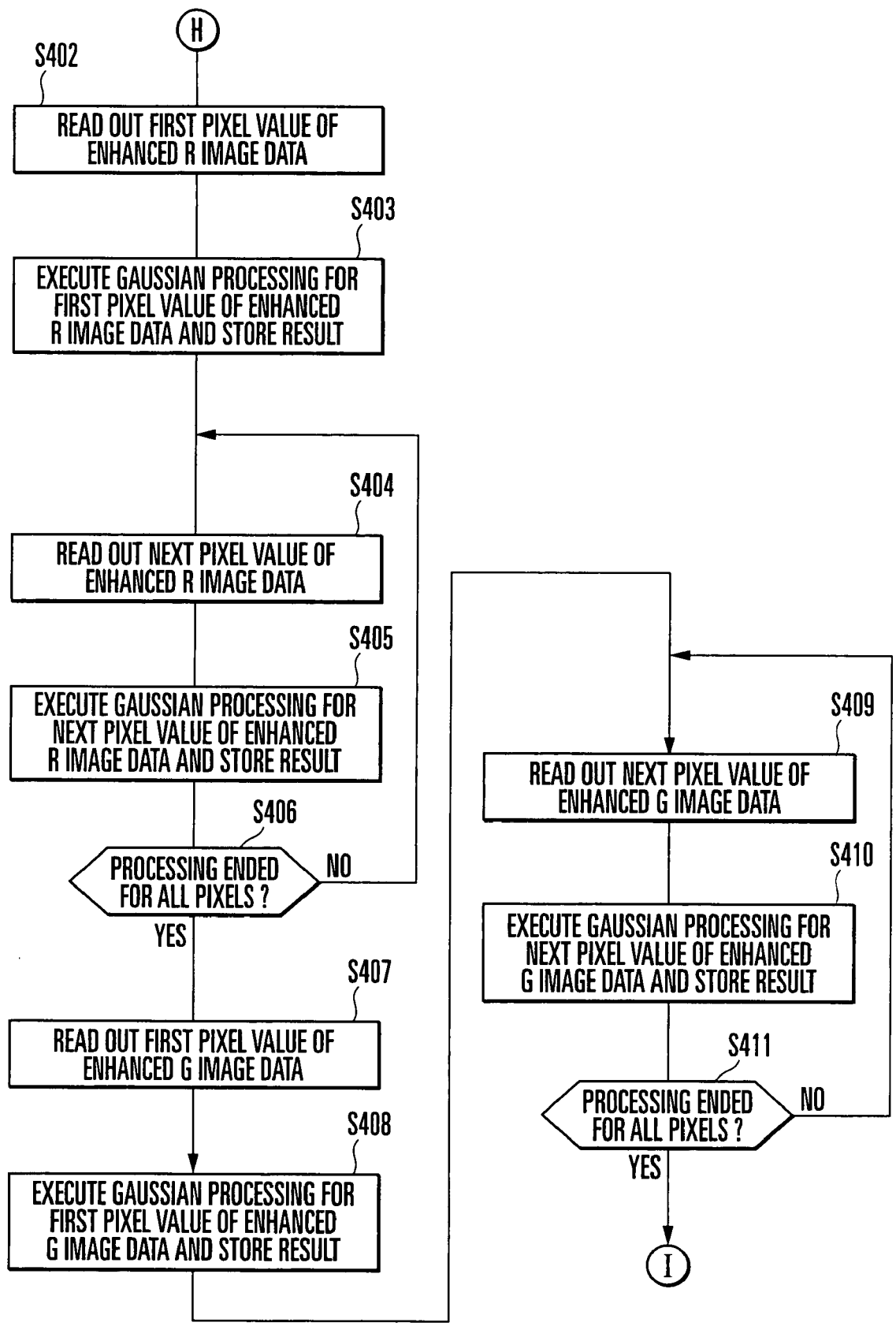
Figure 23J:
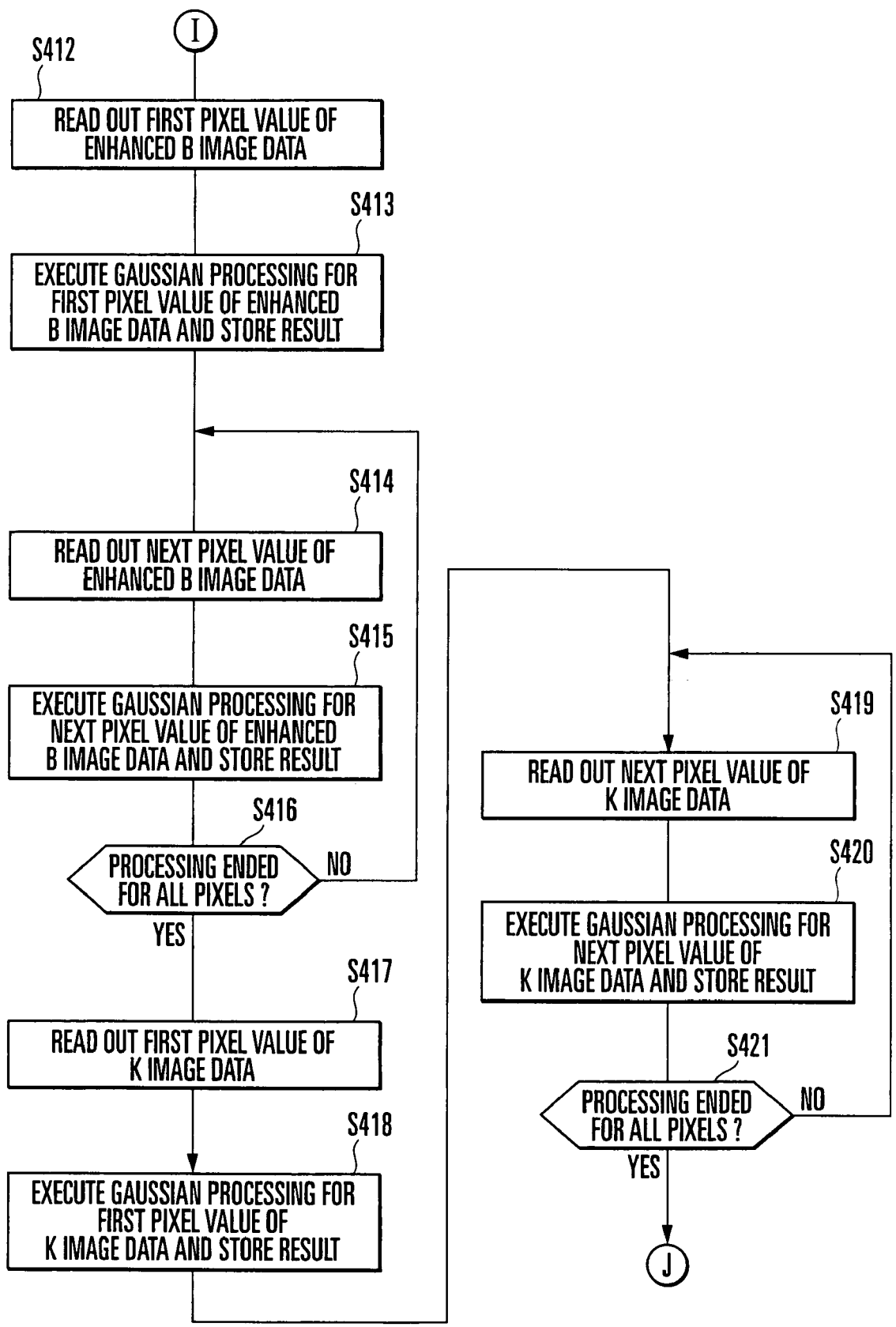
Figure 23K:
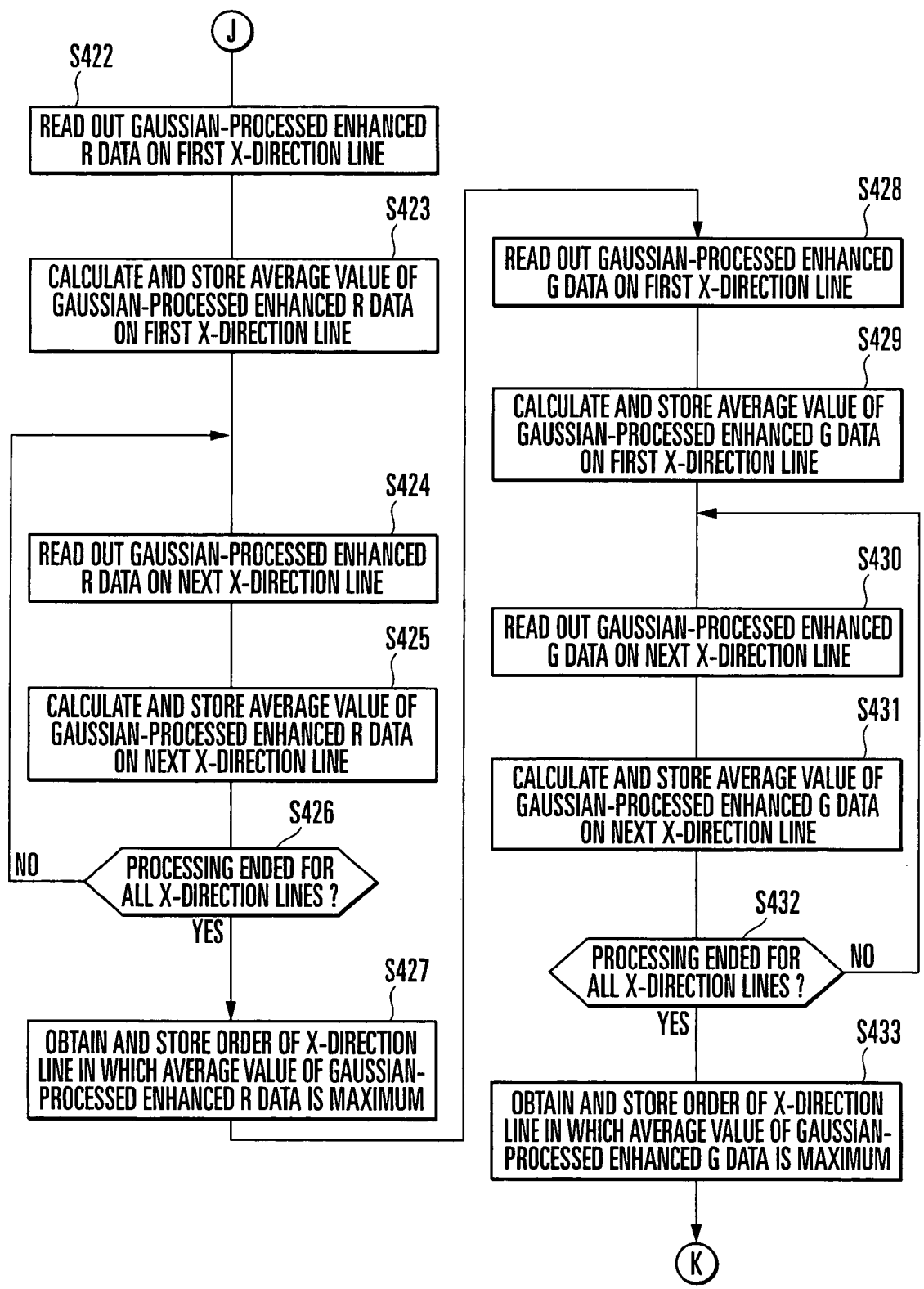
Figure 23L:
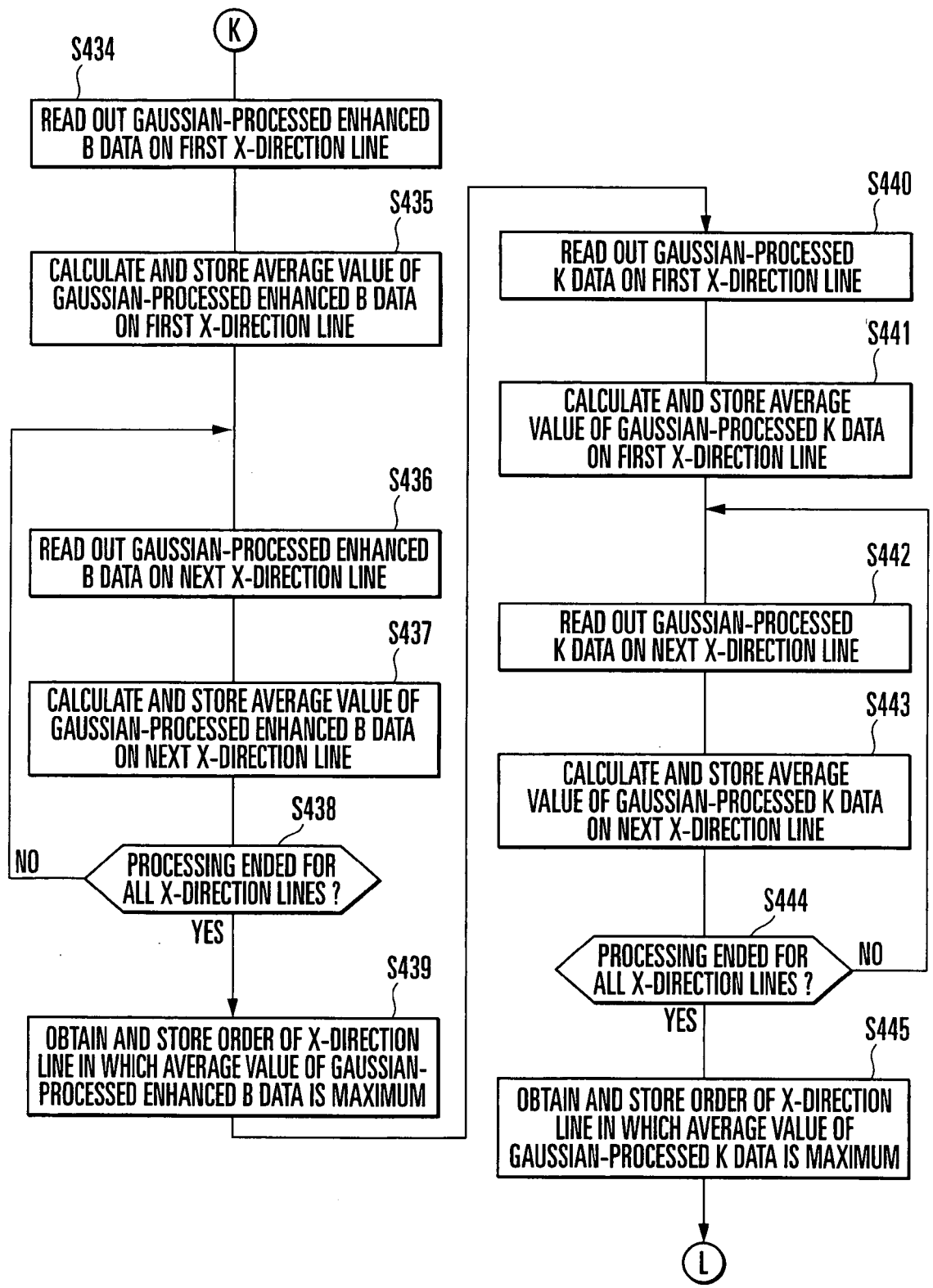
Figure 23M:
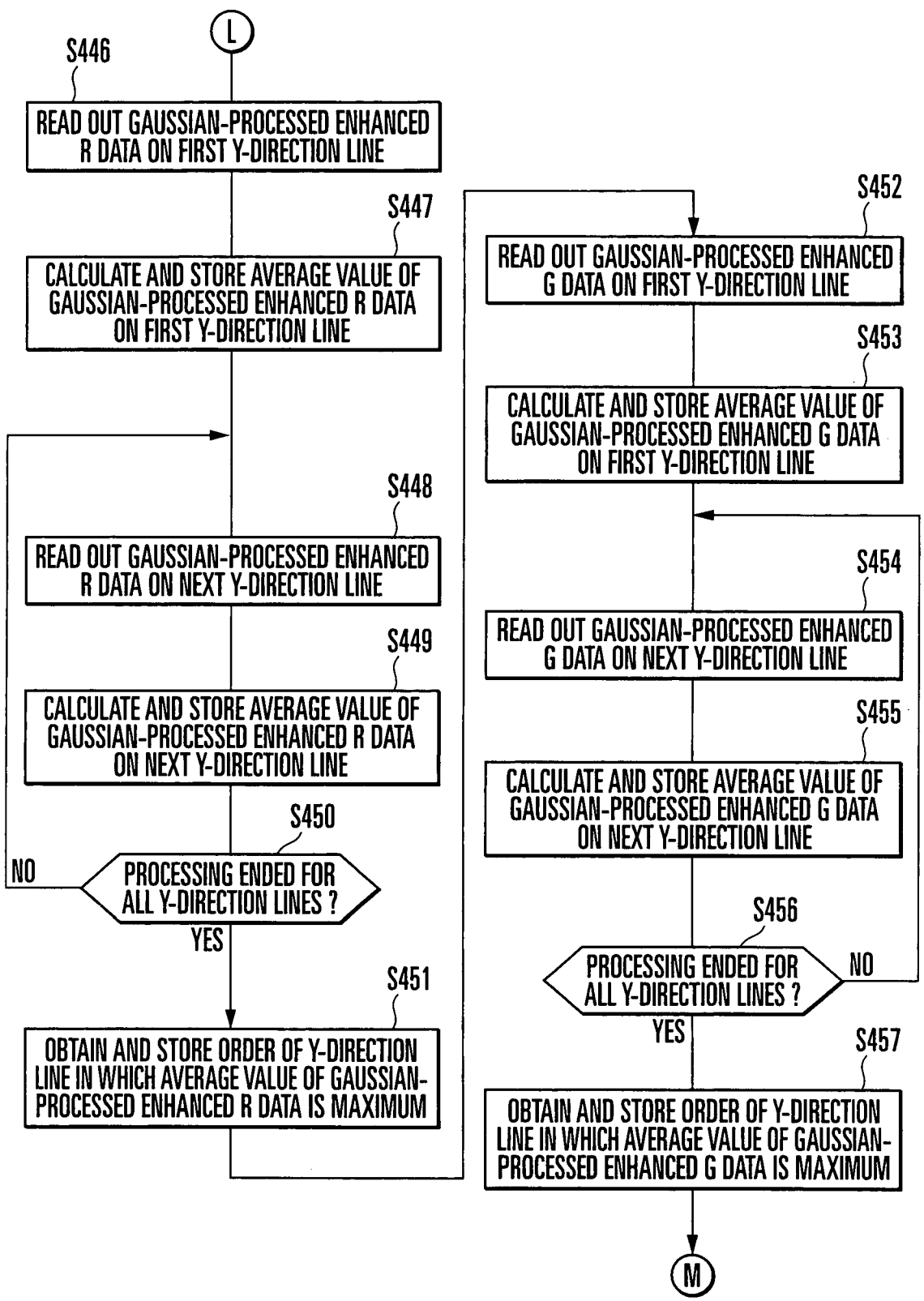
Figure 23N:
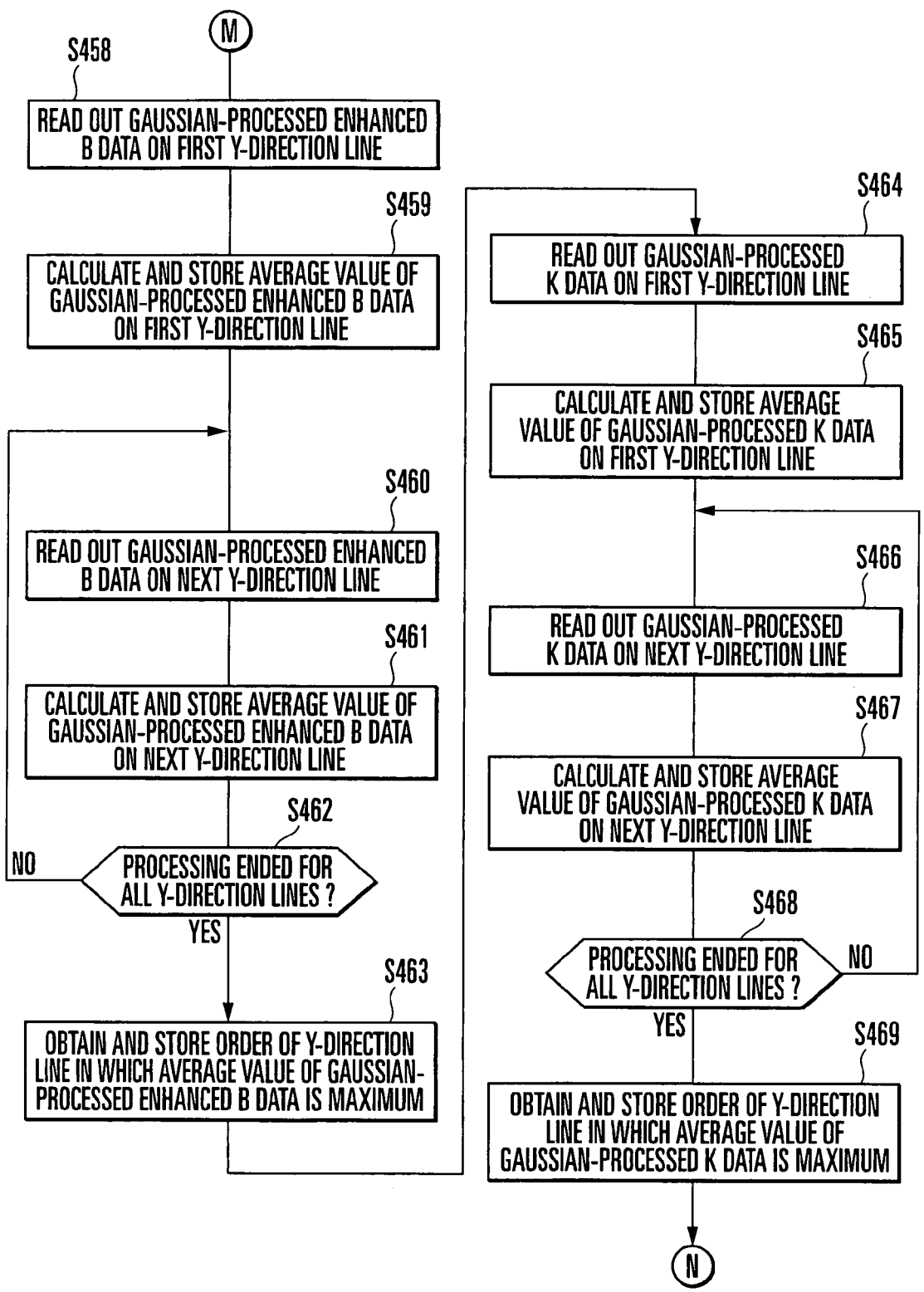
Figure 23O:
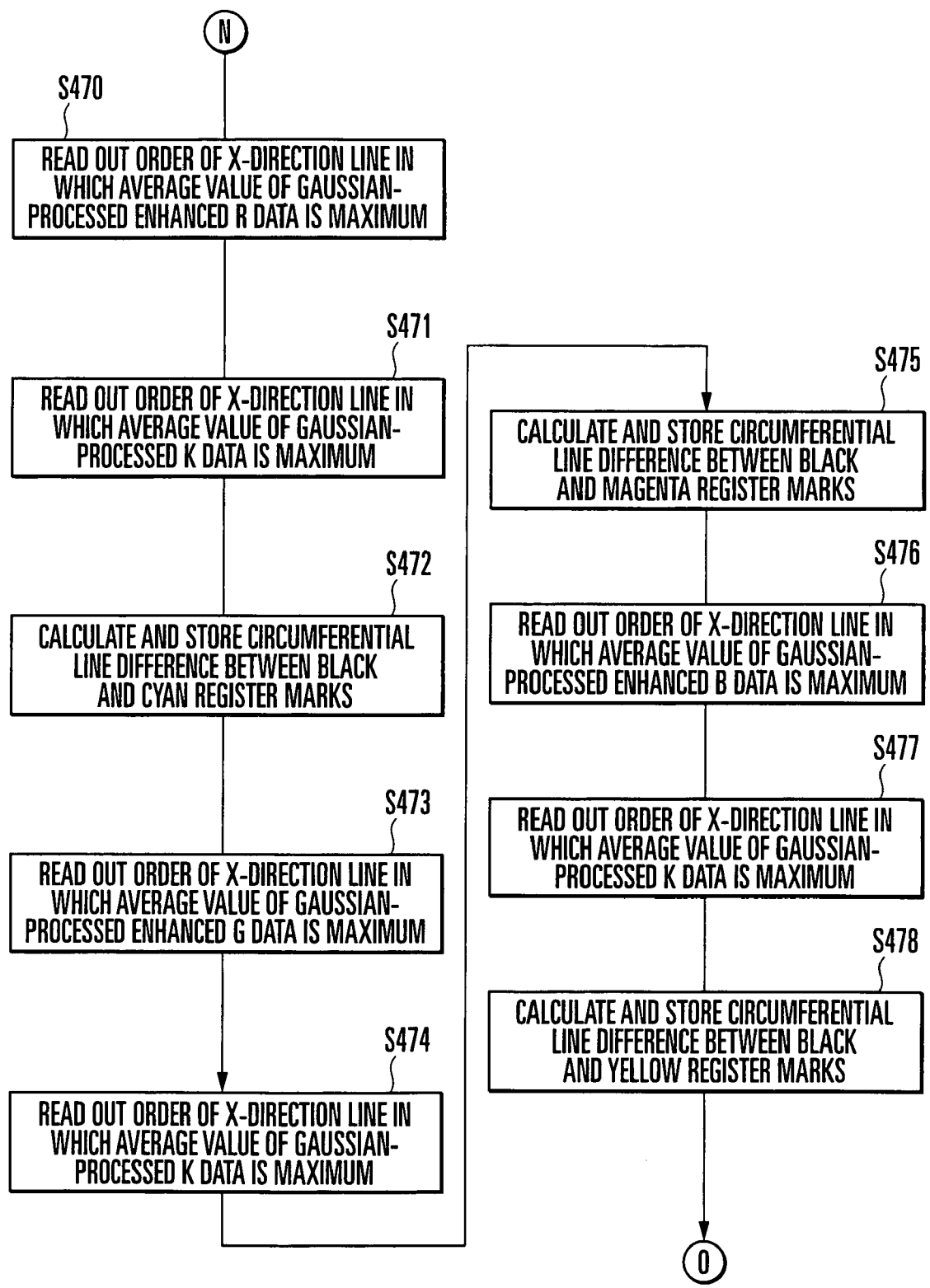
Figure 23P:
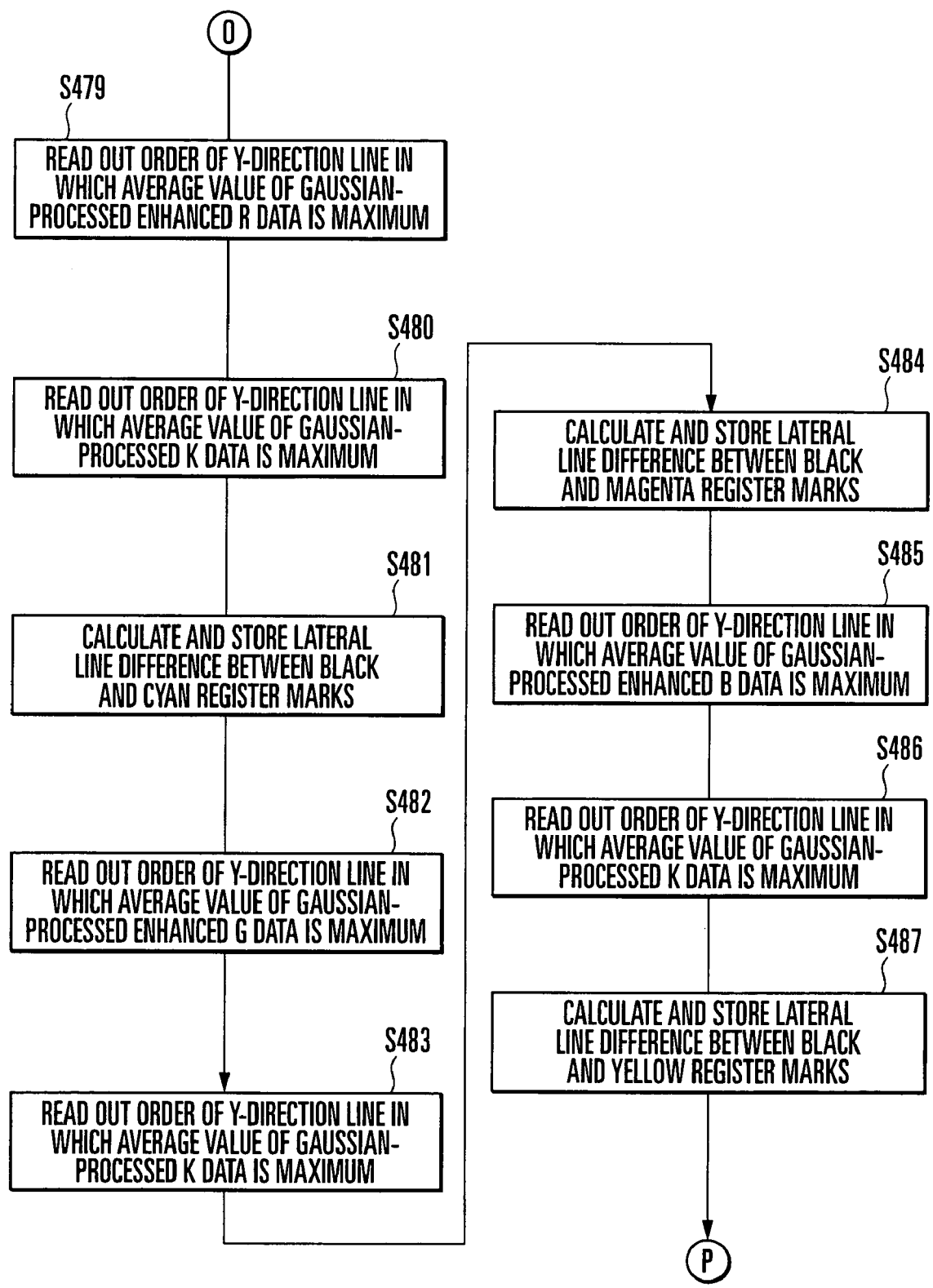
Figure 23Q:
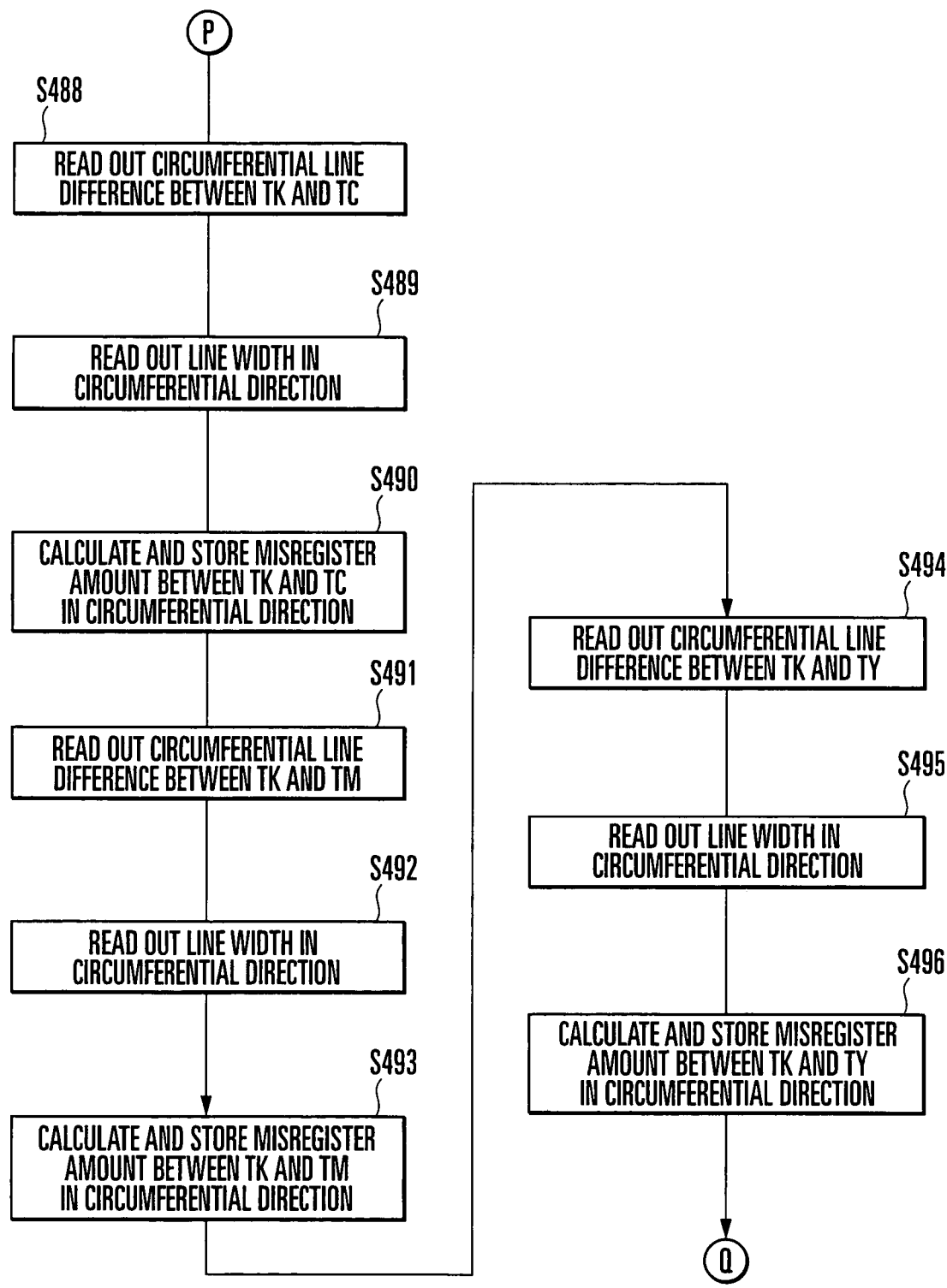
Figure 23R:
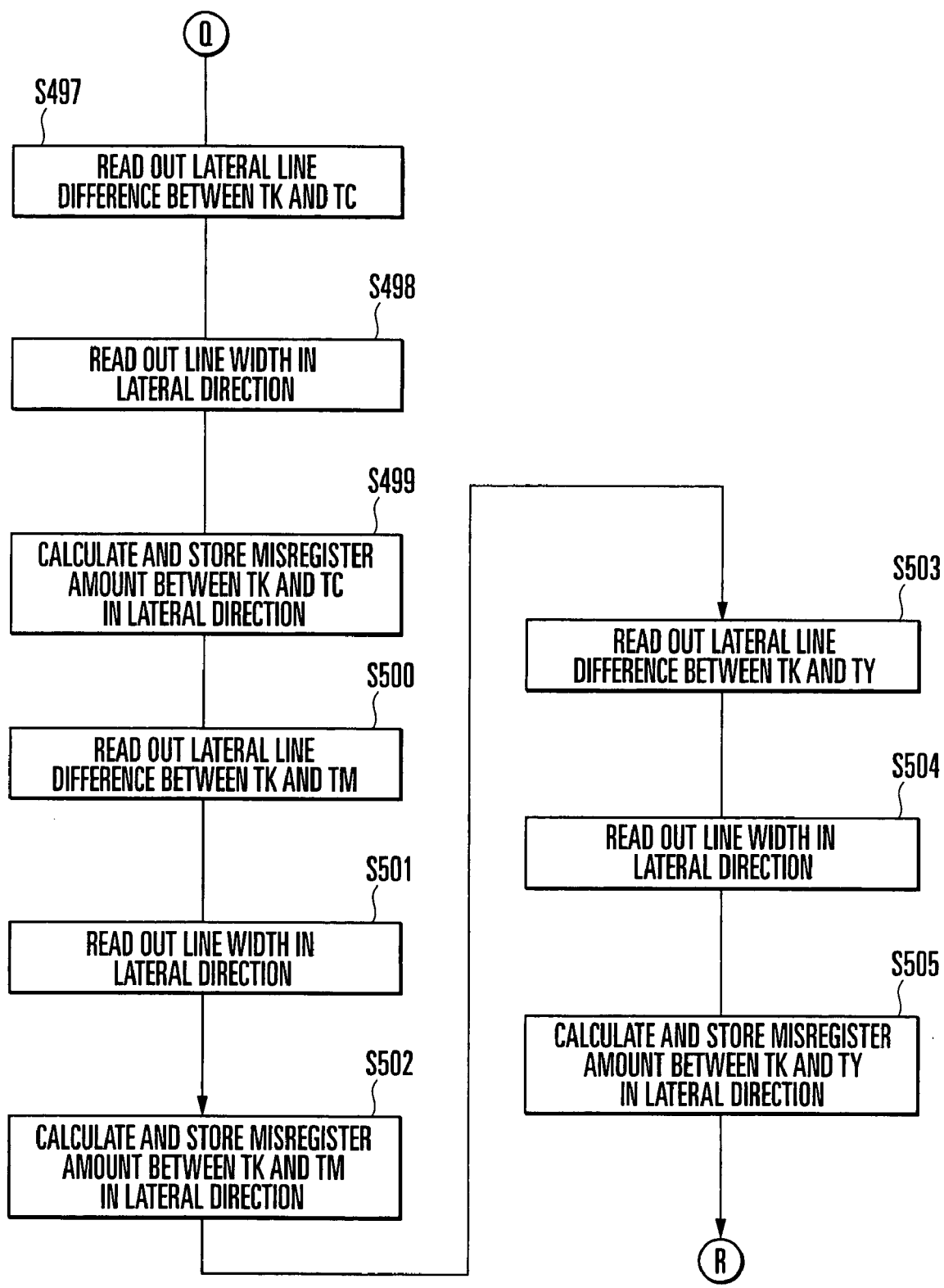
Figure 23S:
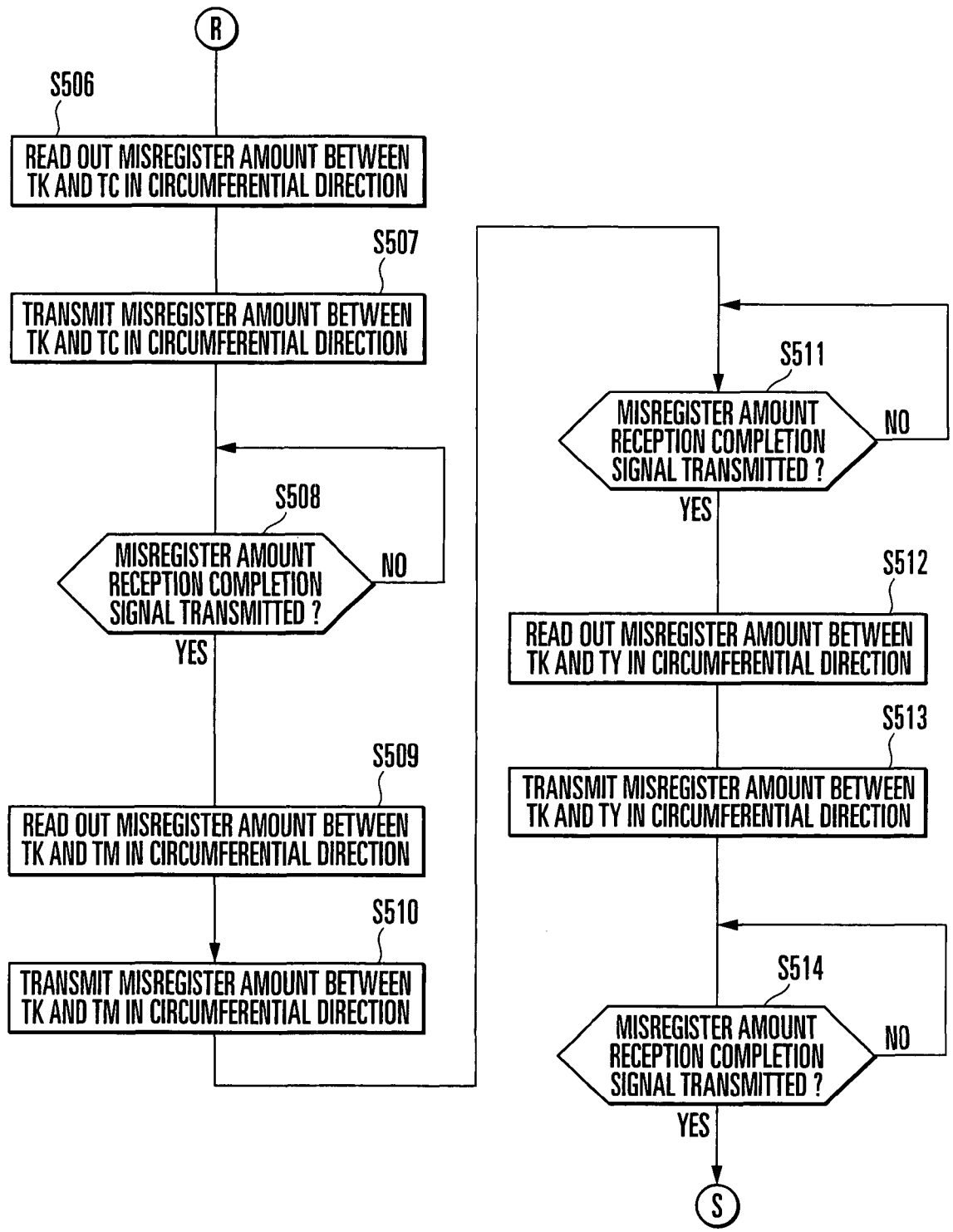
Figure 23T:
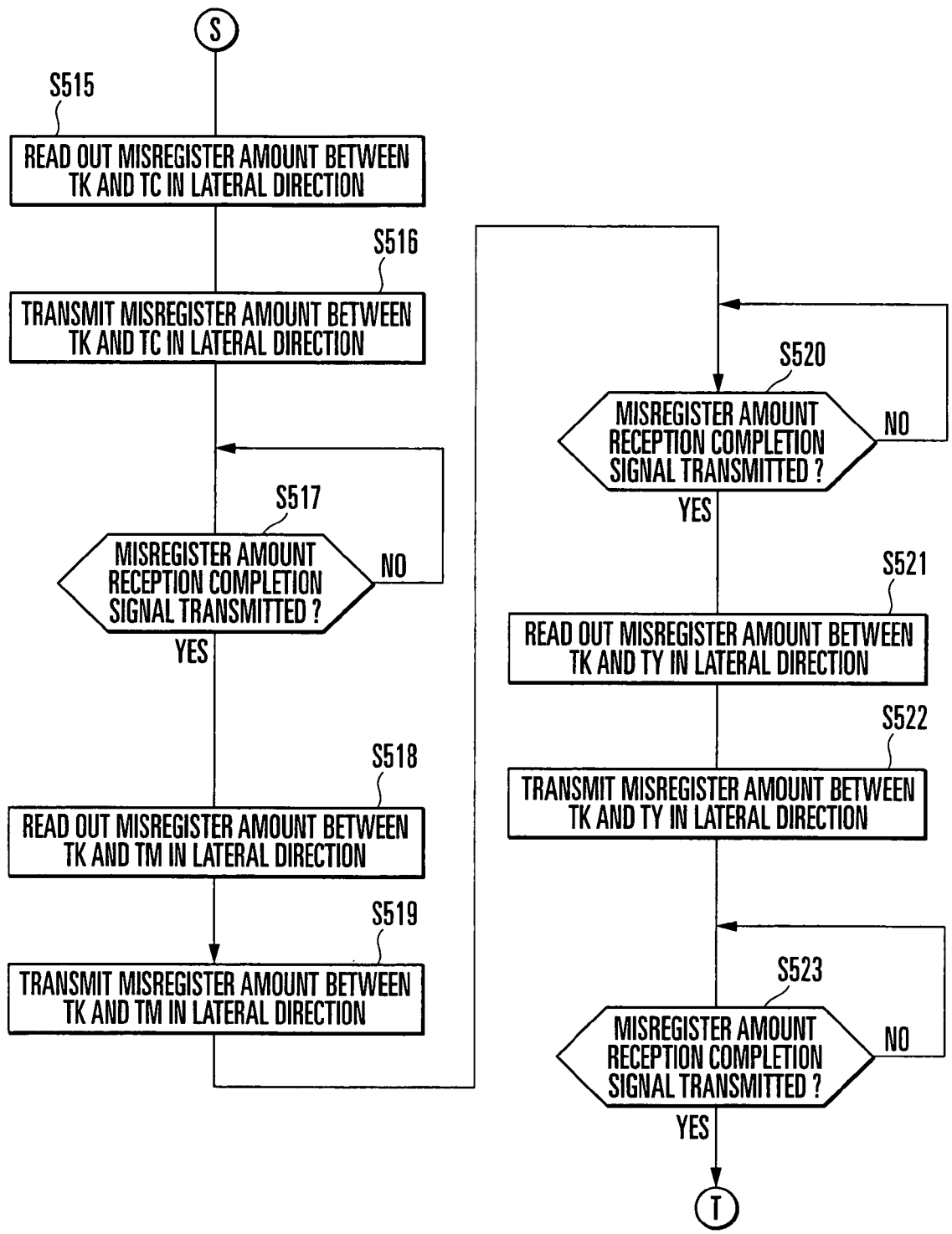

FIGS. 23A to 23T show a processing operation corresponding to the misregister amount detection program executed by the CPU 20A of the above-described misregister amount detection apparatus 20.

[Reception of Sensed Image (R, G, and B Image Data)]

When the measurement start switch SW1 is turned on (YES in step S301), the CPU 20A sends an image sensing command signal to the camera 20H (step S302) to zoom and sense an image portion X where register marks TC, TM, TY, and TK are printed.

R, G, and B signals output from the camera 20H upon sensing the image portion X are received. The pixel value (luminance value) of the first pixel of the R image from the camera 20H is read and written at the first pixel position of the R frame memory M1 (steps S303 and S304). The pixel value (luminance value) of the first pixel of the G image from the camera 20H is read and written at the first pixel position of the G frame memory M2 (steps S305 and S306). The pixel value (luminance value) of the first pixel of the B image from the camera 20H is read and written at the first pixel position of the B frame memory M3 (steps S307 and S308).

In a similar manner, the pixel values of the pixels of the R, G, and B images from the camera 20H are successively read and written at corresponding pixel positions of the R, G, and B frame memories M1, M2, and M3 (repeat of steps S309 to S315). With this operation, the R image data is stored in the R frame memory M1. The G image data is stored in the G frame memory M2. The B image data is stored in the B frame memory M3.

[Generation of Inverted R, G, and B Image Data]

Next, the CPU 20A reads out the pixel value of the first pixel of the R image data from the R frame memory M1 (step S316), subtracts the pixel value of the first pixel of the R image data from the maximum value ("255" in this example) of the luminance level, and stores the obtained value at the first pixel position of the inverted R frame memory M4 as the pixel value of the first pixel of inverted R image data (step S317).

The CPU 20A also reads out the pixel value of the first pixel of the G image data from the G frame memory M2 (step S318), subtracts the pixel value of the first pixel of the G image data from the maximum value ("255") of the luminance level, and stores the obtained value at the first pixel position of the inverted G frame memory M5 as the pixel value of the first pixel of inverted G image data (step S319).

The CPU 20A also reads out the pixel value of the first pixel of the B image data from the B frame memory M3 (step S320), subtracts the pixel value of the first pixel of the B image data from the maximum value ("255") of the luminance level, and stores the obtained value at the first pixel position of the inverted B frame memory M6 as the pixel value of the first pixel of inverted B image data (step S321).

In a similar manner, the pixel values of the pixels of the R, G, and B images are successively read out from the R, G, and B frame memories M1, M2, and M3. The pixel values of the pixels are subtracted from the maximum value ("255") of the luminance level, and obtained values are written at corresponding pixel positions of the inverted R, G, and B frame memories M4, M5, and M6 (repeat of steps S322 to S328). With this operation, the inverted R image data is stored in the inverted R frame memory M4. The inverted G image data is stored in the inverted G frame memory M5. The inverted B image data is stored in the inverted B frame memory M6.

[Generation of K Image Data]

Next, the CPU 20A reads out the pixel value of the first pixel of the inverted R image data from the inverted R frame memory M4 (step S329). The CPU 20A also reads out the pixel value of the first pixel of the inverted G image data from the inverted G frame memory M5 (step S330). The pixel value (inverted R data) of the first pixel of the inverted R image data is compared with the pixel value (inverted G data) of the first pixel of the inverted G image data (step S331).

If the inverted R data of the first pixel is equal to or smaller than the inverted G data of the first pixel (YES in step S331), the pixel value of the first pixel of the inverted B image data is read out from the inverted B frame memory M6 (step S332). The pixel value (inverted R data) of the first pixel of the inverted R image data is compared with the pixel value (inverted B data) of the first pixel of the inverted B image data (step S333).

If the inverted R data of the first pixel is larger than the inverted G data of the first pixel (NO in step S331), the pixel value of the first pixel of the inverted B image data is read out from the inverted B frame memory M6 (step S334). The pixel value (inverted G data) of the first pixel of the inverted G image data is compared with the pixel value (inverted B data) of the first pixel of the inverted B image data (step S335).

If the inverted R data of the first pixel is equal to or smaller than the inverted B data of the first pixel (YES in step S333), the inverted R data of the first pixel is written at the first pixel position of the K frame memory M7 (step S336).

If the inverted R data of the first pixel is larger than the inverted B data of the first pixel (NO in step S333), the inverted B data of the first pixel is written at the first pixel position of the K frame memory M7 (step S337).

If the inverted G data of the first pixel is equal to or smaller than the inverted B data of the first pixel (YES in step S335), the inverted G data of the first pixel is written at the first pixel position of the K frame memory M7 (step S338).

If the inverted G data of the first pixel is larger than the inverted B data of the first pixel (NO in step S335), the inverted B data of the first pixel is written at the first pixel position of the K frame memory M7 (step S339).

In a similar manner, the pixel values of the pixels of the inverted R, G, and B image data are successively read out from the inverted R, G, and B frame memories M4, M5, and M6. The minimum value of the pixel values (inverted R, G, and B data) is written at a corresponding pixel position of the K frame memory M7 (repeat of steps S340 to S351). With this operation, the K image data is stored in the K frame memory M7.

[Generation of Differential R, G, and B Image Data]

Next, the CPU 20A reads out the pixel value of the first pixel of the inverted R image data from the inverted R frame memory M4 (step S352) and the pixel value of the first pixel of the K image data from the K frame memory M7 (step S353). The CPU 20A subtracts the pixel value of the first pixel of the K image data from the pixel value of the first pixel of the inverted R image data (step S354) and writes the subtraction result at the first pixel position of the differential R frame memory M8 as the pixel value (differential R data) of the first pixel of the differential R image data (step S355).

The CPU 20A also reads out the pixel value of the first pixel of the inverted G image data from the inverted G frame memory M5 (step S356) and the pixel value of the first pixel of the K image data from the K frame memory M7 (step S357). The CPU 20A subtracts the pixel value of the first pixel of the K image data from the pixel value of the first pixel of the inverted G image data (step S358) and writes the subtraction result at the first pixel position of the differential G frame memory M9 as the pixel value (differential G data) of the first pixel of the differential G image data (step S359).

The CPU 20A also reads out the pixel value of the first pixel of the inverted B image data from the inverted B frame memory M6 (step S360) and the pixel value of the first pixel of the K image data from the K frame memory M7 (step S361). The CPU 20A subtracts the pixel value of the first pixel of the K image data from the pixel value of the first pixel of the inverted B image data (step S362) and writes the subtraction result at the first pixel position of the differential B frame memory M10 as the pixel value (differential B data) of the first pixel of the differential B image data (step S363).

In a similar manner, the pixel values of the pixels of the inverted R, G, and B image data are successively read out from the inverted R, G, and B frame memories M4, M5, and M6. The pixel values of corresponding pixels of the K image data in the K frame memory M7 are subtracted. The subtraction results are written at corresponding pixel positions of the differential R, G, and B frame memories M8, M9, and M10 (repeat of steps S364 to S376). With this operation, the differential R image data is stored in the differential R frame memory M8. The differential G image data is stored in the differential G frame memory M9. The differential B image data is stored in the differential B frame memory M10.

[Generation of Enhanced R, G, and B Image Data]

Next, the CPU 20A reads out the pixel value of the first pixel of the inverted R image data from the inverted R frame memory M4 (step S377) and the pixel value of the first pixel of the differential R image data from the differential R frame memory M8 (step S378). The CPU 20A adds the pixel value of the first pixel of the differential R image data to the pixel value of the first pixel of the inverted R image data (step S379) and writes the addition result at the first pixel position of the enhanced R frame memory M11 as the pixel value (enhanced R data) of the first pixel of the enhanced R image data (step S380).

The CPU 20A also reads out the pixel value of the first pixel of the inverted G image data from the inverted G frame memory M5 (step S381) and the pixel value of the first pixel of the differential G image data from the differential G frame memory M9 (step S382). The CPU 20A adds the pixel value of the first pixel of the differential G image data to the pixel value of the first pixel of the inverted G image data (step S383) and writes the addition result at the first pixel position of the enhanced G frame memory M12 as the pixel value (enhanced G data) of the first pixel of the enhanced G image data (step S384).

The CPU 20A also reads out the pixel value of the first pixel of the inverted B image data from the inverted B frame memory M6 (step S385) and the pixel value of the first pixel of the differential B image data from the differential B frame memory M10 (step S386). The CPU 20A adds the pixel value of the first pixel of the differential B image data to the pixel value of the first pixel of the inverted B image data (step S387) and writes the addition result at the first pixel position of the enhanced B frame memory M13 as the pixel value (enhanced B data) of the first pixel of the enhanced B image data (step S388).

In a similar manner, the pixel values of the pixels of the inverted R, G, and B image data are successively read out from the inverted R, G, and B frame memories M4, M5, and M6. The pixel values of corresponding pixels of the differential R, G, and B image data are added. The addition results are written at corresponding pixel positions of the enhanced R, G, and B frame memories M11, M12, and M13 (repeat of steps S389 to S401). With this operation, the enhanced R image data is stored in the enhanced R frame memory M11. The enhanced G image data is stored in the enhanced G frame memory M12. The enhanced B image data is stored in the enhanced B frame memory M13.

[Gaussian Processing]

Next, the CPU 20A reads out the pixel value of the first pixel of the enhanced R image data from the enhanced R frame memory M11 (step S402). The CPU 20A executes Gaussian processing for the pixel value of the first pixel of the enhanced R image data and stores the Gaussian-processed pixel value of the first pixel of the enhanced R image data at the first pixel position of the enhanced R frame memory M14 after Gaussian processing (step S403). Similarly, the pixel values of the pixels of the enhanced R image data are successively read out from the enhanced R frame memory M11 and subjected to the Gaussian processing. The Gaussian-processed pixel values of the pixels of the enhanced R image data are stored at corresponding pixel positions of the enhanced R frame memory M14 after Gaussian processing (repeat of steps S404 to S406).

The CPU 20A also reads out the pixel value of the first pixel of the enhanced G image data from the enhanced G frame memory M12 (step S407). The CPU 20A executes Gaussian processing for the pixel value of the first pixel of the enhanced G image data and stores the Gaussian-processed pixel value of the first pixel of the enhanced G image data at the first pixel position of the enhanced G frame memory M15 after Gaussian processing (step S408). Similarly, the pixel values of the pixels of the enhanced G image data are successively read out from the enhanced G frame memory M12 and subjected to the Gaussian processing. The Gaussian-processed pixel values of the pixels of the enhanced G image data are stored at corresponding pixel positions of the enhanced G frame memory M15 after Gaussian processing (repeat of steps S409 to S411).

The CPU 20A also reads out the pixel value of the first pixel of the enhanced B image data from the enhanced B frame memory M13 (step S412). The CPU 20A executes Gaussian processing for the pixel value of the first pixel of the enhanced B image data and stores the Gaussian-processed pixel value of the first pixel of the enhanced B image data at the first pixel position of the enhanced B frame memory M16 after Gaussian processing (step S413). Similarly, the pixel values of the pixels of the enhanced B image data are successively read out from the enhanced B frame memory M13 and subjected to the Gaussian processing. The Gaussian-processed pixel values of the pixels of the enhanced B image data are stored at corresponding pixel positions of the enhanced B frame memory M16 after Gaussian processing (repeat of steps S414 to S416).

The CPU 20A also reads out the pixel value of the first pixel of the K image data from the K frame memory M7 (step S417). The CPU 20A executes Gaussian processing for the pixel value of the first pixel of the K image data and stores the Gaussian-processed pixel value of the first pixel of the K image data at the first pixel position of the K frame memory M17 after Gaussian processing (step S418). Similarly, the pixel values of the pixels of the K image data are successively read out from the K frame memory M7 and subjected to the Gaussian processing. The Gaussian-processed pixel values of the pixels of the K image data are stored at corresponding pixel positions of the K frame memory M17 after Gaussian processing (repeat of steps S419 to S421).

[Averaging Line Profile]

Next, the CPU 20A reads out the Gaussian-processed enhanced R data of all pixels on the first X-direction line from the enhanced R frame memory M14 after Gaussian processing (step S422) and obtains the average value (step S423). Similarly, the Gaussian-processed enhanced R data of all pixels on the X-direction lines are successively read out from the enhanced R frame memory M14 after Gaussian processing while changing the pixel position, and the average value is obtained (repeat of steps S424 to S426). When the processing is ended for all X-direction lines (YES in step S426), the order of the X-direction line with the maximum average value is obtained. The order is stored in the memory M22 as the order of the X-direction center line of the register mark TC (step S427).

The same processing as described above is executed for the Gaussian-processed enhanced G and B data and K data stored in the enhanced G frame memory M15 after Gaussian processing, enhanced B frame memory M16 after Gaussian processing, and K frame memory M17 after Gaussian processing. The orders of the X-direction lines with the maximum average values are obtained and stored in the memory M22 as the orders of the X-direction center lines of the register marks TM, TY, and TK (steps S428 to S445).

The CPU 20A reads out the Gaussian-processed enhanced R data of all pixels on the first Y-direction line from the enhanced R frame memory M14 after Gaussian processing (step S446) and obtains the average value (step S447). Similarly, the Gaussian-processed enhanced R data of all pixels on the Y-direction lines are successively read out from the enhanced R frame memory M14 after Gaussian processing while changing the pixel position, and the average value is obtained (repeat of steps S448 to S450). When the processing is ended for all Y-direction lines (YES in step S450), the order of the Y-direction line with the maximum average value is obtained. The order is stored in the memory M27 as the order of the Y-direction center line of the register mark TC (step S451).

The same processing as described above is executed for the Gaussian-processed enhanced G and B data and K data stored in the enhanced G frame memory M15 after Gaussian processing, enhanced B frame memory M16 after Gaussian processing, and K frame memory M17 after Gaussian processing. The orders of the Y-direction lines with the maximum average values are obtained and stored in the memory M22 as the orders of the Y-direction center lines of the register marks TM, TY, and TK (steps S452 to S469).

[Calculation of Misregister Amount]

Next, the CPU 20A reads out, from the memory M22, the order of the X-direction center line of the register mark TC and the order of the X-direction center line of the register mark TK (steps S470 and S471). The CPU 20A calculates the circumferential line difference between the register marks TK and TC by subtracting the order of the X-direction center line of the register mark TC from the order of the X-direction center line of the register mark TK and stores the difference in the memory M28 (step S472).

The CPU 20A reads out, from the memory M22, the order of the X-direction center line of the register mark TM and the order of the X-direction center line of the register mark TK (steps S473 and S474). The CPU 20A calculates the circumferential line difference between the register marks TK and TM by subtracting the order of the X-direction center line of the register mark TM from the order of the X-direction center line of the register mark TK and stores the difference in the memory M28 (step S475).

The CPU 20A reads out, from the memory M22, the order of the X-direction center line of the register mark TY and the order of the X-direction center line of the register mark TK (steps S476 and S477). The CPU 20A calculates the circumferential line difference between the register marks TK and TY by subtracting the order of the X-direction center line of the register mark TY from the order of the X-direction center line of the register mark TK and stores the difference in the memory M28 (step S478).

Next, the CPU 20A reads out, from the memory M27, the order of the Y-direction center line of the register mark TC and the order of the Y-direction center line of the register mark TK (steps S479 and S480). The CPU 20A calculates the lateral line difference between the register marks TK and TC by subtracting the order of the Y-direction center line of the register mark TC from the order of the Y-direction center line of the register mark TK and stores the difference in the memory M29 (step S481).

The CPU 20A reads out, from the memory M27, the order of the Y-direction center line of the register mark TM and the order of the Y-direction center line of the register mark TK (steps S482 and S483). The CPU 20A calculates the lateral line difference between the register marks TK and TM by subtracting the order of the Y-direction center line of the register mark TM from the order of the Y-direction center line of the register mark TK and stores the difference in the memory M29 (step S484).

The CPU 20A reads out, from the memory M27, the order of the Y-direction center line of the register mark TY and the order of the Y-direction center line of the register mark TK (steps S485 and S486). The CPU 20A calculates the lateral line difference between the register marks TK and TY by subtracting the order of the Y-direction center line of the register mark TY from the order of the Y-direction center line of the register mark TK and stores the difference in the memory M29 (step S487).

The CPU 20A reads out the circumferential line difference between the register marks TK and TC from the memory M28 (step S488) and the circumferential line width stored in the memory M30 (step S489). The misregister amount between the register marks TK and TC in the circumferential direction is calculated by multiplying the circumferential line difference between the register marks TK and TC by the circumferential line width and stored in the memory M31 (step S490).

The CPU 20A reads out the circumferential line difference between the register marks TK and TM from the memory M28 (step S491) and the circumferential line width stored in the memory M30 (step S492). The misregister amount between the register marks TK and TM in the circumferential direction is calculated by multiplying the circumferential line difference between the register marks TK and TM by the circumferential line width and stored in the memory M31 (step S493).

The CPU 20A reads out the circumferential line difference between the register marks TK and TY from the memory M28 (step S494) and the circumferential line width stored in the memory M30 (step S495). The misregister amount between the register marks TK and TY in the circumferential direction is calculated by multiplying the circumferential line difference between the register marks TK and TY by the circumferential line width and stored in the memory M31 (step S496).

The CPU 20A reads out the lateral line difference between the register marks TK and TC from the memory M29 (step S497) and the lateral line width stored in the memory M32 (step S498). The misregister amount between the register marks TK and TC in the lateral direction is calculated by multiplying the lateral line difference between the register marks TK and TC by the lateral line width and stored in the memory M33 (step S499).

The CPU 20A reads out the lateral line difference between the register marks TK and TM from the memory M29 (step S500) and the lateral line width stored in the memory M32 (step S501). The misregister amount between the register marks TK and TM in the lateral direction is calculated by multiplying the lateral line difference between the register marks TK and TM by the lateral line width and stored in the memory M33 (step S502).

The CPU 20A reads out the lateral line difference between the register marks TK and TY from the memory M29 (step S503) and the lateral line width stored in the memory M32 (step S504). The misregister amount between the register marks TK and TY in the lateral direction is calculated by multiplying the lateral line difference between the register marks TK and TY by the lateral line width and stored in the memory M33 (step S505).

[Output of Misregister Amount to Register Adjustment Apparatus]

Next, the CPU 20A reads out the misregister amount between the register mark TK and TC in the circumferential direction from the memory M31 (step S506) and transmits the readout misregister amount to the circumferential register adjustment apparatus 21-1 of the cyan printing unit (step S507). After confirming a misregister amount reception completion signal from the circumferential register adjustment apparatus 21-1 of the cyan printing unit (YES in step S508), the CPU 20A reads out the misregister amount between the register mark TK and TM in the circumferential direction from the memory M31 (step S509) and transmits the readout misregister amount to the circumferential register adjustment apparatus 21-3 of the magenta printing unit (step S510). After confirming a misregister amount reception completion signal from the circumferential register adjustment apparatus 21-3 of the magenta printing unit (YES in step S511), the CPU 20A reads out the misregister amount between the register mark TK and TY in the circumferential direction from the memory M31 (step S512) and transmits the readout misregister amount to the circumferential register adjustment apparatus 21-5 of the yellow printing unit (step S513).

After confirming a misregister amount reception completion signal from the circumferential register adjustment apparatus 21-5 of the yellow printing unit (YES in step S514), the CPU 20A reads out the misregister amount between the register mark TK and TC in the lateral direction from the memory M33 (step S515) and transmits the readout misregister amount to the lateral register adjustment apparatus 21-2 of the cyan printing unit (step S516). After confirming a misregister amount reception completion signal from the lateral register adjustment apparatus 21-2 of the cyan printing unit (YES in step S517), the CPU 20A reads out the misregister amount between the register mark TK and TM in the lateral direction from the memory M33 (step S518) and transmits the readout misregister amount to the lateral register adjustment apparatus 21-4 of the magenta printing unit (step S519). After confirming a misregister amount reception completion signal from the lateral register adjustment apparatus 21-4 of the magenta printing unit (YES in step S520), the CPU 20A reads out the misregister amount between the register mark TK and TY in the lateral direction from the memory M33 (step S521) and transmits the readout misregister amount to the lateral register adjustment apparatus 21-6 of the yellow printing unit (step S522).

[Correction of Plate Cylinder Position by Register Adjustment Apparatus]

Figure 24A:
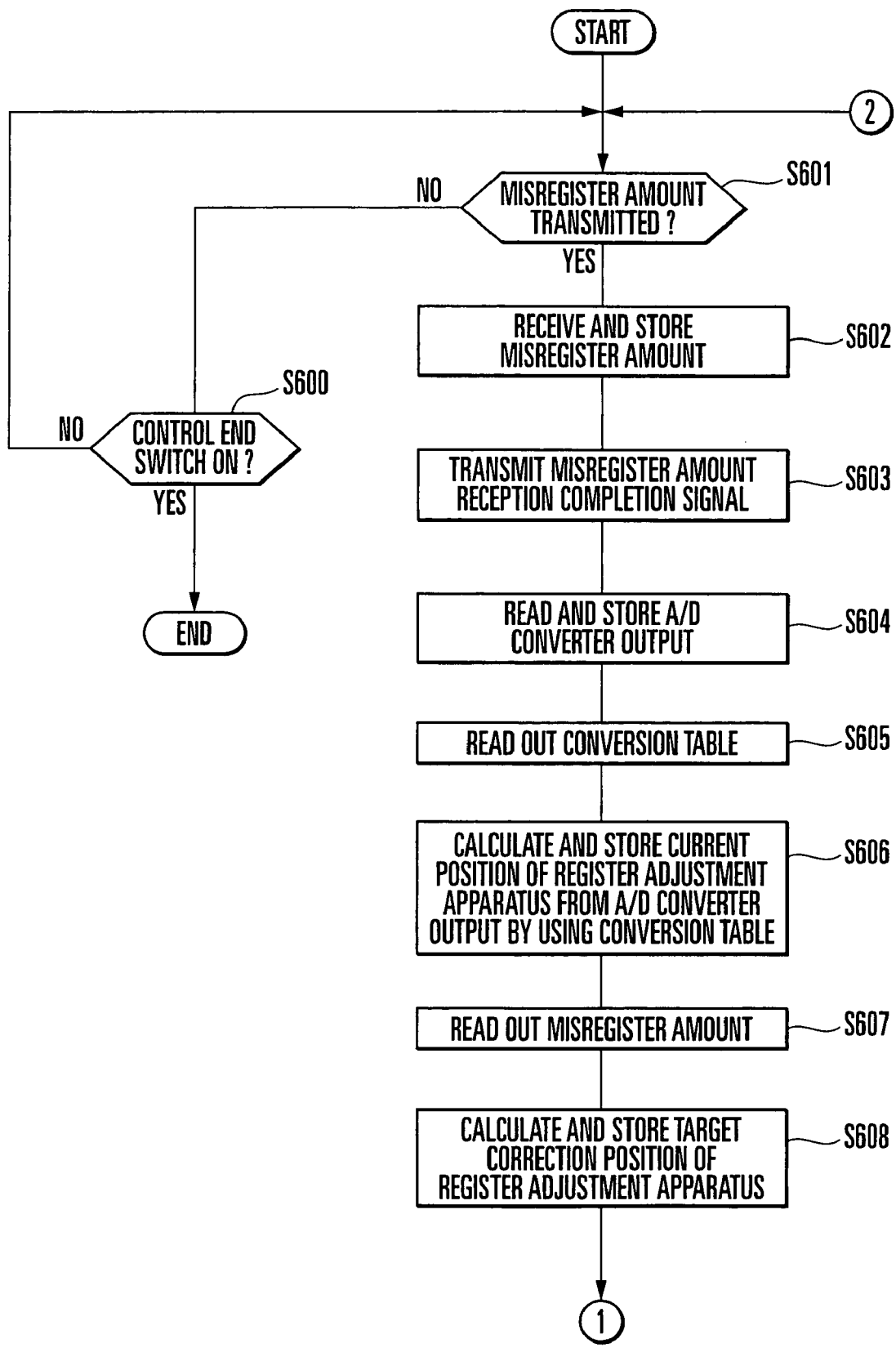
FIGS. 24A and 24B are flowcharts of the misregister amount detection operation executed by the CPU of the register adjustment apparatus shown in FIG. 20.

Upon receiving the misregister amount from the misregister amount detection apparatus 20 (YES in step S601 in FIG. 24A), the CPU 21A of the register adjustment apparatus 21 (21-1 to 21-6) stores the received misregister amount in the memory 21K (step S602) and transmits a misregister amount reception completion signal to the misregister amount detection apparatus 20 (step S603).

The output from the A/D converter 21G connected to the potentiometer 21F is read. The read output value is stored in the memory 21J (step S604). The A/D converter output-register adjustment apparatus position conversion table stored in the memory 21I is read out (step S605). The current position of the register adjustment apparatus is obtained from the read output of the A/D converter 21G by using the position conversion table and stored in the memory 21H (step S606).

Figure 24B:
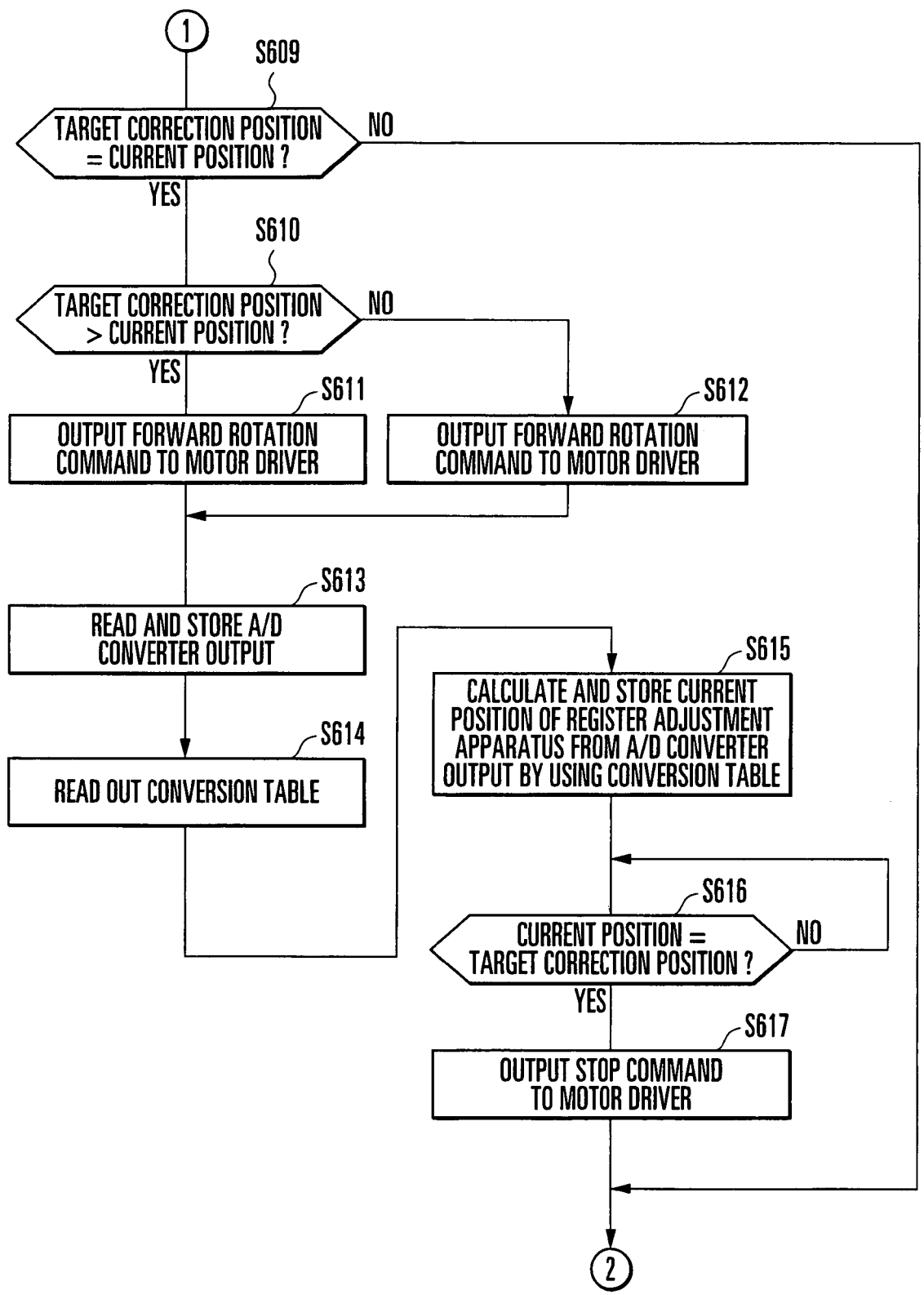

Subsequently, the CPU 21A reads out, from the memory 21K, the misregister amount from the misregister amount detection apparatus 20 (step S607). The target correction position of the register adjustment apparatus 21 is obtained by adding the misregister amount to the current position of the register adjustment apparatus 21 obtained in step S606 and stored in the memory 21L (step S608). The register adjustment motor 21D is driven through the register adjustment motor driver 21E such that the target correction position of the register adjustment apparatus 21 calculated in step S608 coincides with the current position of the register adjustment apparatus 21 obtained from the output of the A/D converter 21G (steps S609 to S617 in FIG. 24B).

Detailed Example of Second Embodiment

Figure 25:
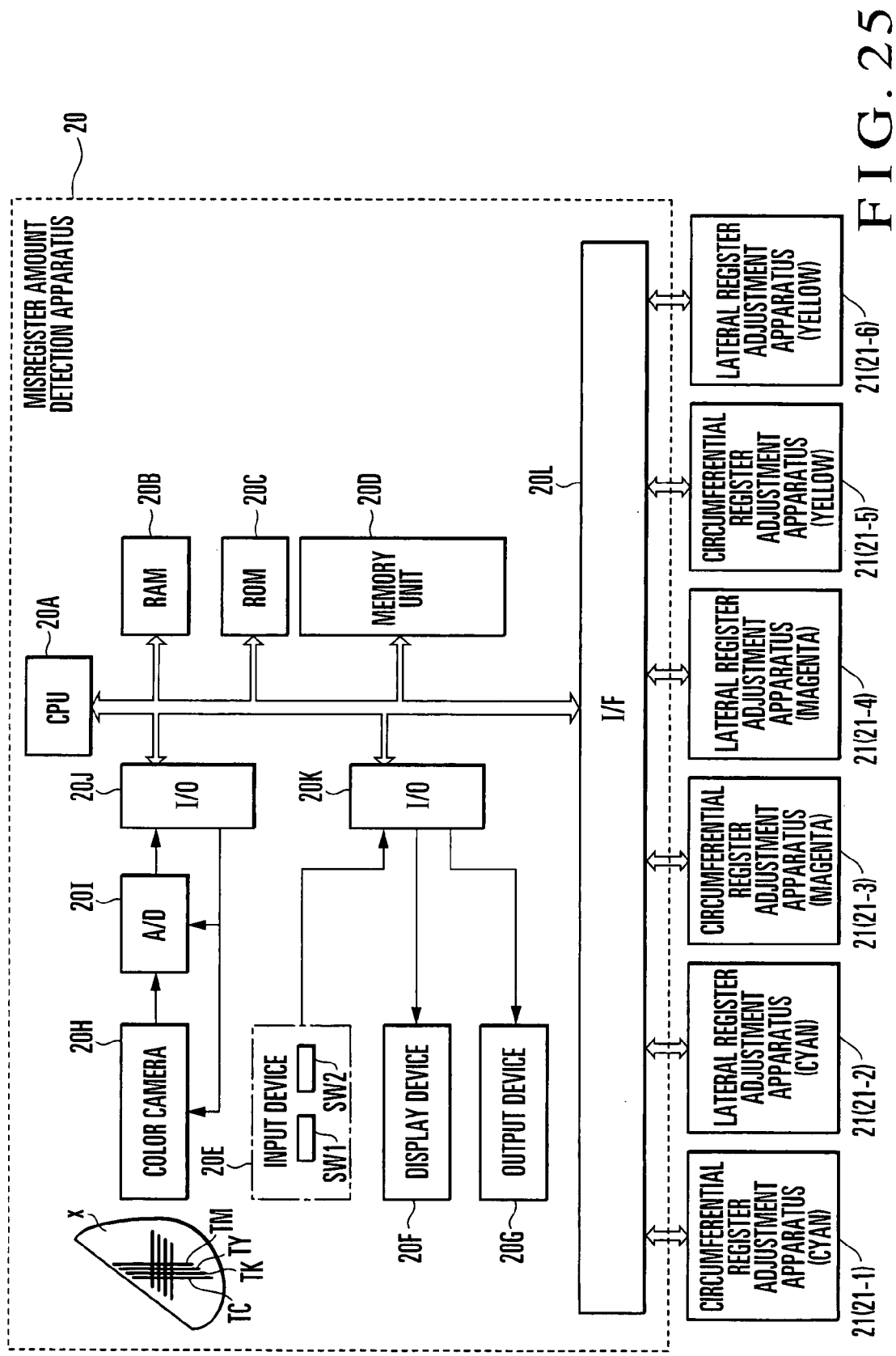
FIG. 25 is a block diagram of the automatic registration apparatus of a printing press to which a misregister amount detection apparatus as a more detailed example of the second embodiment shown in FIG. 17 is applied.

FIG. 25 shows the automatic registration apparatus of a printing press including a misregister amount detection apparatus as a more detailed example of the above-described second embodiment. The arrangement of the automatic registration apparatus is the same as that of the automatic registration apparatus shown in FIG. 20. The misregister amount detection program stored in a ROM 20C of a misregister amount detection apparatus 20 is slightly different. Hence, the memory arrangement of a memory unit 20D of the misregister amount detection apparatus 20 is also slightly different.

Figure 26:
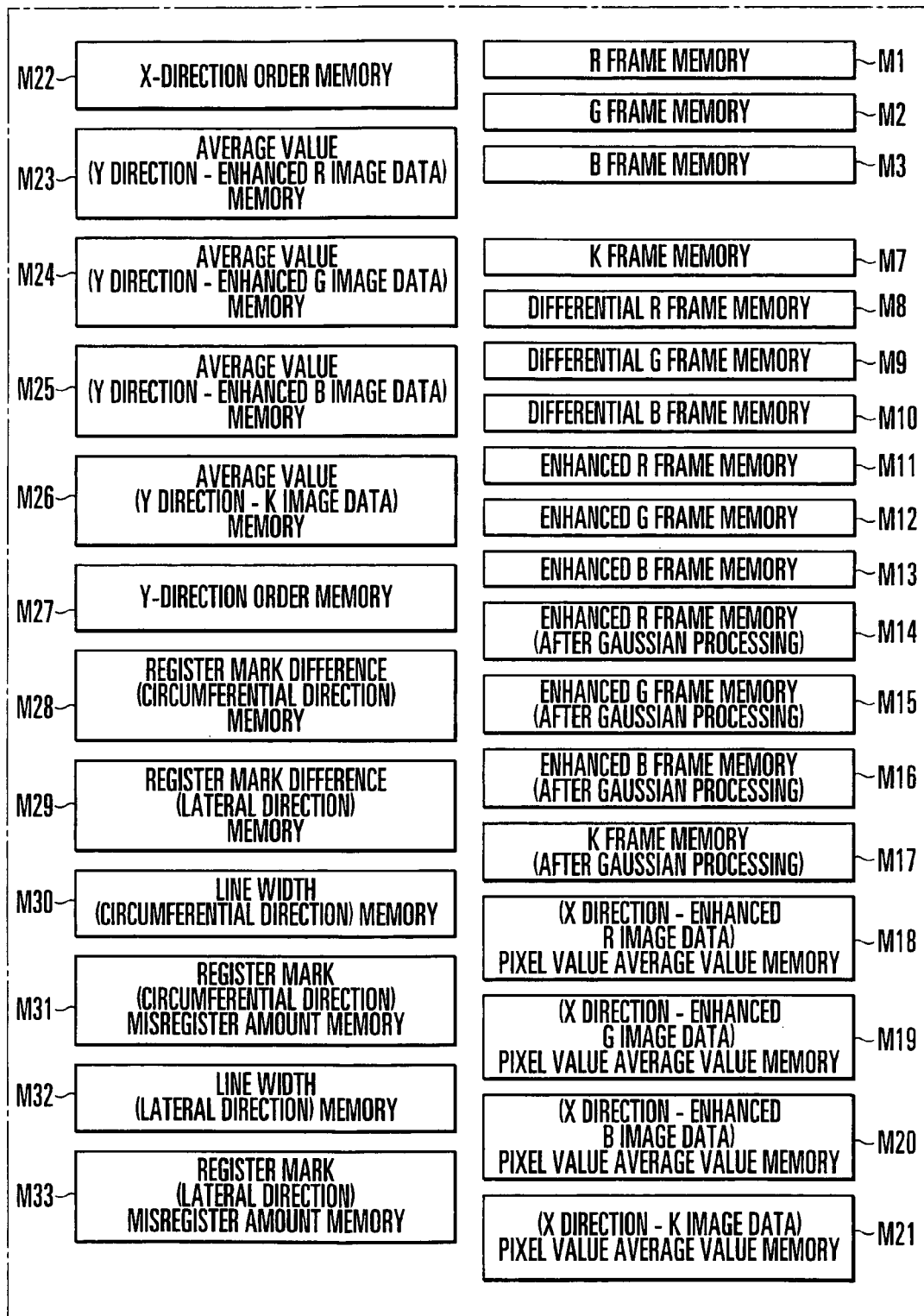
FIG. 26 is a block diagram showing the arrangement of a memory unit shown in FIG. 25.

FIG. 26 shows the arrangement of the memory unit 20D of the misregister amount detection apparatus 20. As is apparent from comparison to the memory arrangement in FIG. 22, in the detailed example of the second embodiment, the inverted R frame memory M4, inverted G frame memory M5, and inverted B frame memory M6 are omitted from the memory unit 20D. A memory M22 stores the order of X-direction lines in which the average values of the Gaussian-processed enhanced R, G, and B image data and K image data are minimum. A memory M27 stores the order of Y-direction lines in which the average values of the Gaussian-processed enhanced R, G, and B image data and K image data are minimum.

Figure 27A:
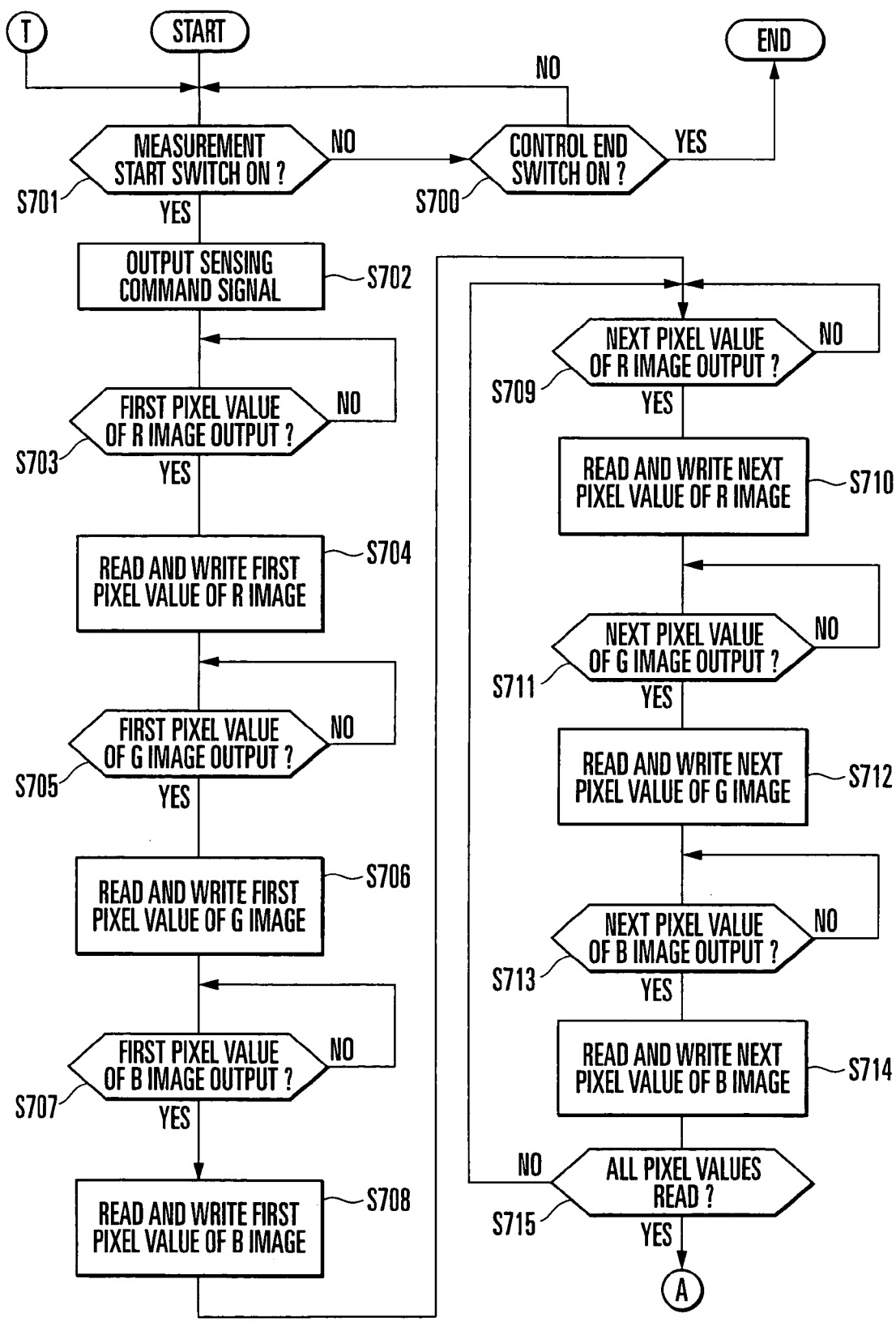
FIGS. 27A to 27O are flowcharts of a misregister amount detection operation executed by the CPU of the misregister amount detection apparatus shown in FIG. 25.
Figure 27B:
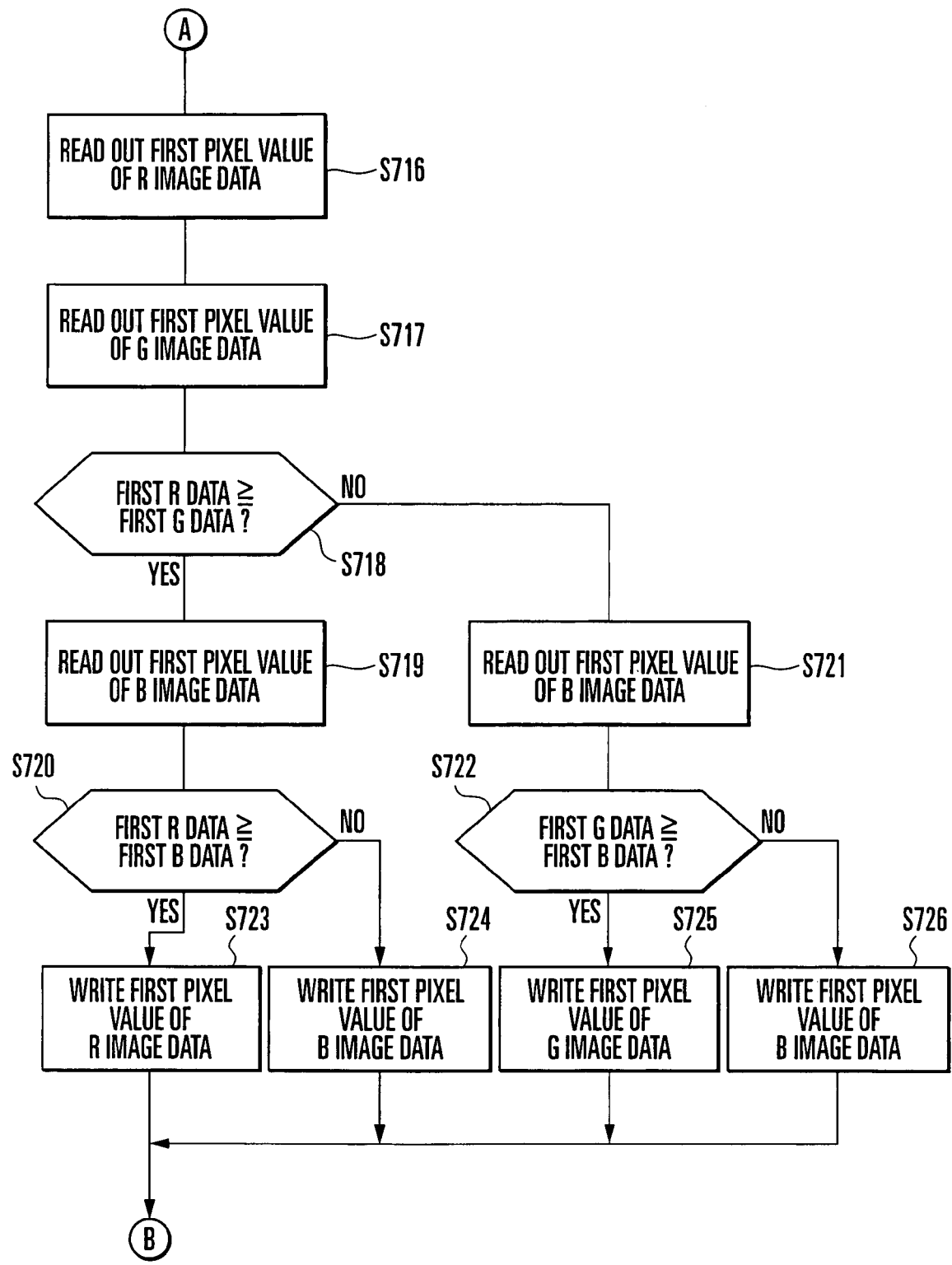
Figure 27C:
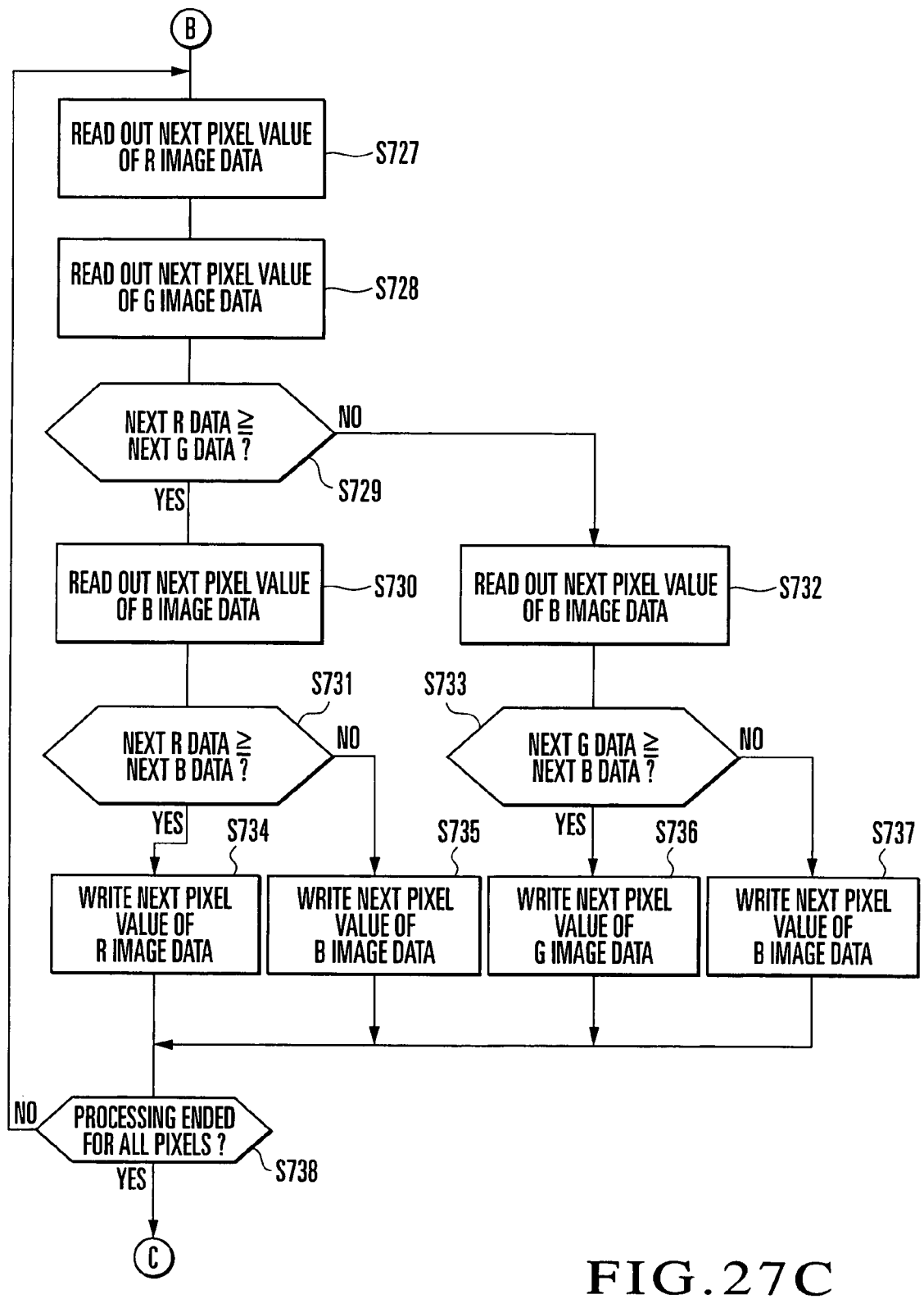
Figure 27D:
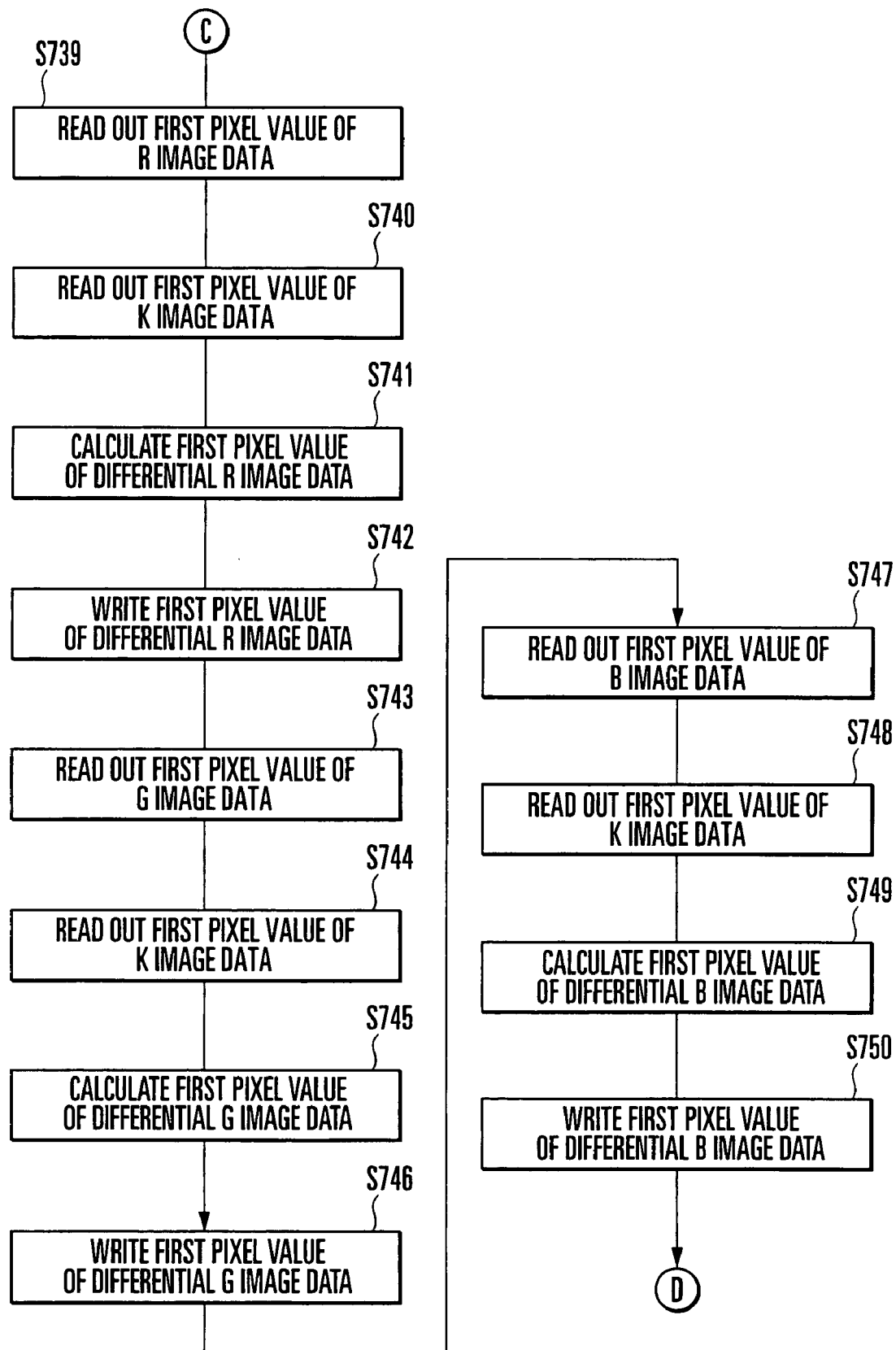
Figure 27E:
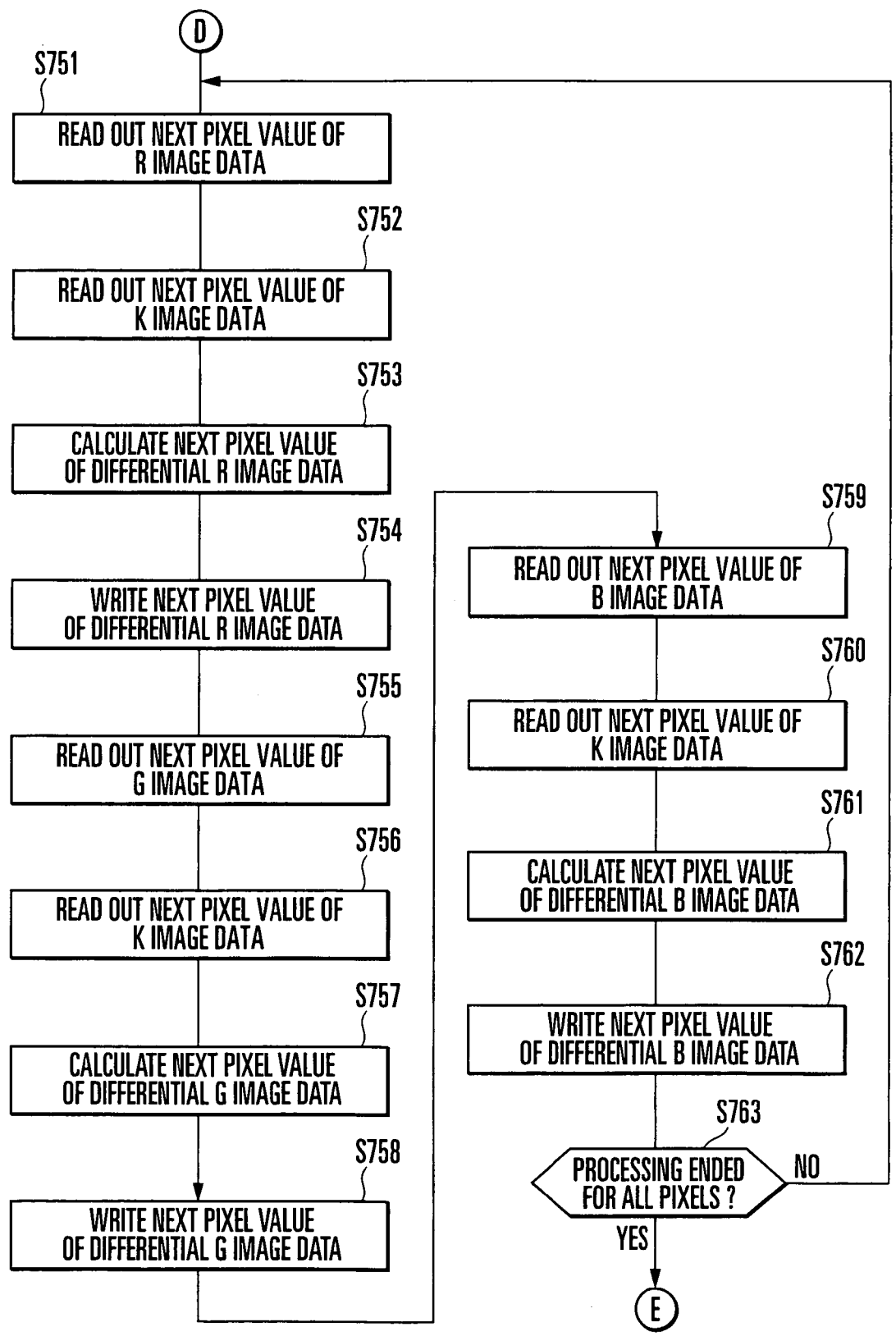
Figure 27F:
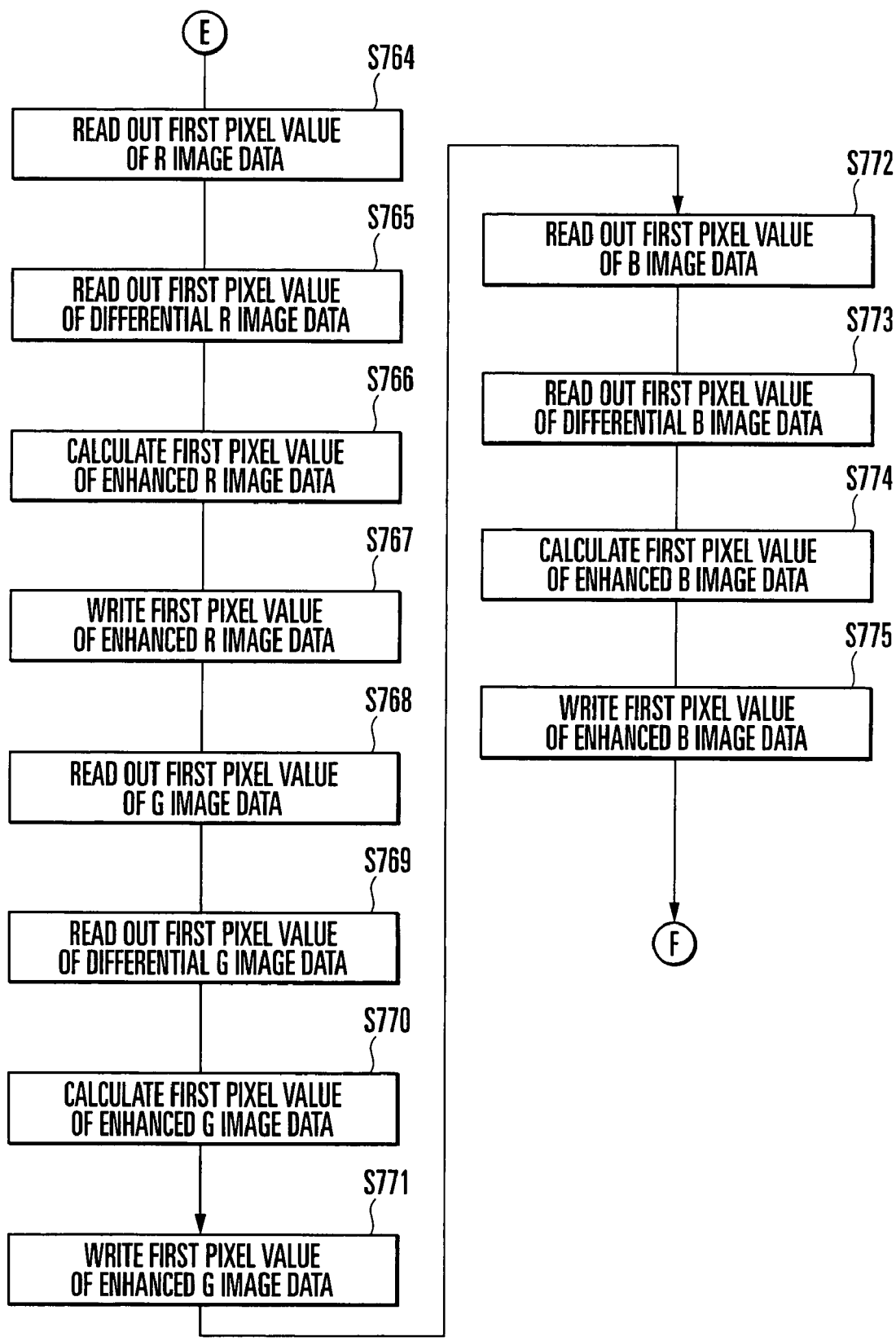
Figure 27G:
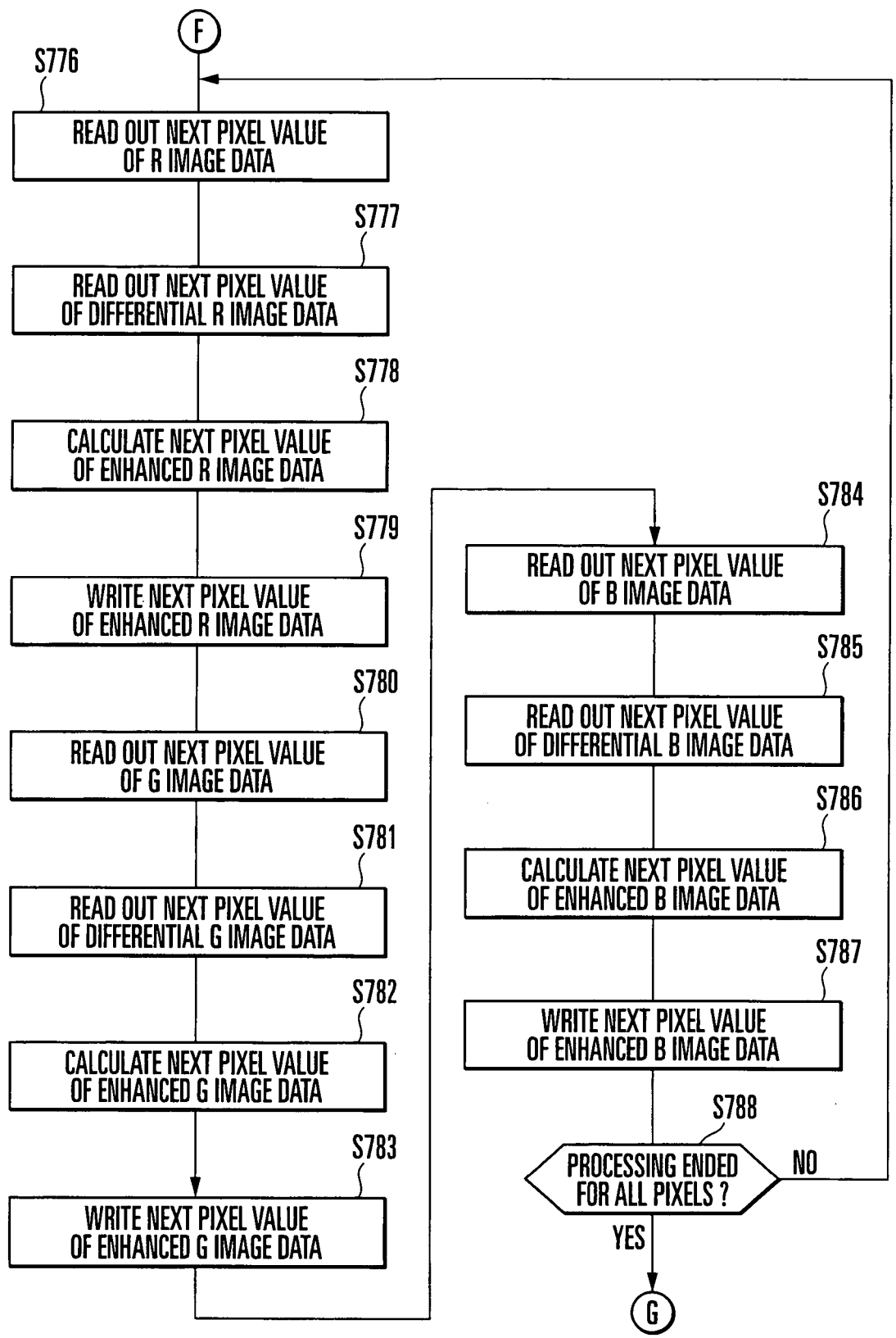
Figure 27H:
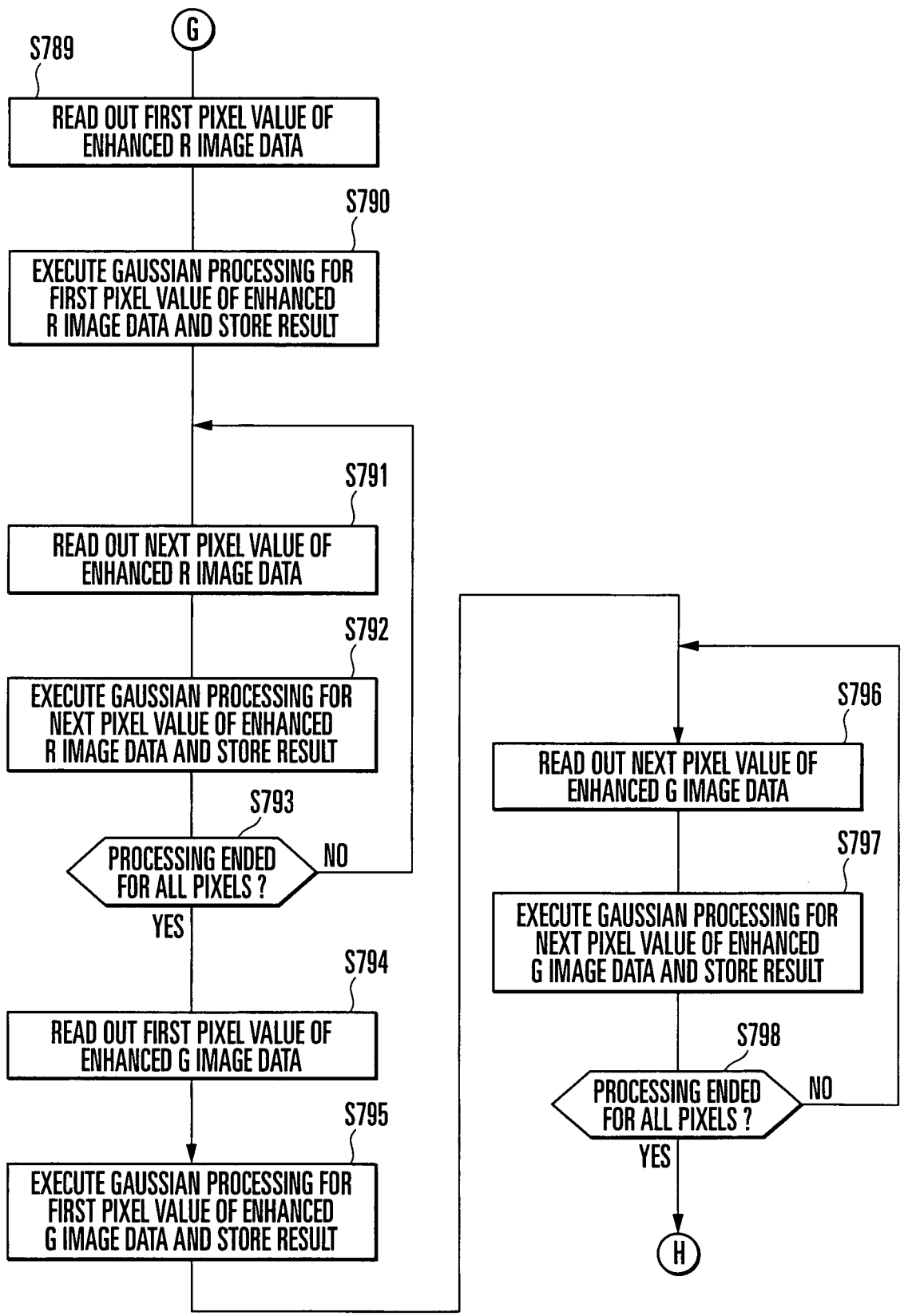
Figure 27I:
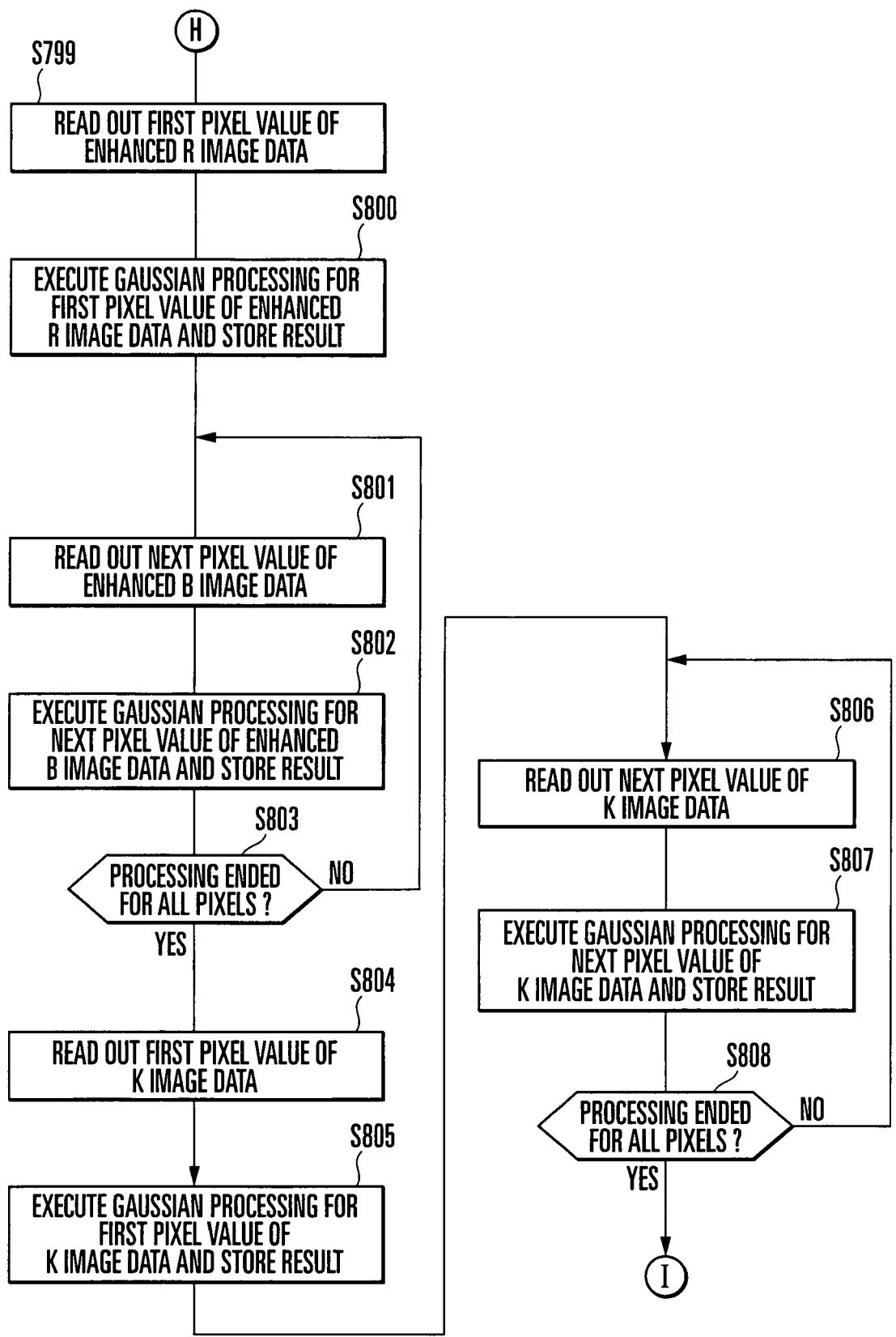
Figure 27J:
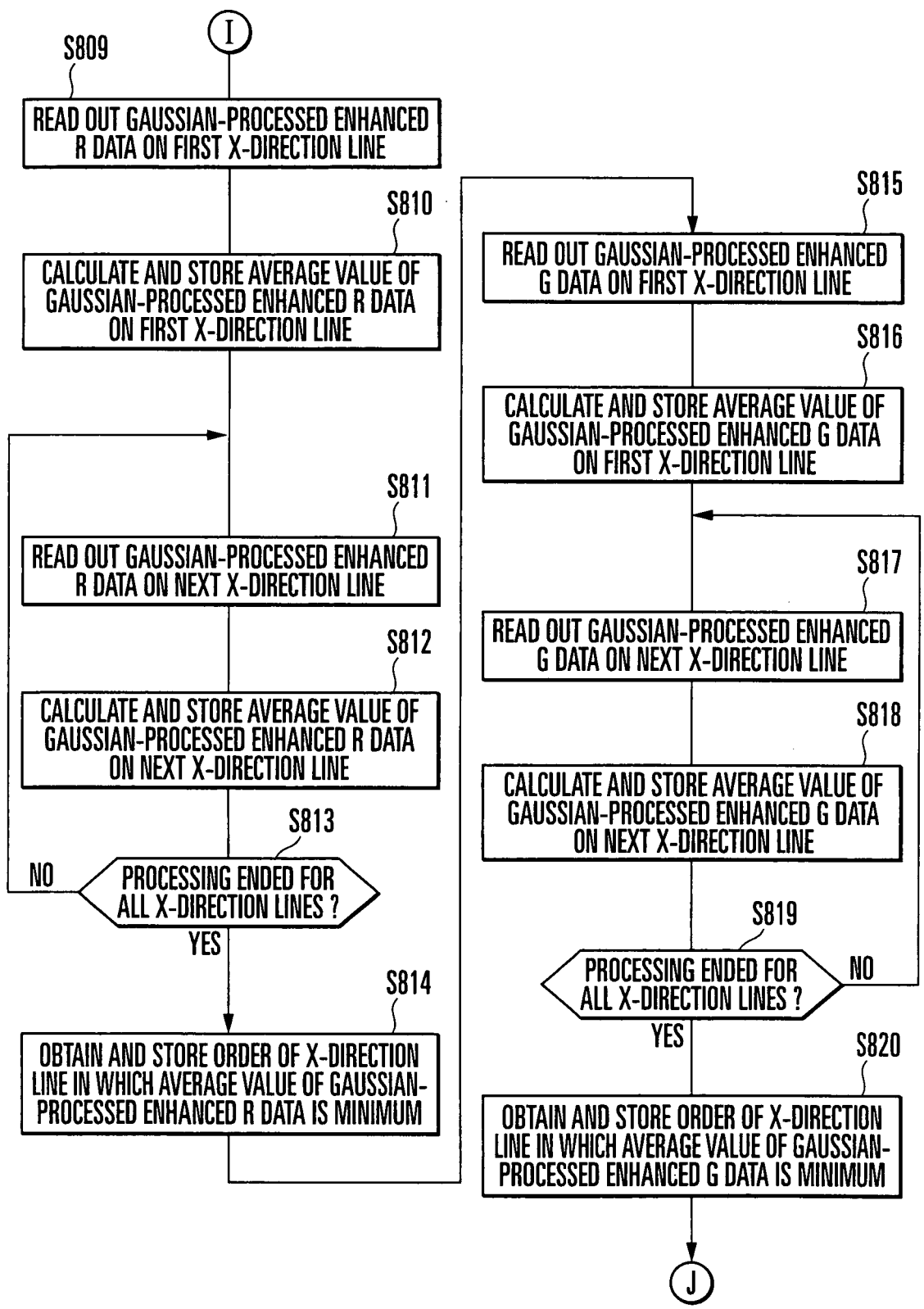
Figure 27K:
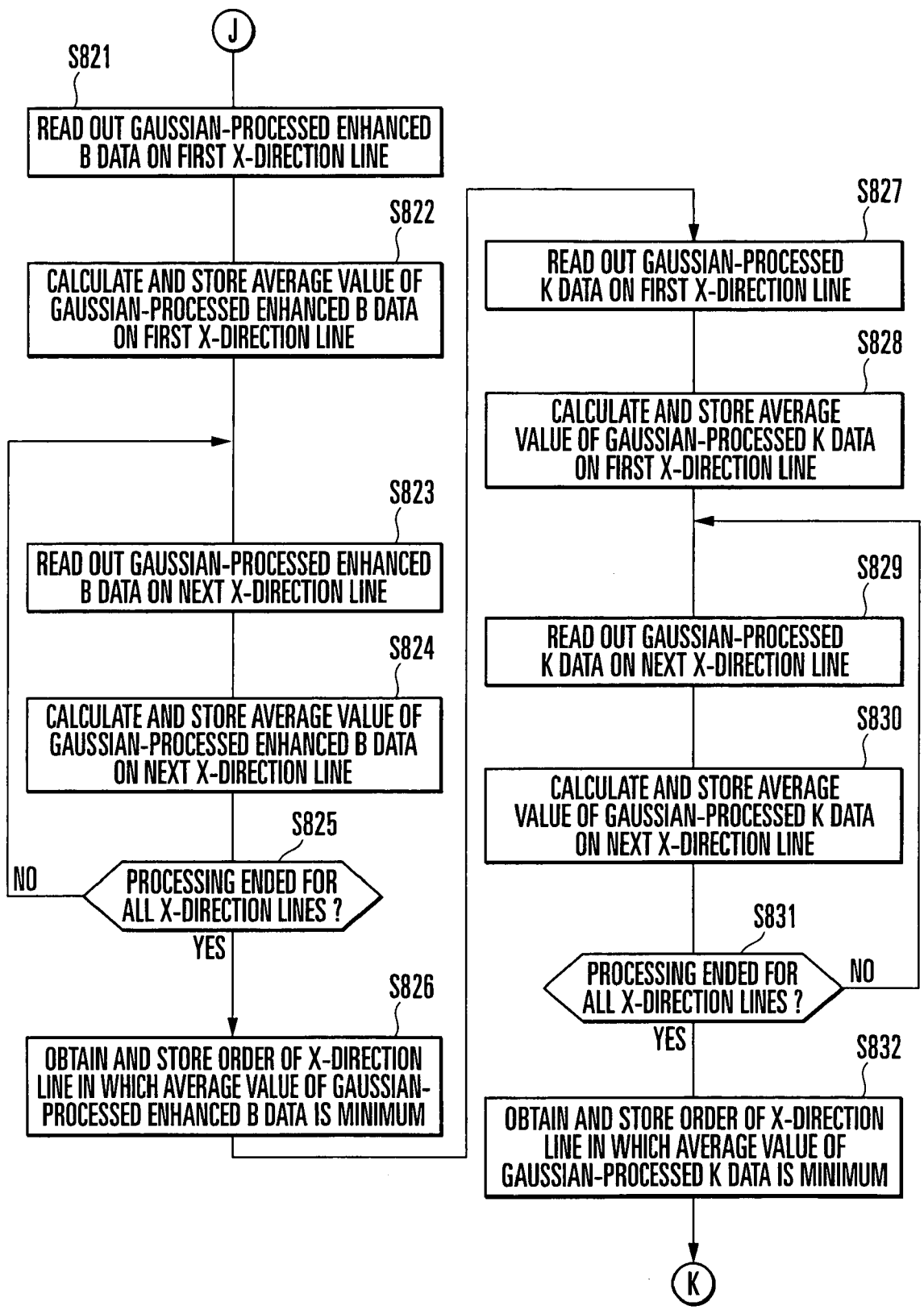
Figure 27L:
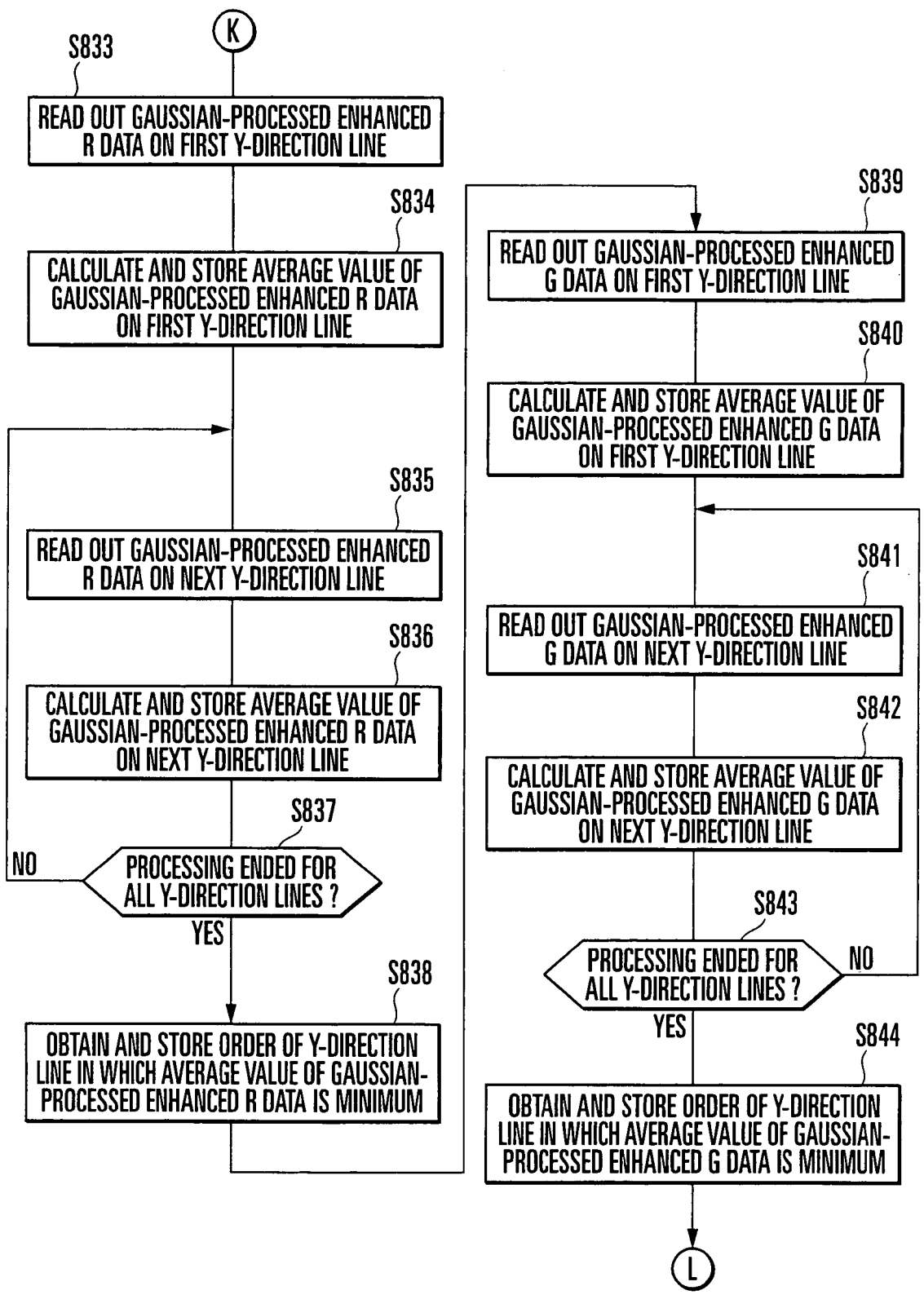
Figure 27M:
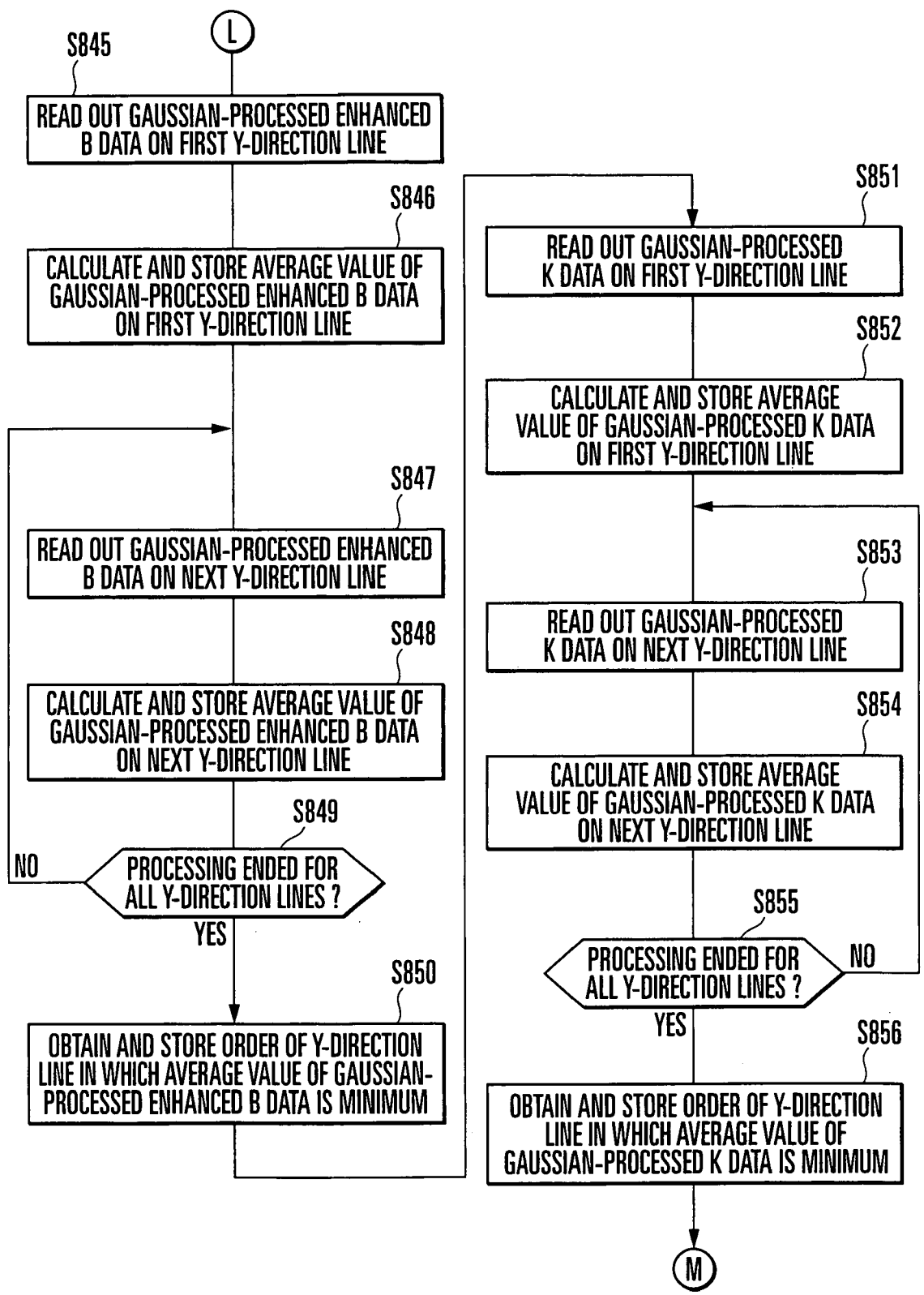
Figure 27N:
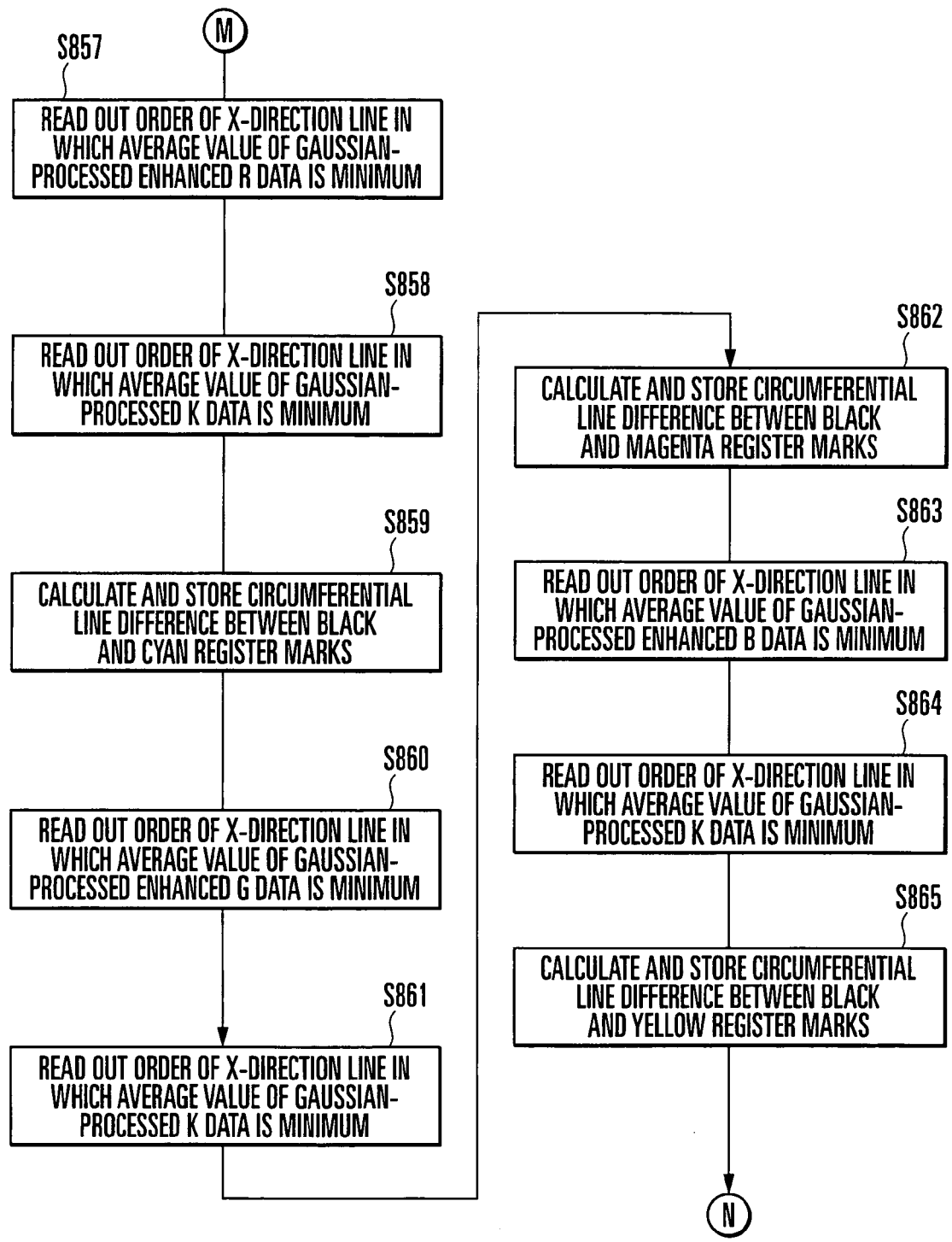
Figure 27O:
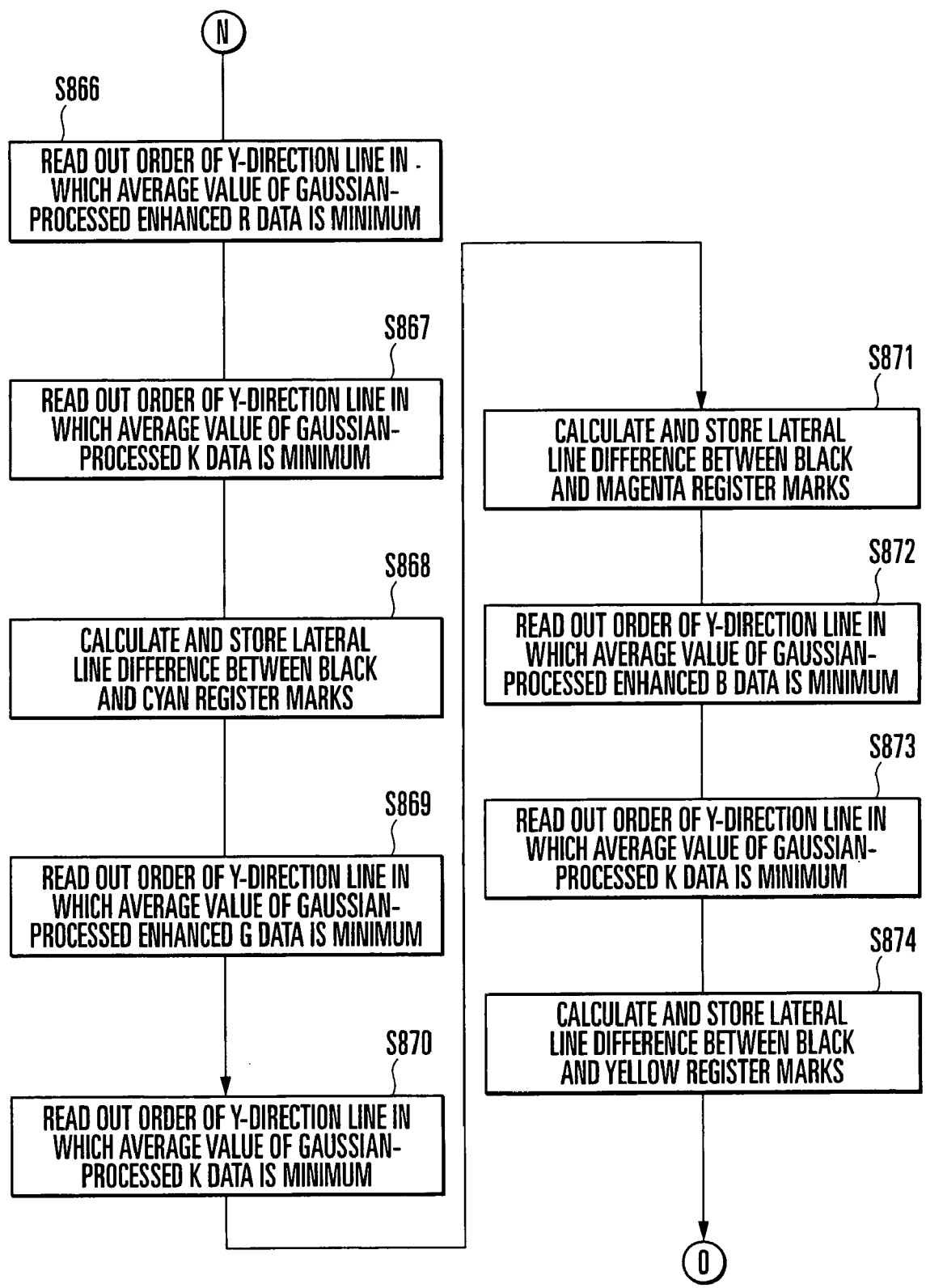
Figure 28:
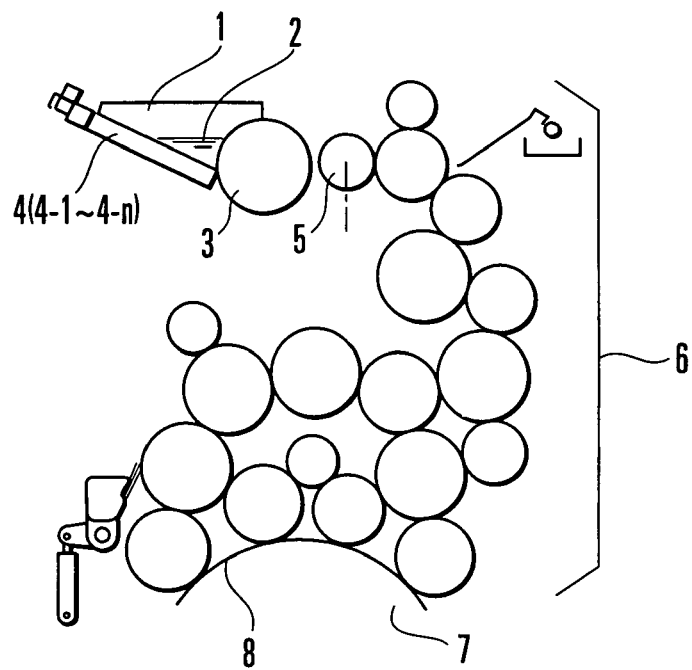
FIG. 28 is a view showing the main part of an inking device (inker) in each color printing unit of a multicolor printing press.

The processing operation of the misregister amount detection program executed by a CPU 20A of the above-described misregister amount detection apparatus 20 according to this embodiment will be described below with reference to FIGS. 27A to 27O.

[Reception of Sensed Image (R, G, and B Image Data)]

When a measurement start switch SW1 is turned on (YES in step S701), the CPU 20A sends an image sensing command signal to a camera 20H (step S702) to zoom and sense an image portion X where register marks TC, TM, TY, and TK are printed.

R, G, and B signals output from the camera 20H upon sensing the image portion X are received. The pixel value (luminance value) of the first pixel of the R image from the camera 20H is read and written at the first pixel position of an R frame memory M1 (steps S703 and S704). The pixel value (luminance value) of the first pixel of the G image from the camera 20H is read and written at the first pixel position of a G frame memory M2 (steps S705 and S706). The pixel value (luminance value) of the first pixel of the B image from the camera 20H is read and written at the first pixel position of a B frame memory M3 (steps S707 and S708).

In a similar manner, the pixel values of the pixels of the R, G, and B images from the camera 20H are successively read and written at corresponding pixel positions of the R, G, and B frame memories M1, M2, and M3 (repeat of steps S709 to S715). With this operation, the R image data is stored in the R frame memory M1. The G image data is stored in the G frame memory M2. The B image data is stored in the B frame memory M3.

[Generation of K Image Data]

Next, the CPU 20A reads out the pixel value of the first pixel of the R image data from the R frame memory M1 (step S716). The CPU 20A also reads out the pixel value of the first pixel of the G image data from the G frame memory M2 (step S717). The pixel value (R data) of the first pixel of the R image data is compared with the pixel value (G data) of the first pixel of the G image data (step S718).

If the R data of the first pixel is equal to or larger than the G data of the first pixel (YES in step S718), the pixel value of the first pixel of the B image data is read out from the B frame memory M3 (step S719). The pixel value (R data) of the first pixel of the R image data is compared with the pixel value (B data) of the first pixel of the B image data (step S720).

If the R data of the first pixel is smaller than the G data of the first pixel (NO in step S718), the pixel value of the first pixel of the B image data is read out from the B frame memory M3 (step S721). The pixel value (G data) of the first pixel of the G image data is compared with the pixel value (B data) of the first pixel of the B image data (step S722).

If the R data of the first pixel is equal to or larger than the B data of the first pixel (YES in step S720), the R data of the first pixel is written at the first pixel position of a K frame memory M7 (step S723).

If the R data of the first pixel is smaller than the B data of the first pixel (NO in step S720), the B data of the first pixel is written at the first pixel position of the K frame memory M7 (step S724).

If the G data of the first pixel is equal to or larger than the B data of the first pixel (YES in step S722), the G data of the first pixel is written at the first pixel position of the K frame memory M7 (step S725).

If the G data of the first pixel is smaller than the B data of the first pixel (NO in step S722), the B data of the first pixel is written at the first pixel position of the K frame memory M7 (step S726).

In a similar manner, the pixel values of the pixels of the R, G, and B image data are successively read out from the R, G, and B frame memories M1, M2, and M3. The maximum value of the pixel values (R, G, and B data) is written at a corresponding pixel position of the K frame memory M7 (repeat of steps S727 to S738). With this operation, the K image data is stored in the K frame memory M7.

[Generation of Differential R, G, and B Image Data]

Next, the CPU 20A reads out the pixel value of the first pixel of the R image data from the R frame memory M1 (step S739) and the pixel value of the first pixel of the K image data from the K frame memory M7 (step S740). The CPU 20A subtracts the pixel value of the first pixel of the K image data from the pixel value of the first pixel of the R image data (step S741) and writes the subtraction result at the first pixel position of a differential R frame memory M8 as the pixel value (differential R data) of the first pixel of the differential R image data (step S742).

The CPU 20A also reads out the pixel value of the first pixel of the G image data from the G frame memory M2 (step S743) and the pixel value of the first pixel of the K image data from the K frame memory M7 (step S744). The CPU 20A subtracts the pixel value of the first pixel of the K image data from the pixel value of the first pixel of the G image data (step S745) and writes the subtraction result at the first pixel position of a differential G frame memory M9 as the pixel value (differential G data) of the first pixel of the differential G image data (step S746).

The CPU 20A also reads out the pixel value of the first pixel of the B image data from the B frame memory M3 (step S747) and the pixel value of the first pixel of the K image data from the K frame memory M7 (step S748). The CPU 20A subtracts the pixel value of the first pixel of the K image data from the pixel value of the first pixel of the B image data (step S749) and writes the subtraction result at the first pixel position of a differential B frame memory M10 as the pixel value (differential B data) of the first pixel of the differential B image data (step S750).

In a similar manner, the pixel values of the pixels of the R, G, and B image data are successively read out from the R, G, and B frame memories M1, M2, and M3. The pixel values of corresponding pixels of the K image data in the K frame memory M7 are subtracted. The subtraction results are written at corresponding pixel positions of the differential R, G, and B frame memories M8, M9, and M10 (repeat of steps S751 to S763). With this operation, the differential R image data is stored in the differential R frame memory M8. The differential G image data is stored in the differential G frame memory M9. The differential B image data is stored in the differential B frame memory M10.

[Generation of Enhanced R, G, and B Image Data]

Next, the CPU 20A reads out the pixel value of the first pixel of the R image data from the R frame memory M1 (step S764) and the pixel value of the first pixel of the differential R image data from the differential R frame memory M8 (step S765). The CPU 20A adds the pixel value of the first pixel of the differential R image data to the pixel value of the first pixel of the R image data (step S766) and writes the addition result at the first pixel position of an enhanced R frame memory M11 as the pixel value (enhanced R data) of the first pixel of the enhanced R image data (step S767).

The CPU 20A also reads out the pixel value of the first pixel of the G image data from the G frame memory M2 (step S768) and the pixel value of the first pixel of the differential G image data from the differential G frame memory M9 (step S769). The CPU 20A adds the pixel value of the first pixel of the differential G image data to the pixel value of the first pixel of the G image data (step S770) and writes the addition result at the first pixel position of an enhanced G frame memory M12 as the pixel value (enhanced G data) of the first pixel of the enhanced G image data (step S771).

The CPU 20A also reads out the pixel value of the first pixel of the B image data from the B frame memory M3 (step S772) and the pixel value of the first pixel of the differential B image data from the differential B frame memory M10 (step S773). The CPU 20A adds the pixel value of the first pixel of the differential B image data to the pixel value of the first pixel of the B image data (step S774) and writes the addition result at the first pixel position of an enhanced B frame memory M13 as the pixel value (enhanced B data) of the first pixel of the enhanced B image data (step S775).

In a similar manner, the pixel values of the pixels of the R, G, and B image data are successively read out from the R, G, and B frame memories M1, M2, and M3. The pixel values of corresponding pixels of the differential R, G, and B image data are added. The addition results are written at corresponding pixel positions of the enhanced R, G, and B frame memories M11, M12, and M13 (repeat of steps S776 to S788). With this operation, the enhanced R image data is stored in the enhanced R frame memory M11. The enhanced G image data is stored in the enhanced G frame memory M12. The enhanced B image data is stored in the enhanced B frame memory M13.

[Gaussian Processing]

Next, the CPU 20A reads out the pixel value of the first pixel of the enhanced R image data from the enhanced R frame memory M11 (step S789). The CPU 20A executes Gaussian processing for the pixel value of the first pixel of the enhanced R image data and stores the Gaussian-processed pixel value of the first pixel of the enhanced R image data at the first pixel position of an enhanced R frame memory M14 after Gaussian processing (step S790). Similarly, the pixel values of the pixels of the enhanced R image data are successively read out from the enhanced R frame memory M11 and subjected to the Gaussian processing. The Gaussian-processed pixel values of the pixels of the enhanced R image data are stored at corresponding pixel positions of the enhanced R frame memory M14 after Gaussian processing (repeat of steps S791 to S793).

The CPU 20A also reads out the pixel value of the first pixel of the enhanced G image data from the enhanced G frame memory M12 (step S794). The CPU 20A executes Gaussian processing for the pixel value of the first pixel of the enhanced G image data and stores the Gaussian-processed pixel value of the first pixel of the enhanced G image data at the first pixel position of an enhanced G frame memory M15 after Gaussian processing (step S795). Similarly, the pixel values of the pixels of the enhanced G image data are successively read out from the enhanced G frame memory M12 and subjected to the Gaussian processing. The Gaussian-processed pixel values of the pixels of the enhanced G image data are stored at corresponding pixel positions of the enhanced G frame memory M15 after Gaussian processing (repeat of steps S796 to S798).

The CPU 20A also reads out the pixel value of the first pixel of the enhanced B image data from the enhanced B frame memory M13 (step S799). The CPU 20A executes Gaussian processing for the pixel value of the first pixel of the enhanced B image data and stores the Gaussian-processed pixel value of the first pixel of the enhanced B image data at the first pixel position of an enhanced B frame memory M16 after Gaussian processing (step S800). Similarly, the pixel values of the pixels of the enhanced B image data are successively read out from the enhanced B frame memory M13 and subjected to the Gaussian processing. The Gaussian-processed pixel values of the pixels of the enhanced B image data are stored at corresponding pixel positions of the enhanced B frame memory M16 after Gaussian processing (repeat of steps S801 to S803).

The CPU 20A also reads out the pixel value of the first pixel of the K image data from the K frame memory M7 (step S804). The CPU 20A executes Gaussian processing for the pixel value of the first pixel of the K image data and stores the Gaussian-processed pixel value of the first pixel of the K image data at the first pixel position of a K frame memory M17 after Gaussian processing (step S805). Similarly, the pixel values of the pixels of the K image data are successively read out from the K frame memory M7 and subjected to the Gaussian processing. The Gaussian-processed pixel values of the pixels of the K image data are stored at corresponding pixel positions of the K frame memory M17 after Gaussian processing (repeat of steps S806 to S808).

[Averaging Line Profile]

Next, the CPU 20A reads out the Gaussian-processed enhanced R data of all pixels on the first X-direction line from the enhanced R frame memory M14 after Gaussian processing (step S809) and obtains the average value (step S810). Similarly, the Gaussian-processed enhanced R data of all pixels on the X-direction lines are successively read out from the enhanced R frame memory M14 after Gaussian processing while changing the pixel position, and the average value is obtained (repeat of steps S811 to S813). When the processing is ended for all X-direction lines (YES in step S813), the order of the X-direction line with the minimum average value is obtained. The order is stored in the memory M22 as the order of the X-direction center line of the register mark TC (step S814).

The same processing as described above is executed for the Gaussian-processed enhanced G and B data and K data stored in the enhanced G frame memory M15 after Gaussian processing, enhanced B frame memory M16 after Gaussian processing, and K frame memory M17 after Gaussian processing. The orders of the X-direction lines with the minimum average values are obtained and stored in the memory M22 as the orders of the X-direction center lines of the register marks TM, TY, and TK (steps S815 to S832).

The CPU 20A reads out the Gaussian-processed enhanced R data of all pixels on the first Y-direction line from the enhanced R frame memory M14 after Gaussian processing (step S833) and obtains the average value (step S834). Similarly, the Gaussian-processed enhanced R data of all pixels on the Y-direction lines are successively read out from the enhanced R frame memory M14 after Gaussian processing while changing the pixel position, and the average value is obtained (repeat of steps S835 to S837). When the processing is ended for all Y-direction lines (YES in step S837), the order of the Y-direction line with the minimum average value is obtained. The order is stored in the memory M27 as the order of the Y-direction center line of the register mark TC (step S838).

The same processing as described above is executed for the Gaussian-processed enhanced G and B data and K data stored in the enhanced G frame memory M15 after Gaussian processing, enhanced B frame memory M16 after Gaussian processing, and K frame memory M17 after Gaussian processing. The orders of the Y-direction lines with the minimum average values are obtained and stored in the memory M22 as the orders of the Y-direction center lines of the register marks TM, TY, and TK (steps S839 to S856).

[Calculation of Misregister Amount]

Next, the CPU 20A reads out, from the memory M22, the order of the X-direction center line of the register mark TC and the order of the X-direction center line of the register mark TK (steps S857 and S858). The CPU 20A calculates the circumferential line difference between the register marks TK and TC by subtracting the order of the X-direction center line of the register mark TC from the order of the X-direction center line of the register mark TK and stores the difference in a memory M28 (step S859).

The CPU 20A reads out, from the memory M22, the order of the X-direction center line of the register mark TM and the order of the X-direction center line of the register mark TK (steps S860 and S861). The CPU 20A calculates the circumferential line difference between the register marks TK and TM by subtracting the order of the X-direction center line of the register mark TM from the order of the X-direction center line of the register mark TK and stores the difference in the memory M28 (step S862).

The CPU 20A reads out, from the memory M22, the order of the X-direction center line of the register mark TY and the order of the X-direction center line of the register mark TK (steps S863 and S864). The CPU 20A calculates the circumferential line difference between the register marks TK and TY by subtracting the order of the X-direction center line of the register mark TY from the order of the X-direction center line of the register mark TK and stores the difference in the memory M28 (step S865).

Next, the CPU 20A reads out, from the memory M27, the order of the Y-direction center line of the register mark TC and the order of the Y-direction center line of the register mark TK (steps S866 and S867). The CPU 20A calculates the lateral line difference between the register marks TK and TC by subtracting the order of the Y-direction center line of the register mark TC from the order of the Y-direction center line of the register mark TK and stores the difference in a memory M29 (step S868).

The CPU 20A reads out, from the memory M27, the order of the Y-direction center line of the register mark TM and the order of the Y-direction center line of the register mark TK (steps S869 and S870). The CPU 20A calculates the lateral line difference between the register marks TK and TM by subtracting the order of the Y-direction center line of the register mark TM from the order of the Y-direction center line of the register mark TK and stores the difference in the memory M29 (step S871).

The CPU 20A reads out, from the memory M27, the order of the Y-direction center line of the register mark TY and the order of the Y-direction center line of the register mark TK (steps S872 and S873). The CPU 20A calculates the lateral line difference between the register marks TK and TY by subtracting the order of the Y-direction center line of the register mark TY from the order of the Y-direction center line of the register mark TK and stores the difference in the memory M29 (step S874).

From then, the same processing as in steps S488 to S523 shown in FIGS. 23Q to 23T is executed.

According to the present invention, K image data DK is generated from inverted R, G, and B image data without setting any threshold value. Differential R, G, and B image data are obtained from the K image data and inverted R, G, and B image data. Enhanced R, G, and B image data are obtained from the differential R, G, and B image data and inverted R, G, and B image data. Alternatively, K image data is generated from R, G, and B image data without setting any threshold value. Differential R, G, and B image data are obtained from the K image data and R, G, and B image data. Enhanced R, G, and B image data are obtained from the differential R, G, and B image data and R, G, and B image data. Hence, the misregister amount between colors can accurately be obtained regardless of the difference in color density between actual printing products.

What is claimed is:

1. A misregister amount detection method performed by a misregister amount detection apparatus comprising the steps of:

sensing printed register marks of colors and extracting inverted R image data, inverted G image data, and inverted B image data of R image data, G image data, and B image data respectively containing R as a red color component, G as a green color component, and B as a blue color component of the register marks of the colors;

extracting a minimum value of pixel values of corresponding pixels of the generated inverted R image data, inverted G image data, and inverted B image data and converting the extracted minimum value of the pixel values of the pixels into a pixel value of a corresponding pixel of K image data containing K as a black color component;

obtaining differential R image data by subtracting the pixel value of each pixel of the K image data from the pixel value of a corresponding pixel of the inverted R image data, obtaining differential G image data by subtracting the pixel value of each pixel of the K image data from the pixel value of a corresponding pixel of the inverted G image data, and obtaining differential B image data by subtracting the pixel value of each pixel of the K image data from the pixel value of a corresponding pixel of the inverted B image data;

obtaining enhanced R image data by adding one of the pixel value of each pixel of the differential R image data and a value corresponding to the pixel value thereof to the pixel value of a corresponding pixel of the inverted R image data, obtaining enhanced G image data by adding one of the pixel value of each pixel of the differential G image data and a value corresponding to the pixel value thereof to the pixel value of a corresponding pixel of the inverted G image data, and obtaining enhanced B image data by adding one of the pixel value of each pixel of the differential B image data and a value corresponding to the pixel value thereof to the pixel value of a corresponding pixel of the inverted B image data; and obtaining a misregister amount between the colors on the basis of the pixel values of pixels of the enhanced R image data, enhanced G image data, and enhanced B image data.

2. A method according to claim 1, wherein
the register mark has at least a straight line portion running in a lateral direction perpendicular to a circumferential direction as a printing direction of the mark, and
the step of obtaining a misregister amount comprises the steps of:
obtaining, for each of the enhanced R image data, enhanced G image data, and enhanced B image data, a line in which an average value of the pixel values of the pixels on a line in the lateral direction is maximum; and
obtaining the misregister amount between the colors in the circumferential direction on the basis of positions of the obtained lines.

3. A method according to claim 1, wherein
the register mark has at least a straight line portion running in a circumferential direction as a printing direction of the mark, and
the step of obtaining a misregister amount comprises the steps of:
obtaining, for each of the enhanced R image data, enhanced G image data, and enhanced B image data, a line in which an average value of the pixel values of the pixels on a line in the circumferential direction is maximum; and
obtaining the misregister amount between the colors in a lateral direction on the basis of positions of the obtained lines.

4. A method according to claim 1, wherein the step of obtaining a misregister amount comprises the step of obtaining the misregister amount between the colors on the basis of the pixel values of the pixels of the enhanced R image data, enhanced G image data, enhanced B image data, and K image data.

5. A method according to claim 4, further comprising the step of Gaussian-processing the pixel values of the pixels of the enhanced R image data, enhanced G image data, enhanced B image data, and K image data.

6. A misregister amount detection method performed by a misregister amount detection apparatus comprising the steps of:

sensing printed register marks of colors and extracting R image data, G image data, and B image data respectively containing R as a red color component, G as a green color component, and B as a blue color component of the register marks of the colors;

extracting a maximum value of pixel values of corresponding pixels of the extracted R image data, G image data, and B image data and converting the extracted maximum value of the pixel values of the pixels into a pixel value of a corresponding pixel of K image data containing K as a black color component;

obtaining differential R image data by subtracting the pixel value of each pixel of the K image data from the pixel value of a corresponding pixel of the R image data, obtaining differential G image data by subtracting the pixel value of each pixel of the K image data from the pixel value of a corresponding pixel of the G image data, and obtaining differential B image data by subtracting the pixel value of each pixel of the K image data from the pixel value of a corresponding pixel of the B image data;

obtaining enhanced R image data by adding one of the pixel value of each pixel of the differential R image data and a value corresponding to the pixel value thereof to the pixel value of a corresponding pixel of the R image data, obtaining enhanced G image data by adding one of the pixel value of each pixel of the differential G image data and a value corresponding to the pixel value thereof to the pixel value of a corresponding pixel of the G image data, and obtaining enhanced B image data by adding one of the pixel value of each pixel of the differential B image data and a value corresponding to the pixel value thereof to the pixel value of a corresponding pixel of the B image data; and obtaining a misregister amount between the colors on the basis of the pixel values of pixels of the enhanced R image data, enhanced G image data, and enhanced B image data.

7. A method according to claim 6, wherein
the register mark has at least a straight line portion running in a lateral direction perpendicular to a circumferential direction as a printing direction of the mark, and
the step of obtaining a misregister amount comprises the steps of:
obtaining, for each of the enhanced R image data, enhanced G image data, and enhanced B image data, a line in which an average value of the pixel values of the pixels on a line in the lateral direction is minimum; and obtaining the misregister amount between the colors in the circumferential direction on the basis of positions of the obtained lines.

8. A method according to claim 6, wherein
the register mark has at least a straight line portion running in a circumferential direction as a printing direction of the mark, and
the step of obtaining a misregister amount comprises the steps of:
obtaining, for each of the enhanced R image data, enhanced G image data, and enhanced B image data, a line in which an average value of the pixel values of the pixels on a line in the circumferential direction is minimum; and
obtaining the misregister amount between the colors in a lateral direction on the basis of positions of the obtained lines.

9. A method according to claim 6, wherein the step of obtaining a misregister amount comprises the step of obtaining the misregister amount between the colors on the basis of the pixel values of the pixels of the enhanced R image data, enhanced G image data, enhanced B image data, and K image data.

10. A method according to claim 9, further comprising the step of Gaussian-processing the pixel values of the pixels of the enhanced R image data, enhanced G image data, enhanced B image data, and K image data.

11. A misregister amount detection apparatus comprising:
a plurality of data output means for sensing printed register marks of colors and extracting inverted R image data, inverted G image data, and inverted B image data obtained by inverting R image data, G image data, and B image data respectively containing R as a red color component, G as a green color component, and B as a blue color component of the register marks of the colors;
conversion means for extracting a minimum value of pixel values of corresponding pixels of the inverted R image data, inverted G image data, and inverted B image data which are output from said data output means and converting the extracted minimum value of the pixel values of the pixels into a pixel value of a corresponding pixel of K image data containing K as a black color component;
a plurality of first calculation means for obtaining differential R image data, differential G image data, and differential B image data by subtracting the pixel value of each pixel of the K image data output from said conversion means from the pixel value of a corresponding pixel of each of the inverted R image data, inverted G image data, and inverted B image data, which are output from said data output means;
a plurality of second calculation means for obtaining enhanced R image data, enhanced G image data, and enhanced B image data by adding one of the pixel value of each pixel of each of the differential R image data, differential G image data, differential B image data, which are output from said first calculation means, and a value corresponding to the pixel values thereof to the pixel value of a corresponding pixel of a corresponding one of the inverted R image data, inverted G image data, and inverted B image data, which are output from said data output means; and
third calculation means for obtaining a misregister amount between the colors on the basis of the pixel values of pixels of the enhanced R image data, enhanced G image data, and enhanced B image data, which are output from said second calculation means.

12. An apparatus according to claim 11, wherein
the register mark has at least a straight line portion running in a lateral direction perpendicular to a circumferential direction as a printing direction of the mark, and
said third calculation means obtains the misregister amount between the colors in the circumferential direction on the basis of positions of lines in which an average value of the pixel values of the pixels on a line in the lateral direction is maximum in each of the enhanced R image data, enhanced G image data, and enhanced B image data.

13. An apparatus according to claim 11, wherein
the register mark has at least a straight line portion running in a circumferential direction as a printing direction of the mark, and
said third calculation means obtains the misregister amount between the colors in a lateral direction on the basis of positions of lines in which an average value of the pixel values of the pixels on a line in the circumferential direction is maximum in each of the enhanced R image data, enhanced G image data, and enhanced B image data.

14. An apparatus according to claim 11, wherein said third calculation means obtains the misregister amount between the colors on the basis of the pixel values of the pixels of the enhanced R image data, enhanced G image data, enhanced B image data, and K image data.

15. An apparatus according to claim 14, further comprising Gaussian processing means for Gaussian-processing the pixel values of the pixels of the enhanced R image data, enhanced G image data, enhanced B image data, and K image data.

16. A misregister amount detection apparatus comprising:
data output means for sensing printed register marks of colors and extracting R image data, G image data, and B image data respectively containing R as a red color component, G as a green color component, and B as a blue color component of the register marks of the colors;
conversion means for extracting a maximum value of pixel values of corresponding pixels of the R image data, G image data, and B image data which are output from said data output means and converting the extracted maximum value of the pixel values of the pixels into a pixel value of a corresponding pixel of K image data containing K as a black color component;
a plurality of first calculation means for obtaining differential R image data, differential G image data, and differential B image data by subtracting the pixel value of each pixel of the K image data output from said conversion means from the pixel value of a corresponding pixel of each of the R image data, G image data, and B image data, which are output from said data output means;
a plurality of second calculation means for obtaining enhanced R image data, enhanced G image data, and enhanced B image data by adding one of the pixel value of each pixel of each of the differential R image data, differential G image data, differential B image data, which are output from said first calculation means, and a value corresponding to the pixel values thereof to the pixel value of a corresponding pixel of a corresponding one of the R image data, G image data, and B image data, which are output from said data output means; and
third calculation means for obtaining a misregister amount between the colors on the basis of the pixel values of pixels of the enhanced R image data, enhanced G image data, and enhanced B image data, which are output from said second calculation means.

17. An apparatus according to claim 16, wherein
the register mark has at least a straight line portion running in a lateral direction perpendicular to a circumferential direction as a printing direction of the mark, and
said third calculation means obtains the misregister amount between the colors in the circumferential direction on the basis of positions of lines in which an average value of the pixel values of the pixels on a line in the lateral direction is minimum in each of the enhanced R image data, enhanced G image data, and enhanced B image data.

18. An apparatus according to claim 16, wherein
the register mark has at least a straight line portion running in a circumferential direction as a printing direction of the mark, and
said third calculation means obtains the misregister amount between the colors in a lateral direction on the basis of positions of lines in which an average value of the pixel values of the pixels on a line in the circumferential direction is minimum in each of the enhanced R image data, enhanced G image data, and enhanced B image data.

19. An apparatus according to claim 16, wherein said third calculation means obtains the misregister amount between the colors on the basis of the pixel values of the pixels of the enhanced R image data, enhanced G image data, enhanced B image data, and K image data.

20. An apparatus according to claim 19, further comprising Gaussian processing means for Gaussian-processing the pixel values of the pixels of the enhanced R image data, enhanced G image data, enhanced B image data, and K image data.

* * * * *